US008482583B2

(12) United States Patent
Fujii

(10) Patent No.: US 8,482,583 B2
(45) Date of Patent: Jul. 9, 2013

(54) INFORMATION PROCESSING DEVICE THAT CAN BE HELD AT LEAST IN TWO DIRECTIONS FOR USE

(75) Inventor: Tomohiro Fujii, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 725 days.

(21) Appl. No.: 12/629,627

(22) Filed: Dec. 2, 2009

(65) Prior Publication Data

US 2010/0141681 A1 Jun. 10, 2010

(30) Foreign Application Priority Data

Dec. 4, 2008 (JP) ................................ 2008-310125

(51) Int. Cl.
*G09G 5/00* (2006.01)

(52) U.S. Cl.
USPC .......................................... 345/649; 345/522

(58) Field of Classification Search
None
See application file for complete search history.

(56) References Cited

U.S. PATENT DOCUMENTS

| | | | | |
|---|---|---|---|---|
| 6,208,325 | B1 * | 3/2001 | Reddy et al. | 345/658 |
| 7,216,144 | B1 | 5/2007 | Morris et al. | |
| 7,791,645 | B2 | 9/2010 | Yamamoto et al. | |
| 7,821,542 | B2 | 10/2010 | Lee et al. | |
| 2003/0087694 | A1 | 5/2003 | Storch | |
| 2005/0185063 | A1 | 8/2005 | Ikehata et al. | |
| 2006/0033760 | A1 * | 2/2006 | Koh | 345/649 |
| 2006/0227103 | A1 * | 10/2006 | Koo et al. | 345/156 |
| 2007/0174183 | A1 | 7/2007 | Jung et al. | |
| 2007/0177801 | A1 * | 8/2007 | Kawamoto et al. | 382/187 |
| 2008/0045333 | A1 | 2/2008 | Storch | |
| 2008/0133437 | A1 | 6/2008 | Shaw et al. | |
| 2009/0059053 | A1 * | 3/2009 | Ishikawa | 348/333.11 |
| 2009/0176566 | A1 | 7/2009 | Kelly | |
| 2009/0233683 | A1 | 9/2009 | Kim | |
| 2009/0310889 | A1 | 12/2009 | Matsushima et al. | |
| 2010/0010330 | A1 | 1/2010 | Rankers et al. | |
| 2010/0023871 | A1 | 1/2010 | Bederson et al. | |
| 2011/0124393 | A1 | 5/2011 | Hornik et al. | |

FOREIGN PATENT DOCUMENTS

| | | |
|---|---|---|
| JP | 2004-274475 | 9/2004 |
| JP | 2005-319134 | 11/2005 |
| JP | 2005-333340 | 12/2005 |
| JP | 2007-80180 | 3/2007 |
| JP | 4181211 B1 | 9/2008 |

OTHER PUBLICATIONS

Aoki et al. (U.S. Appl. No. 60/002,104, filed Dec. 27, 2007).*
U.S. Appl. No. 12/629,662, filed Dec. 2, 2009.
U.S. Appl. No. 12/629,596 , filed Dec. 2, 2009.
Brain Age Manual, Date Unknown, retrieved Dec. 17, 2011 http://www.nintendo.com/consumer/gameslist/manuals/DS_Brain_Age.pdf.
Brain Age 2 Manual, Date Unknown, retrieved Dec. 17, 2011 http://www.nintendo.com/consumer/gameslist/manuals/DS_Brain_Age_2.pdf.

* cited by examiner

*Primary Examiner* — Ke Xiao
*Assistant Examiner* — Kyle Zhai
(74) *Attorney, Agent, or Firm* — Nixon & Vanderhye PC

(57) ABSTRACT

While a second control mode is set, a control unit controls an image data output portion such that image data is output in an orientation rotated by 180 degrees as compared with a case where a first control mode is set, controls a first display control unit such that the image data output from the image data output portion is displayed in an orientation rotated further by 180 degrees, and controls a second display control unit such that an instruction image is displayed in an orientation rotated by 180 degrees as compared with the case where the first control mode is set.

14 Claims, 37 Drawing Sheets

INFORMATION PROCESSING DEVICE THAT CAN BE HELD AT LEAST IN TWO DIRECTIONS FOR USE

This nonprovisional application is based on Japanese Patent Application No. 2008-310125 filed with the Japan Patent Office on Dec. 4, 2008, the entire contents of which are hereby incorporated by reference.

FIELD OF THE INVENTION

Certain exemplary embodiments relate to an information processing device that can be held at least in two directions for use.

BACKGROUND AND SUMMARY

For a device for performing various types of processing in response to a user's operation, such a configuration as changing a user interface in accordance with user's handedness (right handedness or left handedness) has been proposed.

For example, Japanese Patent Laying-Open No. 2004-274475 discloses an image pick-up device advantageous in improving operability in photographing for both of a right-handed user and a left-handed user while suppressing increase in cost.

The image pick-up device disclosed in Japanese Patent Laying-Open No. 2004-274475, however, is mainly directed to a device for picking up an image of a subject visible from a user and image pick-up of the user himself/herself who operates the device is not assumed. In addition, this prior image pick-up device is directed to obtaining an image showing a subject, and edition of the image obtained by the image pick-up device is not assumed, even though it has a function to reproduce or externally output the obtained image. Moreover, this prior art is directed to an image pick-up device provided with a single photographing switch (shutter button) and not to a device without a photographing switch (shutter button).

Certain exemplary embodiments help solve the above-described problems. An aspect of certain exemplary embodiments relates to providing an information processing device having an image pick-up portion and a plurality of display portions arranged on left and right respectively, that achieves improved user operability.

An information processing device according to a first aspect includes: an image pick-up portion (23A: a reference numeral used in embodiments; to be understood similarly hereinafter); an image data output portion (23B) for outputting image data representing an image picked up by the image pick-up portion (23A); a first display portion (12) and a second display portion (22) provided on left and right of the image pick-up portion (23A), respectively; a storage portion (34) for storing the image data (SIMG) output from the image data output portion (23B); a first display control unit (31; 56) for causing one of the first display portion (12) and the second display portion (22) to display the image data (SIMG) output from the image data output portion (23B); a position input portion (13; 60) for accepting an instruction of a position on the first display portion (12); a second display control unit (31; 64) for causing the first display portion (12) to display an instruction image (BTN) for accepting an instruction, in a prescribed area of the first display portion (12); a storage instruction control unit (31; 33) for causing the storage portion (34) to store the image data (SIMG) output from the image data output portion (23B) in response to acceptance of the instruction on the position corresponding to the instruction image (BTN) by the position input portion (13; 60); a mode setting unit (31; 58) for switching between a first control mode and a second control mode; and a control unit (31; 50) for controlling the image data output portion (23B), the first display control unit (31; 56) and the second display control unit (31; 64) in accordance with the control mode set by the mode setting unit. While the second control mode is set, the control unit (31; 50) controls the image data output portion (23B) such that image data (SIMG) is output in an orientation rotated by 180 degrees as compared with a case where the first control mode is set, controls the first display control unit (31; 56) such that the image data (SIMG) output from the image data output portion (23B) is displayed in an orientation rotated further by 180 degrees, and controls the second display control unit (31; 64) such that the instruction image (BTN) is displayed in an orientation rotated by 180 degrees as compared with the case where the first control mode is set.

According to this first aspect, while the second control mode is set, the image data output portion outputs the image data representing an image incident on the image pick-up portion in the orientation rotated by 180 degrees as compared with the case where the first control mode is set. The image data output from the image data output portion is stored in the storage portion under the control of the storage instruction control unit. Through such processing, typically, in a manner of use where a direction in which the information processing device is held is rotated by 180 degrees for use between a right-handed user and a left-handed user, the image data in the same photographing direction can always be stored, regardless of user's handedness. Therefore, in edition or the like of the stored image data, processing therefor can be simplified (common).

In addition, according to this first aspect, while the second control mode is set, the image data output portion causes not only the image data stored in the storage portion but also the instruction image for accepting an instruction to be displayed in the orientation rotated by 180 degrees as compared with the case where the first control mode is set. Through such processing, typically, in a manner of use where a direction in which the information processing device is held is rotated by 180 degrees for use between a right-handed user and a left-handed user, a display interface that is always the same can be provided, regardless of user's handedness. Therefore, excellent operability for any of the right-handed user and the left-handed user can be provided.

According to a preferred second aspect, the information processing device further includes a first housing (11), a second housing (21), and a coupling portion for rotatably coupling the first housing and the second housing to each other. The first display portion is provided in the first housing, the second display portion is provided in the second housing, and the image pick-up portion is provided in the coupling portion.

According to this second aspect, the user can carry out photographing and perform various operations while holding the first housing and the second housing with respective hands. In addition, as the image pick-up portion is provided in the coupling portion where the first housing and the second housing are coupled to each other, the image pick-up portion can be maintained in a substantially central portion of the device, regardless of the direction in which the information processing device is held.

According to a preferred third aspect, the storage instruction control unit causes the storage portion to store the image data after a prescribed period of time since acceptance of the instruction onto the position corresponding to the instruction image by the position input portion, and causes at least one of the first display portion and the second display portion to display a notification image indicating timing of storage in the storage portion during a period from acceptance of the instruction until storage in the storage portion.

According to this third aspect, when the user performs a touch operation on the position corresponding to the instruction image through the position input portion, a position where the information processing device is held may be displaced due to the touch operation. Though "camera shake" may be caused by such displacement of the position where the information processing device is held, timing is delayed from the touch operation until actual storage of the image data in the storage portion and a notification image indicating the timing of storage of the image data in the storage portion is displayed, so that the user can securely hold the information processing device at the timing of photographing. Thus, a photographed image less affected by "camera shake" can be obtained.

According to a preferred fourth aspect, the first and second control modes are modes in accordance with user's handedness.

According to the fourth aspect, an appropriate mode in accordance with the user's handedness can be set. Thus, the information processing device achieving improved operability for any of the right-handed user and the left-handed user can be provided.

According to a preferred fifth aspect, the image pick-up portion is arranged to include a user's face in a field while a user holds the first display portion and the second display portion.

According to the fifth aspect, a face of the user can be photographed by the image pick-up portion while the user holds the information processing device. Therefore, such an application as utilizing a head shot of the user himself/herself can readily be provided in the information processing device. According to a preferred embodiment, user identification information associated with the user's head shot can be registered.

An information processing device according to a sixth aspect includes: an image pick-up element (23A); a reading circuit (23B) for reading image data in accordance with light reception by the image pick-up element; first and second display portions (12, 22) provided on left and right of the image pick-up element, respectively; an input portion (13) arranged on the first display portion, for accepting an instruction of a position; a memory (32, 34) coupled to the reading circuit; and a processor (31) coupled to the reading circuit and the memory. The processor is programmed to cause the first and/or second display portion(s) to display an image obtained by the image pick-up element by: setting any of first and second control modes; while the first control mode is set, causing the first display portion to display an instruction image for accepting an instruction in a prescribed area of the first display portion, causing the memory to store the image data read in a prescribed orientation from the image pick-up element by the reading circuit in response to acceptance of the instruction onto the position corresponding to the instruction image by the input portion, and causing one of the first and second display portions to display the image data stored in the memory; and while the second control mode is set, causing the first display portion to display the instruction image in an orientation rotated by 180 degrees as compared with a case where the first control mode is set, controlling the reading circuit such that the image data is output in an orientation rotated by 180 degrees as compared with the case where the first control mode is set, in response to acceptance of the instruction onto the position corresponding to the instruction image by the input portion, causing the memory to store the image data read from the image pick-up element by the reading circuit, and causing one of the first and second display portions to display the image data stored in the memory in an orientation rotated further by 180 degrees.

In the description above, reference numerals for indicating correspondence with embodiments which will be described later, and supplemental explanation and the like are provided for better understanding of the exemplary embodiments; however, they are not intended to limit the present invention in any manner.

According to certain exemplary embodiments, user operability can be improved in an information processing device having an image pick-up portion and a plurality of display portions arranged on left and right respectively.

The foregoing and other features, aspects, and advantages of certain exemplary embodiments will become more apparent from the following detailed description when taken in conjunction with the accompanying drawings.

DETAILED DESCRIPTION

Figure 1:
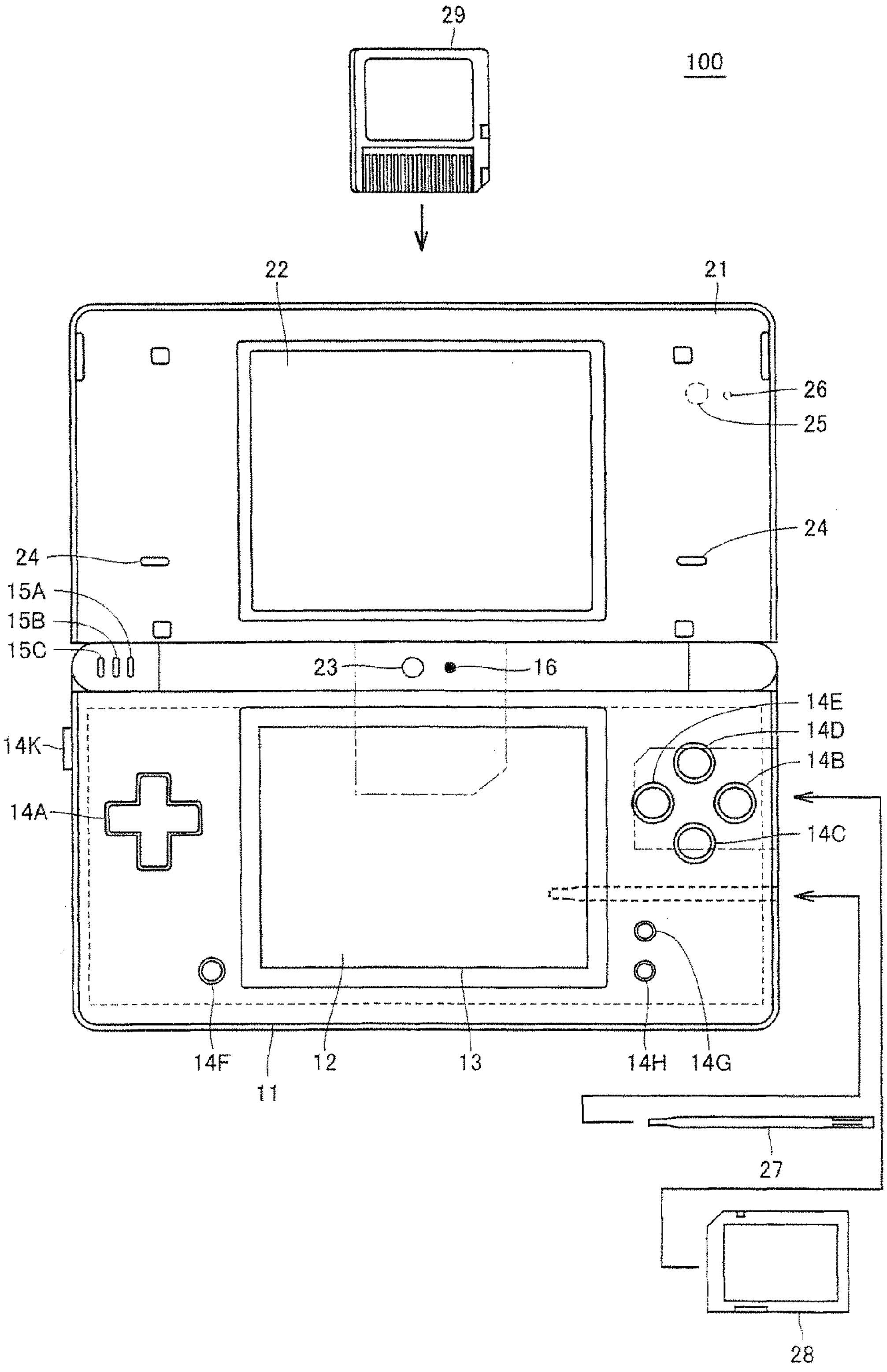
FIG. 1 shows appearance of a game device (unfolded state) according to an embodiment of the present invention.

An embodiment of the present invention will be described in detail with reference to the drawings. The same or corresponding elements in the drawings have the same reference characters allotted, and description thereof will not be repeated.

A portable game device 100 will be described hereinafter as a representative example of a computer or an information processing device according to certain exemplary embodiments. Game device 100 can interact with image pick-up means (or an image pick-up portion), input means (or an input portion) capable of detecting a coordinate on which an input operation was performed, and display means (or a display portion). In addition, a program executed by game device 100 will be described by way of example of a program according to certain exemplary embodiments. It is noted that the information processing device according to the present invention is not limited to a game device, and it may be implemented as a personal computer capable of executing various applications. In addition, the program according to the present invention may be incorporated as a function of some of various applications executed on a personal computer.

<Definition of Terms>

It is noted here that "to interact with" means that such devices as the image pick-up means (or the image pick-up portion), the input means (or the input portion), and the display means (or the display portion) are connected to the computer through wired or wireless connection to allow communication of data. Here, such devices as the image pick-up means (or the image pick-up portion), the input means (or the input portion), and the display means (or the display portion) may integrally be formed with a computer or provided separately therefrom.

Regarding a typical example of the input means (or the input portion) capable of detecting a coordinate on which an input operation was performed, in a case of a portable device as will be described later, a touch panel is preferably adopted. Alternatively, a mouse, a trackball, a pen tablet, or the like may be employed. Alternatively, a pointer (typically, a controller of Wii® or the like) capable of remotely indicating a coordinate on a display surface of the display means (such as a display monitor) may be employed.

Obtaining image data from the image pick-up means (or the image pick-up portion) is herein referred to as "image pick-up", and storage (saving) of picked-up image data is referred to as "photographing" or "capturing".

For distinction between an image obtained by the image pick-up means (or the image pick-up portion) and an image in accordance with a trail of an input operation through the input means (or the input portion) (drawing input), these images are herein also referred to as a "camera image" and a "hand-drawn image", respectively.

An image brought in correspondence with an internal command or an internal operation and displayed for accepting a corresponding instruction in accordance with selection (touch operation) through the input means (or the input portion) is herein also referred to as an "instruction image". In addition, an image displayed on the display means (or the display portion) for notifying a user of some message is also referred to as a "notification image".

<Appearance>

Figure 2:
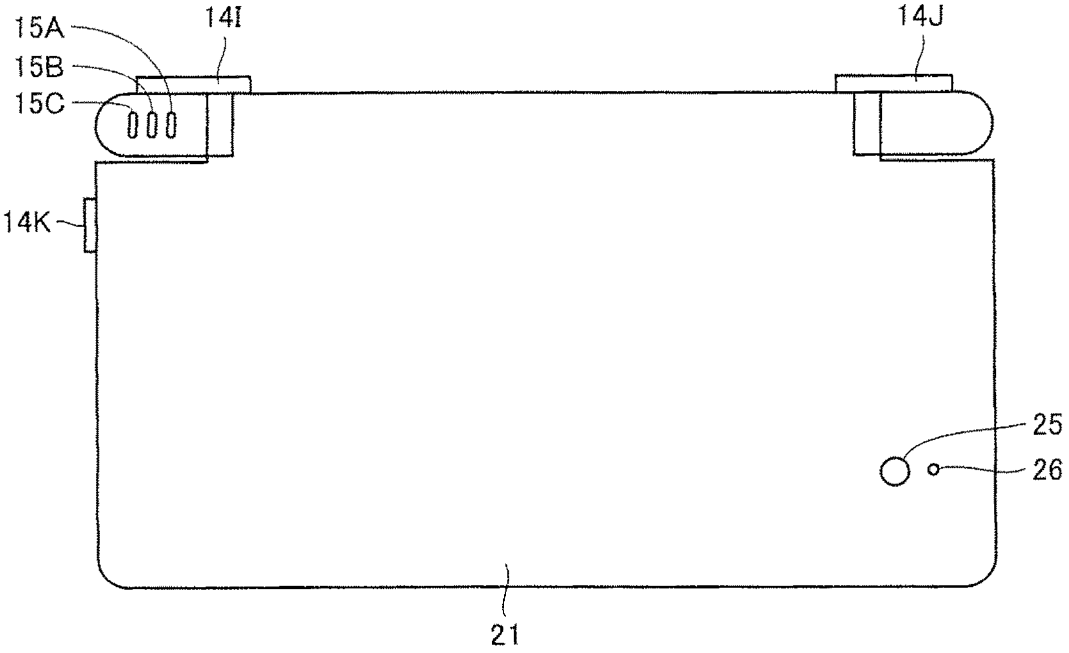
FIG. 2 shows appearance of the game device (folded state) according to the embodiment of the present invention.

Referring to FIGS. 1 and 2, game device 100 according to the present embodiment is a foldable-type portable game device. FIG. 1 shows game device 100 in an unfolded state (opened state) and FIG. 2 shows game device 100 in a folded state (closed state). Game device 100 is configured to have such a size that a user can hold game device 100 with both hands or one hand even in the unfolded state.

Game device 100 has a first housing 11 and a second housing 21. First housing 11 and second housing 21 are coupled to allow opening and closing (be foldable). In the example shown in FIG. 1, first housing 11 and second housing 21 are each formed like a rectangular plate, and they are coupled to each other to be pivotable around a long side portion thereof by means of a hinge.

Normally, the user uses game device 100 in the opened state. On the other hand, game device 100 is closed when the user does not use game device 100. In game device 100, an angle between first housing 11 and second housing 21 can also be maintained at a value between a closed position (substantially 0 degrees) and an opened position (substantially 180 degrees) as necessary. Namely, first housing 11 can rest at any angle with respect to second housing 21. Here, friction force generated in a coupling portion where first housing 11 and second housing 21 are coupled to each other can be utilized. In addition to or instead of the friction force, a latch mechanism may be adopted in the coupling portion where first housing 11 and second housing 21 are coupled to each other.

A first LCD (Liquid Crystal Display) 12 is provided as the display portion (display means) in first housing 11. First LCD 12 has a rectangular shape and it is arranged such that a direction in which its long side extends coincides with a direction in which a long side of first housing 11 extends. In the present embodiment, though an LCD is employed as the display portion (display means), other appropriate display devices such as a display device utilizing EL (Electro Luminescence) may be adopted. In addition, resolution of the display portion (display means) can be designed as appropriate in accordance with an application to be executed.

Buttons 14A to 14K for performing various operations on game device 100 are provided as the input portion (input means) in first housing 11. Among buttons 14A to 14K, a direction input button 14A, an operation button 14B, an operation button 14C, an operation button 14D, an operation button 14E, a power button 14F, a start button 14G, and a select button 14H are provided on an inner main surface of first housing 11, which is located on the inner side when first housing 11 and second housing 21 are folded.

Namely, in exemplary arrangement shown in FIG. 1, direction input button 14A and power button 14F are provided on the main surface on one of left and right sides (left side in FIG. 1) of first LCD 12 provided around the center of the inner main surface of first housing 11. Buttons 14B to 14E, start button 14G, and select button 14H are provided on the inner main surface of first housing 11 on the other of left and right sides (right side in FIG. 1) of first LCD 12.

An L button 14I is provided at a left end portion of an upper side surface of first housing 11, and an R button 14J is provided at a right end portion on the upper side surface of first housing 11. In addition, a volume button 14K is provided on a left side surface of first housing 11.

Direction input button 14A, L button 14I and R button 14J are used, for example, for a selection operation. Buttons 14B to 14E are used, for example, for an enter operation or a cancel operation. Power button 14F is used for turning on/off the power of game device 100. Volume button 14K is used for adjusting a volume of a speaker included in game device 100.

Game device 100 further includes a touch panel 13 as the input portion (input means) different from buttons 14A to 14K. Touch panel 13 is attached to cover a screen of first LCD 12 and detects a coordinate when the user performs an input operation. Namely, touch panel 13 is arranged in correspondence with the display surface of first LCD 12.

For example, a resistive touch panel may be employed as touch panel 13, however, touch panel 13 is not limited to the resistive type and various pressing-type touch panels may be adopted. In addition, resolution (detection accuracy) of touch panel 13 is preferably as high as resolution (display accuracy) of first LCD 12. It is noted, however, that the resolution of touch panel 13 does not necessarily have to be equal to the resolution of first LCD 12.

An insertion opening (shown with a dashed line in FIG. 1) for a touch pen 27 is provided in a right side surface of first housing 11. Touch pen 27 used for performing an input operation on touch panel 13 can be accommodated in the insertion opening. Normally, the input operation on touch panel 13 is performed by using touch pen 27, however, the input operation onto touch panel 13 can be performed also by using a finger of the user or the like instead of touch pen 27.

Moreover, an insertion opening (shown with a chain-double-dotted line in FIG. 1) for accommodating a memory card 28 is provided in the right side surface of first housing 11. A connector (not shown) for electrically connecting game device 100 and memory card 28 with each other is provided in the inside of this insertion opening. Memory card 28 is removably attached to the connector. Memory card 28 is used for reading a program or image data obtained from another information processing device or game device, storing (saving) data of an image photographed and/or subjected to image processing by game device 100, and the like. Memory card 28 is implemented, for example, by a non-volatile storage medium such as an SD (Secure Digital) card.

An insertion opening (shown with a chain-dotted line in FIG. 1) for accommodating a memory card 29 is provided in the upper side surface of first housing 11. A connector (not shown) for electrically connecting game device 100 and memory card 29 with each other is provided in the inside of this insertion opening. Memory card 29 is removably attached to the connector. Memory card 29 stores an application program, a game program or the like.

Three LEDs 15A to 15C are disposed in a portion on the left of the coupling portion of first housing 11 and second housing 21. As will be described later, game device 100 can establish wireless communication with other equipment, and a first LED 15A illuminates when the power of game device 100 is turned on. A second LED 15B illuminates depending on a status of a battery (for example, being charged or a low battery level) of game device 100. A third LED 15C illuminates depending on a status of wireless communication. Therefore, three LEDs 15A to 15C can notify the user of a state of power on/off of game device 100, a state of battery, and a state of wireless communication.

A second LCD 22 is provided in second housing 21 as the display portion (display means). Second LCD 22 has a rectangular shape and it is arranged such that a direction in which its long side extends coincides with a direction in which a long side of second housing 21 extends. As in first LCD 12, another appropriate display device may be employed instead of the LCD. In game device 100, such a configuration that a touch panel serving as the input means (input portion) is attached to cover a screen of first LCD 12 is adopted, however, yet another touch panel may be attached onto a screen of second LCD 22.

In addition, two cameras (an inner camera 23 and an outer camera 25) each serving as the image pick-up means (image pick-up device) are provided in second housing 21. As shown in FIG. 1, inner camera 23 is disposed in an inner main surface of second housing 21 around the coupling portion. On the other hand, as shown in FIG. 2, outer camera 25 is disposed in a surface opposite to the inner main surface where inner camera 23 is disposed, that is, in an outer main surface of second housing 21 (a surface on the outside when game device 100 is in the closed state). In FIG. 1, outer camera 25 is shown with a dashed line.

According to such arrangement, inner camera 23 can pick up an image in a direction in which the inner main surface of second housing 21 faces, and outer camera 25 can pick up an image in a direction opposite to the direction of image pick-up by inner camera 23, that is, in a direction in which the outer main surface of second housing 21 faces.

In this manner, in game device 100 according to the present embodiment, inner camera 23 and outer camera 25 are provided such that the directions of image pick-up are opposite to each other. Therefore, the user can pick up with inner camera 23, an image of the user himself/herself and also can pick up with outer camera 25, an image of a view the user is viewing, while holding game device 100. It is noted that the user can select which camera to use for image pick-up, on a program executed in game device 100.

A microphone (a microphone 43 shown in FIG. 3) is accommodated as an audio input device inside the coupling portion of game device 100. In the inner main surface around the coupling portion of game device 100, a microphone hole 16 is provided such that microphone 43 senses sound around game device 100. A position where microphone 43 is accommodated and a position of microphone hole 16 do not necessarily have to be in the coupling portion of game device 100, and for example, microphone 43 may be accommodated in first housing 11 and microphone hole 16 may be provided in first housing 11 in correspondence with the position of accommodation of microphone 43.

A fourth LED 26 (FIG. 2) is disposed in the outer main surface of second housing 21 at a position proximate to outer camera 25. Fourth LED 26 illuminates depending on a status of image pick-up by outer camera 25. Namely, fourth LED 26 notifies a person or a person nearby in the field that the image pick-up by game device 100 is being performed. More specifically, fourth LED 26 illuminates while outer camera 25 is picking up an image. In addition, fourth LED 26 may blink while a motion picture is being taken (data of picked-up images is continuously stored) by outer camera 25. In order to prevent illumination of the LED from entering the image pick-up screen, fourth LED 26 may be turned off during a period from a time point of instruction of photographing with the camera until completion of storage of the image data obtained by the camera in response to the instruction into a memory or the like.

A sound emission hole 24 is provided in the main surface of second housing 21, on each of left and right sides of second LCD 22 provided around the center of the inner main surface. A speaker (a speaker 45 shown in FIG. 3) serving as an audio output device is accommodated in second housing 21 communicating with sound emission hole 24. Namely, sound emission hole 24 guides sound emitted from speaker 45 to the outside of game device 100.

As described above, first housing 11 is provided with the input portion (touch panel 13 and buttons 14A to 14K) for providing operation inputs to game device 100 as well as first LCD 12 serving as the display means for displaying various images. In addition, second housing 21 is provided with inner camera 23 and outer camera 25 for obtaining image data as well as second LCD 22 serving as the display means for displaying various images.

First LCD 12 and/or second LCD 22 is (are) used for displaying, in real time, an image obtained by inner camera 23 or outer camera 25 as necessary. Namely, first LCD 12 and/or second LCD 22 function(s) as a "finder" in picking up an image with inner camera 23 or outer camera 25. It is noted that an image successively obtained by inner camera 23 or outer camera 25 and displayed on first LCD 12 and/or second LCD 22, that is, an image updated in real time, is also referred to as a "Live image".

<Internal Configuration of Game Device>

Figure 3:
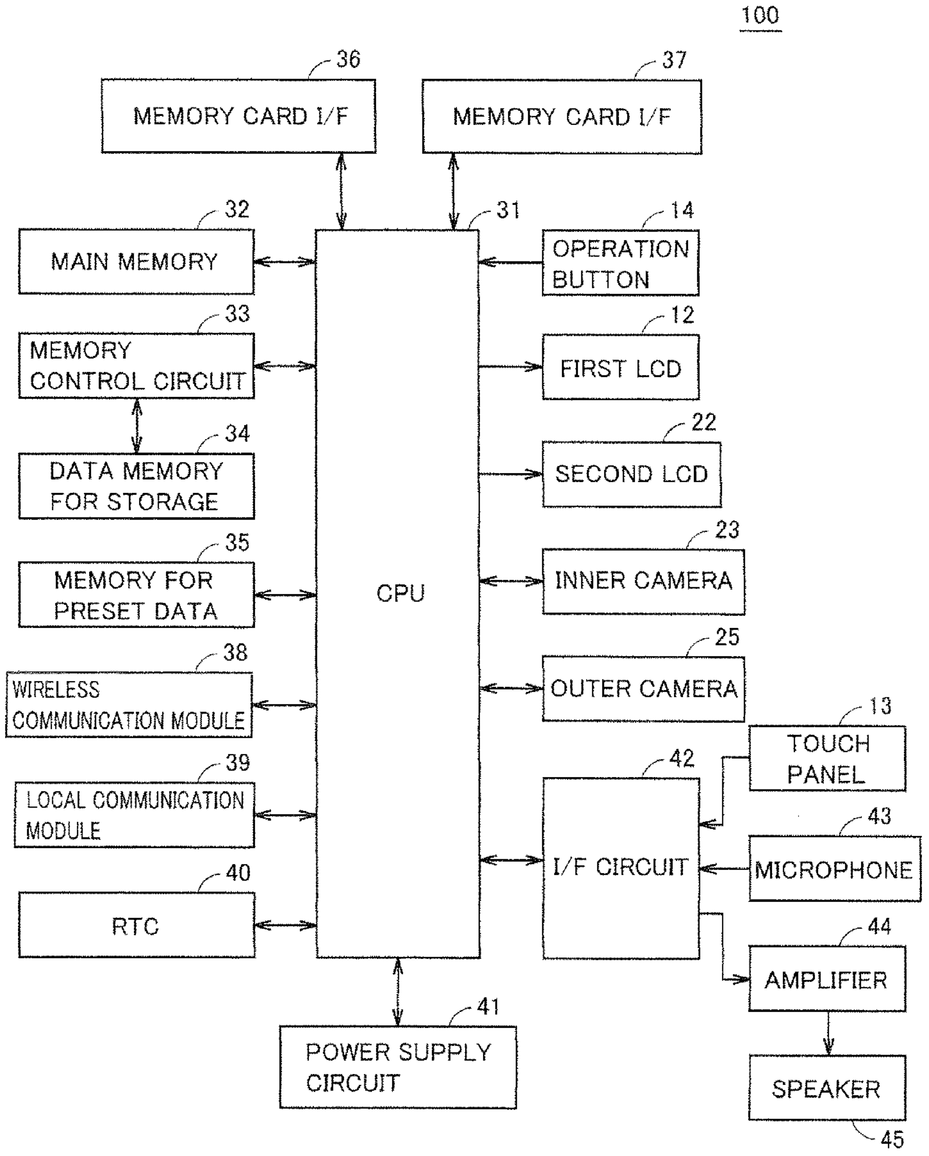
FIG. 3 is a block diagram showing an exemplary internal configuration of the game device according to the embodiment of the present invention.

Referring to FIG. 3, game device 100 includes such electronic parts as a CPU 31, a main memory 32, a memory control circuit 33, a data memory 34 for storage, a memory 35 for preset data, memory card interfaces (memory card I/F) 36 and 37, a wireless communication module 38, a local communication module 39, a real time clock (RTC) 40, a power supply circuit 41, and an interface circuit (I/F circuit) 42. These electronic parts are mounted on an electronic circuit board and accommodated in first housing 11 (or second housing 21).

CPU 31 is an operation processing unit for executing various programs. CPU 31 develops a program stored in any of the memory in game device 100 (typically, data memory 34 for storage), memory card 28 (FIG. 1) and memory card 29 (FIG. 1) on main memory 32, and executes the program. As a result of execution of the program by CPU 31, various types of processing according to the present embodiment which will be described later are provided. As will be described later, the program according to the present embodiment is typically supplied from a distribution server device network-connected through a wired or wireless communication channel to game device 100. The program supplied to game device 100 is stored in data memory 34 for storage.

In addition, CPU 31 has a not-shown VRAM (Video Random Access Memory) for exclusively controlling display on first LCD 12 and second LCD 22. The VRAM temporarily stores image data or the like for displaying various images which will be described later. It is noted that data stored in main memory 32 is transferred to the VRAM, or a file (data) or the like stored in data memory 34 for storage is directly read and the content thereof is written in the VRAM.

Figure 4:
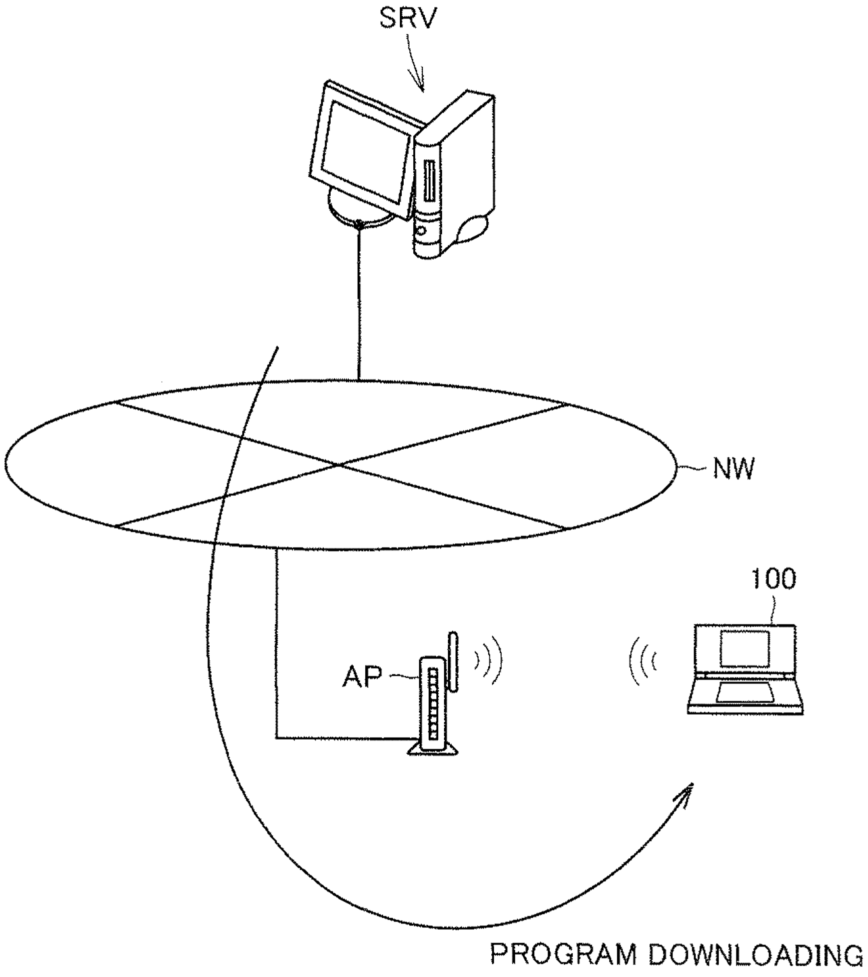
FIG. 4 is a diagram showing a manner of providing a program to the game device according to the embodiment of the present invention.

Referring to FIG. 4, a typical system for distributing a program according to the present embodiment includes a distribution server device SRV connected to a network NW such as the Internet and an access point AP for mediating wireless communication of game device 100 with network NW. Distribution server device SRV holds a plurality of programs including the program according to the present embodiment in a downloadable state, and it starts transmission (downloading) of a requested program in response to access from game device 100 or the like, after a prescribed procedure is completed.

Access point AP is wire-connected to network. NW and establishes wireless connection with wireless communication module 38 (FIG. 3). Game device 100 accesses distribution server device SRV through this access point AP. Receiving the program distributed from distribution server device SRV as described above, CPU 31 of game device 100 causes data memory 34 for storage to store the received program. Transfer to the outside of game device 100, of the program once stored in data memory 34 for storage of game device 100, is in principle prohibited. Therefore, the program once taken into game device 100 is executed only in game device 100. Thus, various settings, parameters and the like can be customized or arranged originally for game device 100, in accordance with records of use or a manner of use by the owner of game device 100.

Instead of the network distribution configuration as shown in FIG. 4, a program may be provided by selling memory card 28 or memory card 29 having the program stored thereon. Here, a non-transitory storage medium for storing the program according to the present invention is not limited to a semiconductor memory device such as memory card 28 or memory card 29, and an optical storage medium such as a CD-ROM or a DVD may be adopted.

Referring again to FIG. 3, main memory 32, memory control circuit 33 and memory 35 for preset data are connected to CPU 31. In addition, data memory 34 for storage is connected to memory control circuit 33.

Main memory 32 is storage means used as a work area or a buffer area of CPU 31. Namely, main memory 32 temporarily stores data used for various types of processing or temporarily stores a program read and developed from data memory 34 for storage, memory card 28, memory card 29, and the like. In the present embodiment, for example, a PSRAM (Pseudo-SRAM) is employed as main memory 32.

Data memory 34 for storage is storage means for storing a program executed by CPU 31, data of images picked up by inner camera 23 and outer camera 25, and the like. Data memory 34 for storage is implemented by a non-volatile storage medium such as a NAND-type flash memory. Memory control circuit 33 is a circuit for controlling reading and writing of data from/to data memory 34 for storage in accordance with an instruction from CPU 31.

Memory 35 for preset data is storage means for storing data such as various parameters set in advance in game device 100 (preset data). A flash memory connected to CPU 31 through an SPI (Serial Peripheral Interface) bus may be employed as memory 35 for preset data.

Memory card I/Fs 36 and 37 are each connected to CPU 31. Memory card I/F 36 performs reading and writing of data from/to memory card 28 attached to the connector in response to an instruction from CPU 31. In addition, memory card I/F 37 performs reading and writing of data from/to memory card 29 attached to the connector in response to an instruction from CPU 31.

In the present embodiment, data of images obtained by inner camera 23 and outer camera 25 or image data obtained from other devices is written in memory card 28 through memory card I/F 36, or image data stored in memory card 28 is read from memory card 28 through memory card I/F 36 and written as a file in data memory 34 for storage. In addition, various programs stored in memory card 29 are read from memory card 29 through memory card I/F 37 and written in main memory 32.

Wireless communication module 38 has a function for connection to wireless LAN, for example, in compliance with IEEE 802.11b/g specifications. In addition, local communication module 39 has a function to establish wireless communication with a game device of a similar type under a prescribed communication scheme. Wireless communication module 38 and local communication module 39 are connected to CPU 31. CPU 31 can transmit and receive data to/from other equipment through a network circuit such as the Internet by using wireless communication module 38, or transmit and receive data to/from another game device of a similar type by using local communication module 39.

In addition, RTC 40 and power supply circuit 41 are connected to CPU 31. RTC 40 counts time and outputs the counted time to CPU 31. For example, CPU 31 is also able to calculate current time (date) or the like based on the time counted by RTC 40. Power supply circuit 41 controls electric power supplied from a power supply of game device 100 (typically, a battery housed in first housing 11) and supplies electric power to each part of game device 100.

Game device 100 further includes I/F circuit 42 connected to CPU 31. Microphone 43, an amplifier 44 and touch panel 13 are connected to I/F circuit 42. I/F circuit 42 includes an audio control circuit for controlling microphone 43 and amplifier 44 (and speaker 45) and a touch panel control circuit for controlling touch panel 13.

Microphone 43 senses voice and sound of the user issued toward game device 100 and outputs an audio signal indicating the sensed voice and sound to I/F circuit 42. Amplifier 44 amplifies the audio signal from I/F circuit 42 and causes the audio signal to be output from speaker 45. Namely, the audio control circuit included in I/F circuit 42 performs A/D conversion of the audio signal sensed by microphone 43 and outputs the result to CPU 31, as well as performs D/A conversion of a signal generated by CPU 31 or the like and outputs the result to amplifier 44. Moreover, the audio control circuit converts the audio signal to audio data in a prescribed format suitable for storage.

In addition, the touch panel control circuit included in I/F circuit 42 generates touch position data based on a detection signal from touch panel 13 and outputs the data to CPU 31. For example, the touch position data includes a coordinate value indicating a position where input to an input surface of touch panel 13 was made (hereinafter also referred to as an "input coordinate"). It is noted that the touch panel control circuit cyclically performs reading of a signal from touch panel 13 and generation of the touch position data in a prescribed period of time. CPU 31 can detect an input coordinate on which the user's input operation of touch panel 13 was performed, by obtaining the touch position data through I/F circuit 42 (touch panel control circuit).

Button 14 collectively represents buttons 14A to 14K described above and it is connected to CPU 31. Operation data indicating a state of input to each of buttons 14A to 14K (whether the button was pressed or not) is output from button 14 to CPU 31. CPU 31 performs processing in accordance with the user's operation of button 14 by obtaining the operation data from button 14.

Inner camera 23 and outer camera 25 are each connected to CPU 31. Inner camera 23 and outer camera 25 pick up an image in response to an instruction from CPU 31 and output data of the image obtained by image pick-up to CPU 31. Each of inner camera 23 and outer camera 25 includes an image pick-up element such as CCD (Charge Coupled Device) or CIS (CMOS Image Sensor) and a peripheral circuit for reading image data obtained by the image pick-up element. For example, CPU 31 issues an image pick-up instruction to any one of inner camera 23 and outer camera 25, and the camera that received the image pick-up instruction outputs the obtained image data to CPU 31.

In addition, first LCD 12 and second LCD 22 are each connected to CPU 31. First LCD 12 and second LCD 22 display an image in response to an instruction from CPU 31. In one embodiment, CPU 31 causes one of first LCD 12 and second LCD 22 to display the image obtained by inner camera 23 or outer camera 25, and causes the other of first LCD 12 and second LCD 22 to display a screen (image) for accepting the user's operation and/or providing the user with operation guidance.

<Overview of Provided Interactive Application>

Initially, overview of an interactive application provided by execution of the program according to the present embodiment will be described with reference to FIG. 5. With the interactive application according to the present embodiment, image display adapted to a case where first housing 11 and second housing 21 are spread on left and right sides when viewed from the user is provided.

Figure 5:
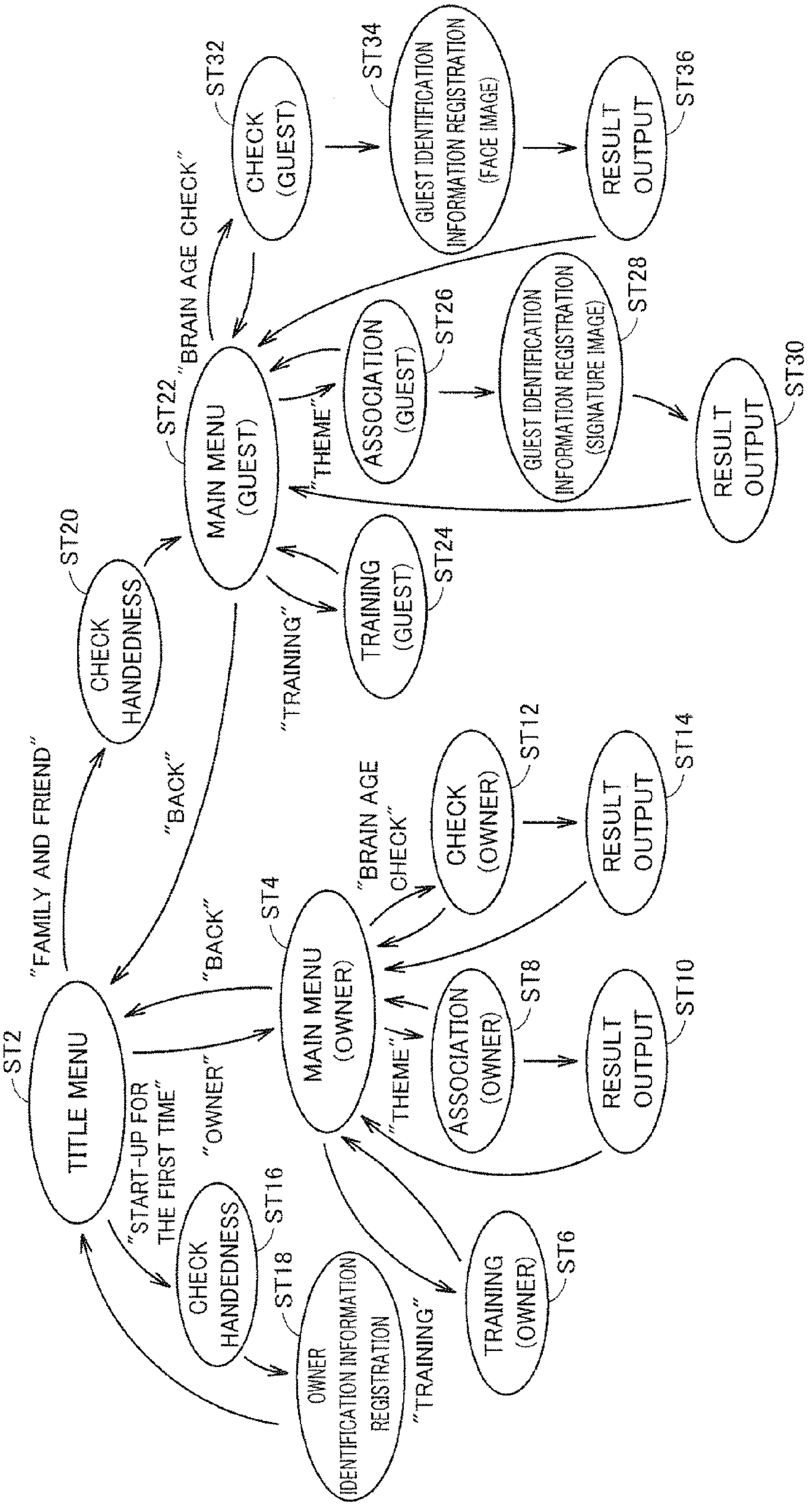
FIG. 5 is a state transition diagram showing overview of an interactive application according to the embodiment of the present invention.

Referring to FIG. 5, initially, when CPU 31 executes the program according to the present embodiment, a state ST2 is set as an initial state. It is noted that game device 100 can selectively execute a program stored within the device, memory card 28, and memory card 29. Accordingly, when power is turned on, initially, a launcher program for selecting a program (application) to be started up is executed in game device 100. The user selects and starts up a desired program on a launcher screen displayed on first LCD 12 and second LCD 22 by executing the launcher program.

Figure 6:
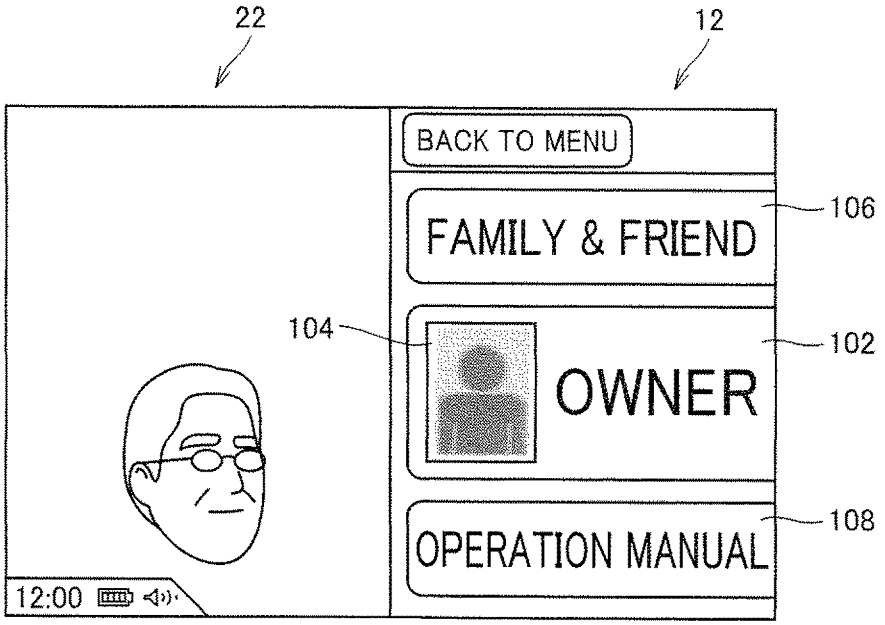
FIG. 6 is a diagram showing an exemplary title menu (at the time of start-up for the first time) according to the embodiment of the present invention.
Figure 7A:
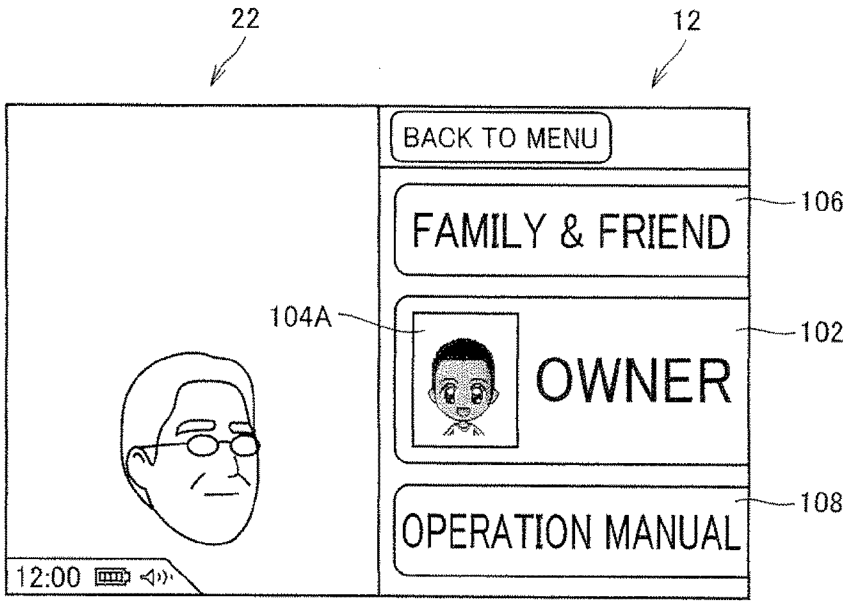
FIGS. 7A and 7B are diagrams showing an exemplary title menu (for the second time or later) according to the embodiment of the present invention.
Figure 7B:
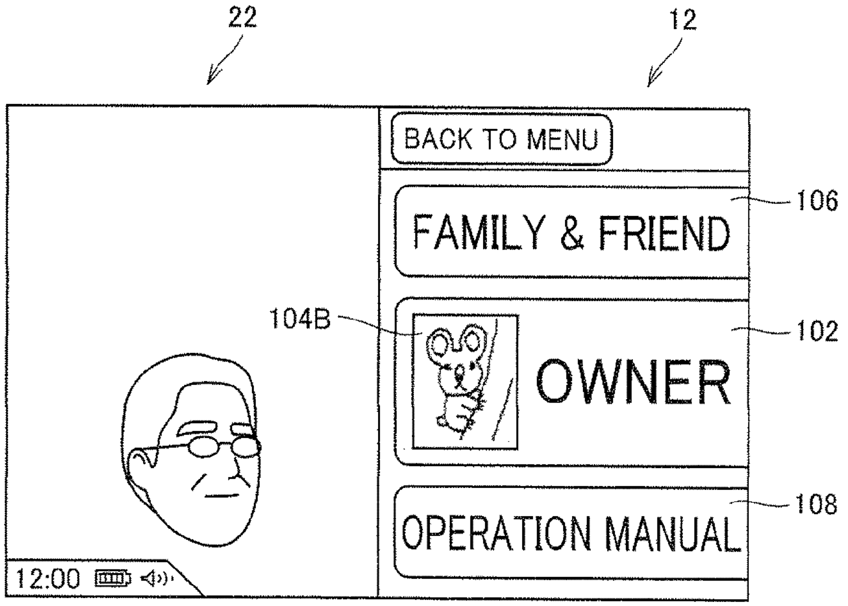

FIG. 6 is a diagram showing an exemplary title menu (at the time of start-up for the first time) according to the embodiment of the present invention. FIGS. 7A and 7B are diagrams showing exemplary title menus (for the second time or later) according to the embodiment of the present invention. It is noted that FIGS. 6, 7A and 7B integrally show the entire images (screen shots) displayed on first LCD 12 and second LCD 22 respectively, for the sake of convenience of illustration. In addition, though FIGS. 6, 7A and 7B show that game device 100 is held such that first LCD 12 is located on the right and second LCD 22 is located on the left when viewed from the user, relative relation between first LCD 12 and second LCD 22 when viewed from the user can be reversed in game device 100 (rotation by 180 degrees). Namely, as will be described later, in which orientation first LCD 12 and second LCD 22 should be located when viewed from the user can be switched, depending on user's handedness. Therefore, depending on a manner of use by the user, display contents on first LCD 12 and display contents on second LCD 22 may be interchanged. This is also the case with different entire images (screen shots) displayed on first LCD 12 and second LCD 22 respectively as shown below.

In game device 100 according to the present embodiment, as touch panel 13 is provided only on first LCD 12, there may be a case that display contents on first LCD 12 and display contents on second LCD 22 are not interchanged. For example, when a user's touch operation input is provided, display contents on first LCD 12 and second LCD 22 are inverted. In addition, when an image is displayed across first LCD 12 and second LCD 22, the entire image is inverted and then the display contents on respective LCDs are interchanged.

Referring to FIG. 6, according to the program of the present embodiment, the interactive application (hereinafter simply also referred to as an "application") proceeds, with use by the owner user of game device 100 (hereinafter simply also referred to as the "owner") being distinguished from use by an unspecified user who is not the owner of game device 100 (hereinafter also referred to as a "guest"). It is noted that a family member, a friend or the like of the owner is assumed as a guest.

Namely, in response to the user's operation on the title menu shown in FIG. 6, one of an owner mode (a first mode) and a guest mode (a second mode) is set and a selected application (or a game) proceeds in accordance with the set mode. More specifically, as an "owner" image 102 displayed on the title menu is touched with touch pen 27, a finger of the user himself/herself, or the like (hereinafter simply also referred to as "touch pen 27 etc."), the owner mode is set. Then, transition among states shown with states ST4 to ST14 (FIG. 5) is made in response to the user's operation. On the other hand, as a "family and friend" image 106 displayed on the title menu is touched with touch pen 27 etc., the guest mode is set. Then, transition among states shown with ST20 to ST36 (FIG. 5) is made in response to the user's operation.

Thus, by executing the program according to the present embodiment, CPU 31 provides a setting function for setting any of the owner mode (first mode) and the guest mode (second mode) in response to the user's operation and a proceeding function for proceeding with the interactive application in response to the user's operation.

It is noted that images 102 and 106 are displayed on first LCD 12, because touch panel 13 serving as the input means is provided only on first LCD 12 in the present embodiment. When the user touches a position on first LCD 12 where image 102 or 106 is displayed with touch pen 27 etc., a corresponding instruction is accepted.

When the owner mode is set, a result obtained by subsequent execution of the application (typically, performance, an image hand-drawn by each user, or the like) is stored in association with the owner. On the other hand, when the guest mode is set, a result obtained by subsequent execution of the application is stored in association with any guest. It is noted that a plurality of guest accounts are preferably prepared.

Thus, by executing the program according to the present embodiment, CPU 31 provides a storage function for storing, in cooperation with data memory 34 for storage, a result obtained by executing the interactive application.

In particular, the result obtained in the owner mode is stored together with the result previously obtained in the owner mode, in association with the owner registered in advance, for chronologically displaying history of results of repeated play of the same application by the owner. In other words, as the play in the owner mode can be regarded as play by a specific user (the owner of game device 100), the results relating to the specific user can consistently be stored and managed.

On the other hand, the results obtained in the guest mode are stored in association with an account of any guest, independently of the results obtained previously in the guest mode. Namely, the results of play of the application in the guest mode are stored each time, in association with the account of any guest. The accounts of the guests, however, are not associated with each other, and hence only a one-time play result is stored for each guest account.

In the account of the owner described above, identification information indicating the owner (hereinafter also referred to as "owner identification information") is registered in advance. Namely, if the owner identification information has not been registered when image 102 is touched with touch pen 27 etc. on the title menu shown in FIG. 6 (state ST2 in FIG. 5), as shown in FIG. 5, processing for checking "handedness" of the owner (state ST16) is performed and thereafter transition to processing for registering the owner identification information (state ST18) is made. The owner identification information registered in this state ST18 includes a face image indicating the owner (a head shot or a self-portrait), a signature of the owner, a date of birth of the owner, and the like. As will be described later, according to the application of the present embodiment, one of the head shot and the self-portrait of the owner can be registered as the face image, depending on whether a situation permits photographing with a camera or not.

Thus, by executing the program according to the present embodiment, CPU 31 provides a first identification information input function for accepting input of owner identification information (first identification information) when the owner identification information (first identification information) has not been stored in the storage means. In addition, by executing the program according to the present embodiment, CPU 31 provides a storage function for storing an image in association with user information and a determination function for determining whether a situation permits photographing with the image pick-up means or not.

Namely, in game device 100 according to the present embodiment, when the owner identification information (first identification information) has been stored in the storage means, an application is started without request of input of new first identification information, whereas when the owner identification information (first identification method) has not been stored in the storage means, the interactive application is started on condition that the first identification information is input.

FIG. 6 shows an exemplary title menu displayed when the application according to the present embodiment is started up for the first time or displayed after the registered owner identification information was initialized (erased). In this case, as owner identification information has not been registered, a default image 104 instead of a face image indicating the owner is displayed in "owner" image 102 in the title menu. When a head shot of the owner is subsequently obtained in processing for registering owner identification information, the title menu as shown in FIG. 7A is displayed. In the title menu shown in FIG. 7A, a head shot 104A indicating the registered owner is displayed in "owner" image 102.

On the other hand, when the owner hand-draws a self-portrait instead of photographing with the camera in the processing for registering owner identification information, the title menu as shown in FIG. 7B is displayed. In the title menu shown in FIG. 7B, a self-portrait 104B of the registered owner is displayed in "owner" image 102.

Figure 8:
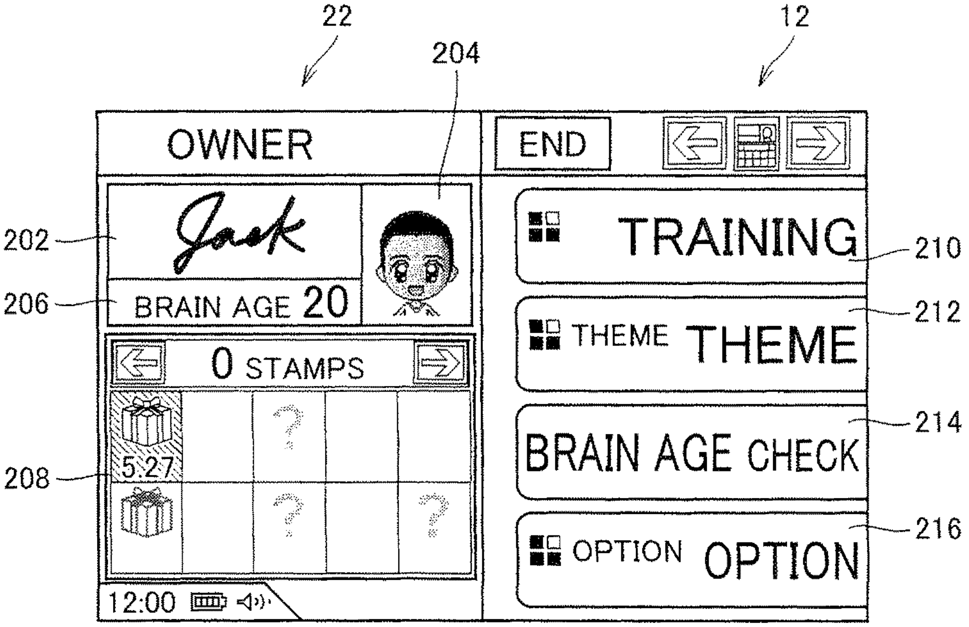
FIG. 8 is a diagram showing an exemplary main menu for an owner according to the embodiment of the present invention.
Figure 9:
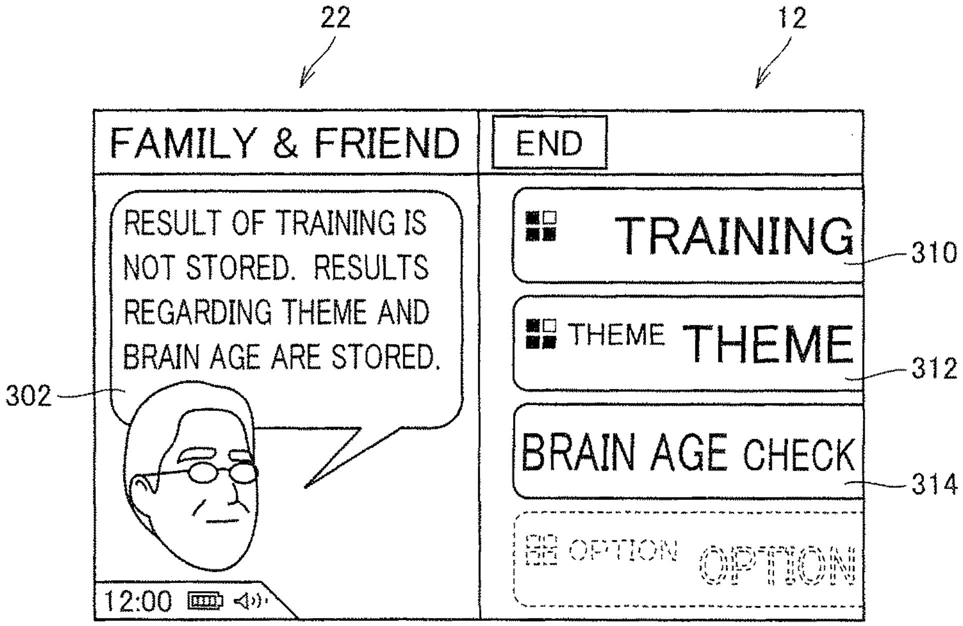
FIG. 9 is a diagram showing an exemplary main menu for a guest according to the embodiment of the present invention.

In addition, when "owner" image 102 is touched with touch pen 27 etc, in the title menu shown in FIGS. 6, 7A and 7B, a main menu for the owner as shown in FIG. 8 is displayed. On the other hand, when "family and friend" image 106 is touched with touch pen 27 etc. in the title menu shown in FIGS. 6, 7A and 7B, processing for checking "handedness" of a current guest (state ST20) is performed and thereafter a main menu for a guest as shown in FIG. 9 is displayed.

In the main menu for the owner shown in FIG. 8, a signature image 202 of the owner and a face image (head shot or self-portrait) 204 of the owner, which represent a part of the owner identification information, are displayed and a part of results obtained by execution of the application by the owner is displayed. More specifically, an image 206 indicating a value of a "brain age" representing a result of a check game which will be described later is displayed and a "stamp" acquisition state 208 indicating records of play of a training game which will be described later is displayed. The "stamp" acquisition state corresponds to history information in accordance with records of play by the user.

In the main menu for the owner shown in FIG. 8, a "training" image 210, a "theme" image 212, a "brain age check" image 214, and an "option" image 216 are further displayed. When "training" image 210 is touched with touch pen 27 etc., the training game which will be described later is started (state ST6 in FIG. 5). A result of this training game is stored in correspondence with the owner. Alternatively, when "theme" image 212 is touched with touch pen 27 etc., an association game which will be described later is started (state ST8 in FIG. 5). A result of this association game is stored in correspondence with the owner and displayed on first LCD 12 and/or second LCD 22 (state ST10 in FIG. 5). Alternatively, when "brain age check" image 214 is touched with touch pen 27 etc., a check game which will be described later is started (state ST12 in FIG. 5). A result of this check game is stored in correspondence with the owner and displayed on first LCD 12 and/or second LCD 22 (state ST14 in FIG. 5). When "option" image 216 is touched with touch pen 27 etc., various types of processing other than the game are performed.

Thus, by executing the program according to the present embodiment, CPU 31 provides a first display control function for displaying result data in the owner mode in correspondence with the owner identification information (first identification information).

On the other hand, in the main menu for the guest shown in FIG. 9, a notification image 302 as well as a "training" image 310, a "theme" image 312 and a "brain age check" image 314 are displayed.

Notification image 302 shows a message notifying the user that a result of the training game played by the guest is not stored but a result of the association game and the check game is stored.

When "training" image 310 is touched with touch pen 27 etc., the training game which will be described later is started (state ST24 in FIG. 5). A result of this training game is merely displayed and not stored. It is noted that a content (a scenario) itself of the training game provided to the guest is substantially the same as the content of the training game provided to the owner. Alternatively, when "theme" image 312 is touched with touch pen 27 etc., the association game which will be described later is started (state ST26 in FIG. 5). A result of this association game is stored in correspondence with any of a plurality of guest accounts prepared in advance. Here, identification information indicating a guest who actually played the game (hereinafter also referred to as "guest identification information") is registered (state ST28 in FIG. 5). The guest identification information registered in this state ST28 includes a signature of the guest and the like. The result of the association game is stored in correspondence with the registered guest (guest identification information) and displayed on first LCD 12 and/or second LCD 22 (state ST30 in FIG. 5). Alternatively, when "brain age check" image 314 is touched with touch pen 27 etc., the check game which will be described later is started (state ST32 in FIG. 5). A result of the check game is stored in correspondence with any of the plurality of guest accounts prepared in advance. Here, the guest identification information for specifying the guest user who actually played the game is registered (state ST34 in FIG. 5). The guest identification information registered in this state ST34 includes a face image (head shot or self-portrait) indicating the guest and the like. It is noted that one of the head shot and the self-portrait can be selected and registered as the face image indicating the guest, depending on whether a situation permits photographing with the camera or not, as in registration of the face image indicating the owner described above. A result of the check game is stored in correspondence with the registered guest (guest identification information) and displayed on first LCD 12 and/or second LCD 22 (state ST36 in FIG. 5).

Thus, by executing the program according to the present embodiment, CPU 31 provides a second identification information input function for accepting input of guest identification information (second identification information) indicating the user who executed the interactive application each time the interactive application is executed while the guest mode (second mode) is set and a second display control function for causing result data in the guest mode to be displayed in correspondence with the guest identification information (second identification information).

<Data Structure>

Figure 10:
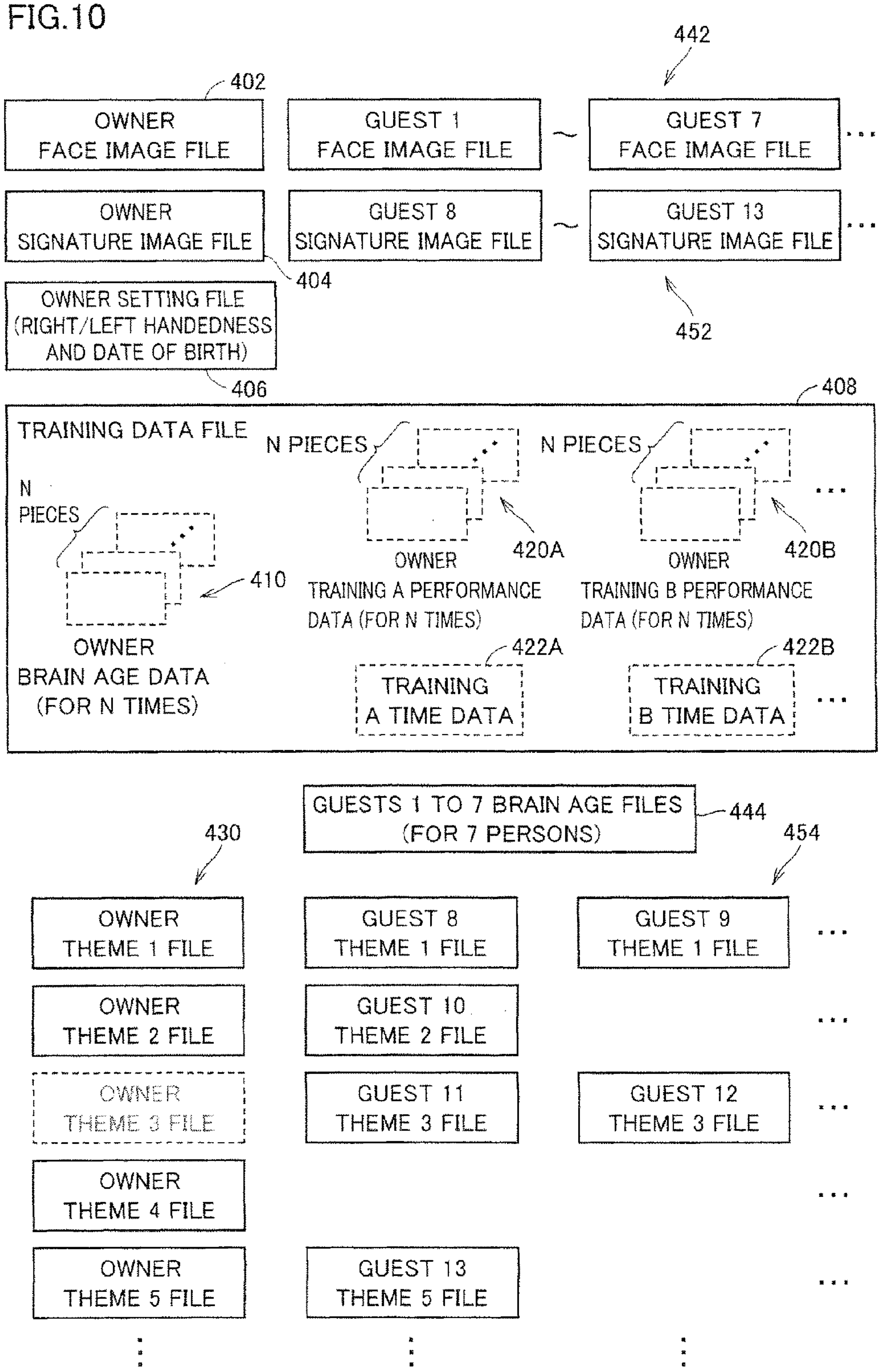
FIG. 10 is a diagram showing a file structure used with an application according to the embodiment of the present invention.

Referring to FIG. 10, game device 100 stores an owner_face image file 402, an owner_signature image file 404, an owner_setting file 406, a training data file 408, an owner_theme file 430, a guest_face image file 442, a guest_signature image file 452, a guest_brain age file 444, and a guest_theme file 454. It is noted that these files are in principle stored in data memory 34 for storage or memory 35 for preset data (FIG. 3).

Contents of the owner identification information are stored in owner_face image file 402, owner_signature image file 404 and owner_setting file 406. More specifically, image data representing the face image (head shot or self-portrait) of the owner is stored in owner_face image file 402. Image data representing a signature handwritten by the owner is stored in owner_signature image file 404. Handedness setting and a date of birth of the owner are stored in owner_setting file 406.

Results of the training game and the check game which will be described later are stored in training data file 408. More specifically, owner_brain age data 410 indicating a result of the check game for N days is stored in training data file 408. Namely, owner_brain age data 410 corresponds to a data group indicating results of the check game for N days. It is noted that the results of the check game typically include such a value as "20" years of age and information on time (time and day of play) when the check game was played. In addition, owner_training A performance data 420A and owner_training A time data 422A, owner_training B performance data 420B and owner_training B time data 422B, . . . are stored in training data file 408, in correspondence with training games A, B, . . . prepared in advance, respectively. For example, performance of training A (typically, time required for finishing a calculation game, percentage of correct answers, and the like) is stored in owner_training A performance data 420A. The total time required for play of training A is stored in owner_training A time data 422A. Hereinafter, owner_training A performance data 420A, training B performance data 420B, . . . are collectively referred to as "owner_training performance data 420," and owner_training A time data 422A, owner_training B time data 422B, . . . are collectively referred to as "owner_training time data 422."

Image data (camera image or hand-drawn image) or audio data brought in correspondence with a "theme" (themes 1, 2, . . . ) prepared in advance for the association game which will be described later is stored in owner_theme file 430. As owner_theme file 430 is generated when the association game is played, owner_theme file 430 is not generated for a "theme" which has not yet been played. It is noted that null files may be generated in advance in correspondence with all "themes" prepared in advance and a file of interest may be updated in accordance with a result of play of the association game.

Contents of the guest identification information are stored in guest_face image file 442 and guest_signature image file 452. It is noted that seven guest_face image files 442 are prepared for seven guests in total of guest 1 to guest 7 respectively, and a prescribed number of (for example, five) guest_signature image files 452 are prepared for each "theme" (themes 1, 2, . . . ) prepared in advance. As will be described later, guest_face image file 442 is used for association with the guest in storing a result of play of the check game by the user other than the owner, and guest_signature image file 452 is used for association with the guest in storing a result of play of the association game by the user other than the owner. Namely, the results obtained when the same user actually played the check game and the association game as the guest are handled as results of guests independent of each other.

More specifically, image data representing the face image (head shot or self-portrait) of the guest is stored in each guest_face image file 442. Image data representing a signature handwritten by the guest is stored in each guest_signature image file 452. It is noted that handedness setting or a date of birth is not registered for the guest, as in the case of the owner.

The results of the check game for seven persons are stored in guest_brain age file 444, in correspondence with the accounts of guests 1 to 7, respectively. It is noted that the result of each guest represents in principle a value obtained in one check game. In addition, each result brought in correspondence with the account of each of guests 1 to 7 is handled independently.

Image data (camera image or hand-drawn image) or audio data brought in correspondence with a "theme" (themes 1, 2, . . . ) prepared in advance for the association game which will be described later is stored in guest_theme file 454. Guest_signature image file 452 is generated in association with each guest_theme file 454 on one-to-one basis. Therefore, when the same user plays different "themes", independent guest_signature image files 452 are generated for respective results of play. Namely, guest_theme file 454 and guest_signature image file 452 can both independently store results of play of each "theme" prescribed number of times (for example, for five persons).

When the user is caused to input a plurality of pieces of image data (camera image or hand-drawn image) or audio data for one "theme" or when the user is caused to successively play a plurality of "themes", resultant plurality of guest_theme files 454 may be brought in correspondence with the same guest_signature image file 452 (that is, n to 1). In such a case, guest_signature image file 452 input at the beginning of consecutive plays may commonly be employed.

It is noted that the "brain age" values of guests 1 to 7 stored in guest_brain age file 444 are associated with guests 1 to 7 of which face images are stored in guest_face image file 442, respectively. Therefore, if eight or more guests play the check game, a result of any guest should be erased. Here, for example, when guest 1 is an erase target, "guest 1_brain age file" and "the brain age value of guest 1" stored in guest_brain age file 444 are both erased (or overwritten).

Similarly, guest_theme file 454 about each "theme" is associated with guest_signature image file 452 on one-to-one basis. Therefore, when guests in number exceeding a prescribed number (for example, five) play the association game, a result of any guest should be erased. Here, for example, when guest 8 is an erase target, "guest 8_theme 1 file" and "guest 8_signature image file" brought in correspondence therewith are both erased (or overwritten).

In addition, in the present embodiment, three interactive applications of the check game, the training game and the theme are prepared, and result data is stored in association with the owner or the guest(s), independently of each interactive application.

<Processing for Checking Handedness>

As described above, with the application according to the present embodiment, mainly, game device 100 is held for use in such a state that first housing 11 and second housing 21 are spread on left and right sides when viewed from the user. Here, in game device 100, touch panel 13 serving as the input means is provided on first housing 11. Accordingly, preferably, a position of touch panel 13 relative to the user is switched in accordance with user's handedness (right handedness or left handedness). Namely, for a right-handed user, touch panel 13 is preferably located on the right side, whereas for a left-handed user, touch panel 13 is preferably located on the left side. According to the application of the present embodiment, for the owner, his/her handedness is checked immediately before registration of the owner identification information (state ST16 in FIG. 5) and for a guest, his/her handedness is checked at the timing regarded as start of use by a new guest (for example, immediately before display of the main menu) (state ST20 in FIG. 5).

Figure 11:
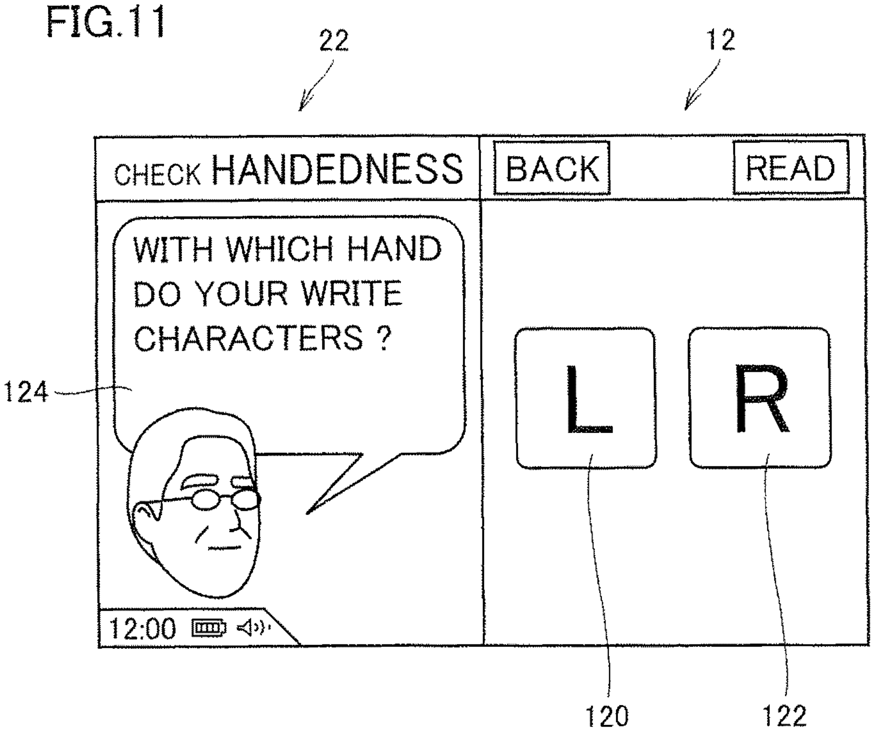
FIG. 11 is a diagram showing a screen display example for checking handedness according to the embodiment of the present invention.

When the owner mode is selected and when owner identification information (owner_face image file 402, owner_signature image file 404 and owner_setting file 406 shown in FIG. 10) has not been registered (typically, at the time of start-up of the application for the first time), a screen for checking handedness as shown in FIG. 11 is displayed. In addition, when the guest mode is selected as well, a screen for checking handedness as shown in FIG. 11 is displayed.

In the screen shown in FIG. 11, together with a notification image 124 inviting the user to input handedness, an "R" image 122 for accepting selection of right handedness and an "L" image 120 for accepting selection of left handedness are displayed.

Figure 12A:
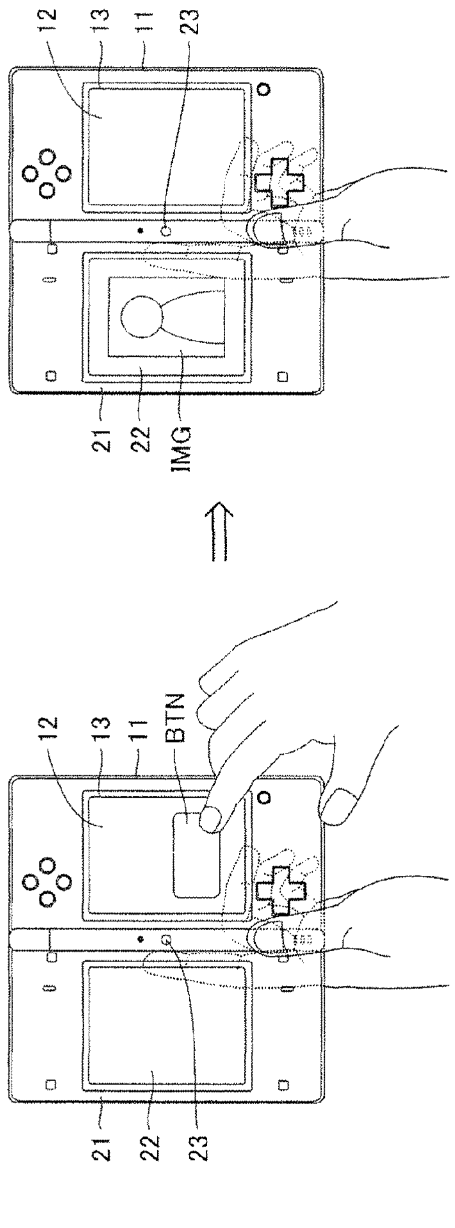
FIGS. 12A and 12B are diagrams showing a manner of use of the game device according to the embodiment of the present invention.
Figure 12B:
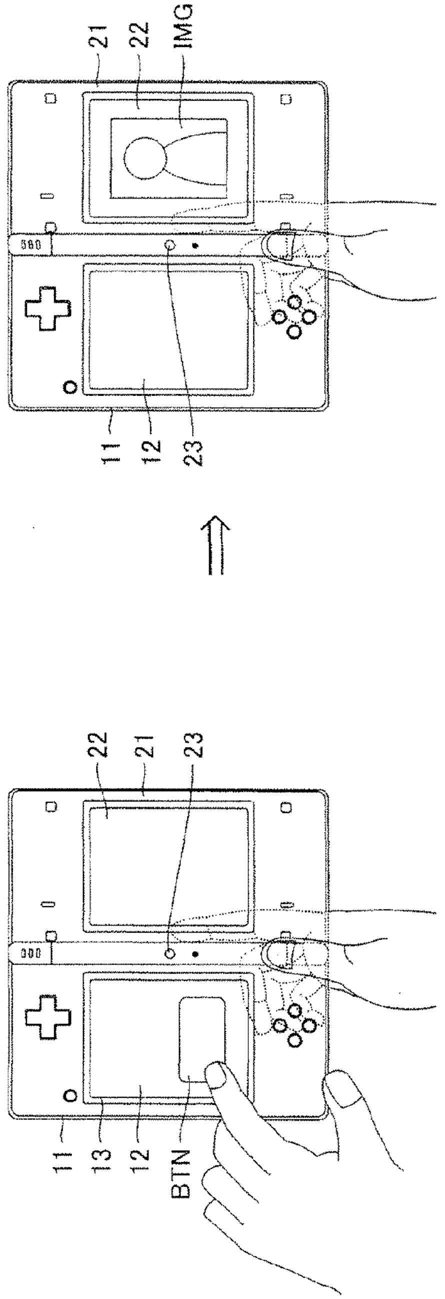

When one of "R" image 122 and "L" image 120 is touched with touch pen 27 etc., transition to screen display in accordance with a manner of use as shown in FIG. 12A or 12B is made. FIG. 12A shows a manner of use when the user is right-handed (when "R" image 122 is selected) and FIG. 12B shows a manner of use when the user is left-handed (when "L" image 120 is selected).

Referring to FIG. 12A, typically, the right-handed user can hold game device 100 with his/her left forefinger abutting second housing 21. Then, the right-handed user performs the input operation on touch panel 13 provided in first housing 11 with the right hand or touch pen 27 operated with the right hand.

On the other hand, referring to FIG. 12B, typically, the left-handed user can hold game device 100 with his/her right forefinger abutting first housing 11. Then, the left-handed user performs the input operation on touch panel 13 provided in first housing 11 with the left hand or touch pen 27 operated with the left hand. Namely, the orientation in which the left-handed user holds game device 100 corresponds to the orientation rotated by 180 degrees from the orientation in which the right-handed user holds game device 100.

By using game device 100 in a manner as described above, visual recognition of display contents on second LCD 22 provided in second housing 21 will not be blocked by the input operation, regardless of whether the user is either right-handed or left-handed.

As described above, as touch panel 13 is provided in first housing 11, an instruction image BTN representing a button or the like for accepting a user's input operation is displayed on first LCD 12, regardless of whether the user is either right-handed or left-handed. A direction of display, however, should be rotated by 180 degrees in accordance with the user's handedness, as in the direction in which game device 100 is held.

In addition, game device 100 incorporates a camera (inner camera 23 and outer camera 25) as described above. Inner camera 23 is arranged such that a face portion of the user is included in its field while the user holds game device 100. Accordingly, the user's head shot obtained by this inner camera 23 is used as the owner identification information or as the guest identification information. Such a camera image IMG obtained through image pick-up by the camera is displayed on second LCD 22 provided in second housing 21 in many cases. Such camera image IMG should also be rotated by 180 degrees in accordance with the user's handedness.

Namely, as can be seen from comparison between FIGS. 12A and 12B, at least instruction image BTN and camera image IMG are displayed after they are rotated by 180 degrees in accordance with the user's handedness.

<Processing for Image Pick-Up/Display in Accordance with Handedness>

As described above, the direction in which the user holds game device 100 is rotated by 180 degrees, depending on the user's handedness. Here, relative relation between inner camera 23 arranged in the coupling portion of second housing 21 and second LCD 22 is not varied. Therefore, in order to display camera image IMG in correspondence with any of FIGS. 12A and 12B, image data obtained through image pick-up by inner camera 23 may be read in a fixed direction and displayed on second LCD 22, regardless of the direction in which game device 100 is held.

If such a scheme is adopted, however, the orientation of data of the image photographed by inner camera 23 is rotated by 180 degrees in accordance with the direction in which game device 100 is held. Therefore, in displaying (reproducing) or editing the data of the image thus photographed, rotation correction in accordance with the direction in which game device 100 is held at the time of photographing should be carried out. Accordingly, processing in an operation for displaying or editing photographed image data may become complicated.

In game device 100 according to the present embodiment, regardless of the direction in which game device 100 is held, the image data is rotated by 180 degrees as necessary such that the subject (typically, the user himself/herself holding game device 100) faces the same direction and the resultant image data is stored. More specifically, a direction of reading the image data from inner camera 23 is switched such that the user's face that appears in the image data picked up by inner camera 23 while the right-handed user holds game device 100 and the user's face that appears in the image picked up by inner camera 23 while the left-handed user holds game device 100 are oriented in the same direction.

Figure 13A:
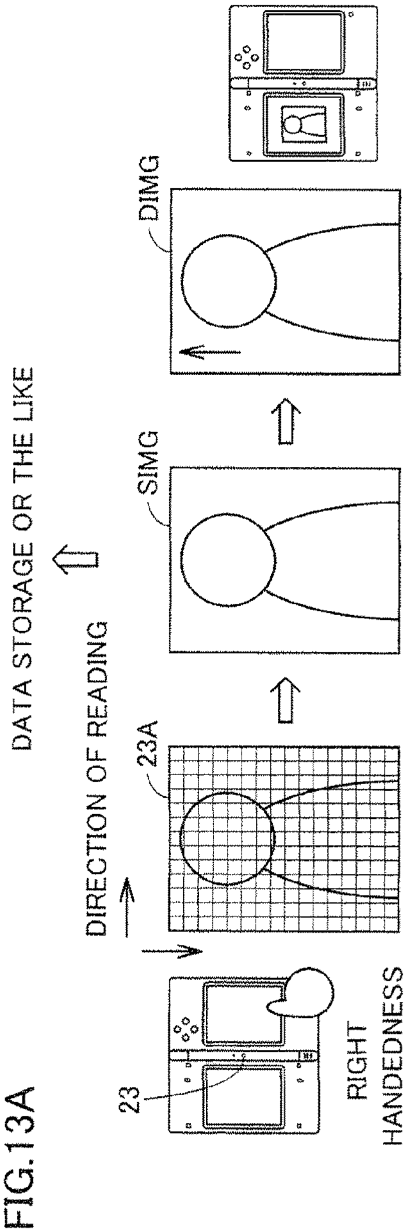
FIGS. 13A and 13B are diagrams for illustrating overview of processing for image pick-up/display with the use of an inner camera according to the embodiment of the present invention.
Figure 13B:
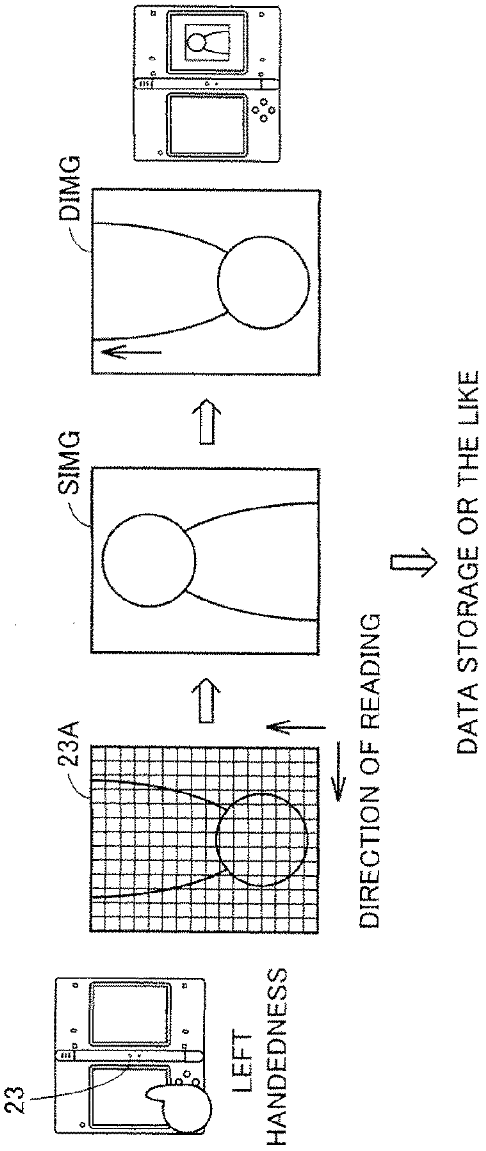
Figure 14A:
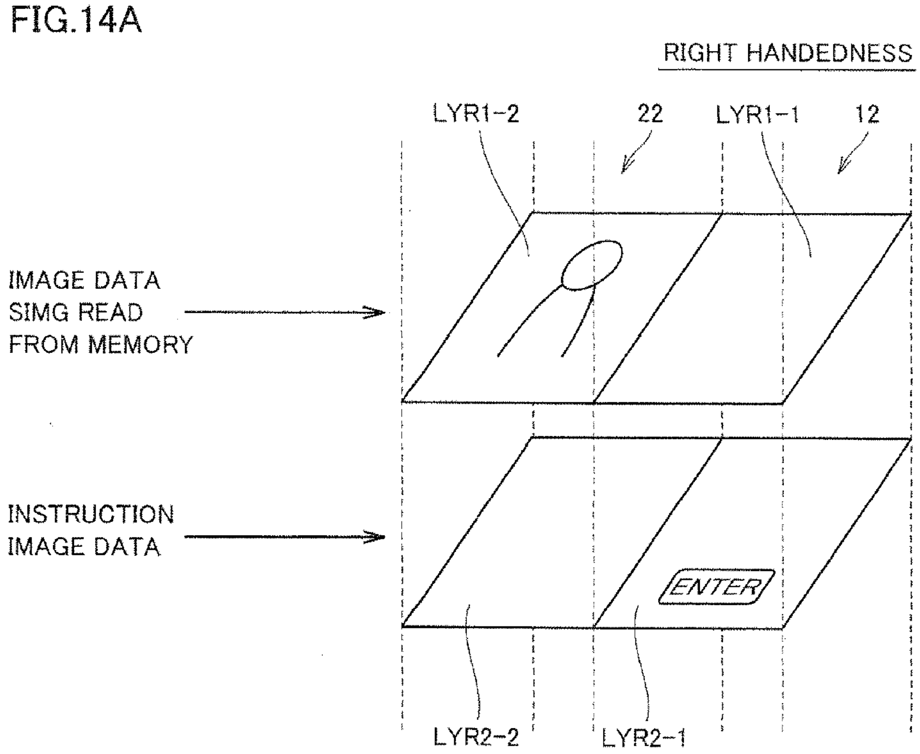
FIGS. 14A and 14B are diagrams for illustrating display processing according to the embodiment of the present invention.
Figure 14B:
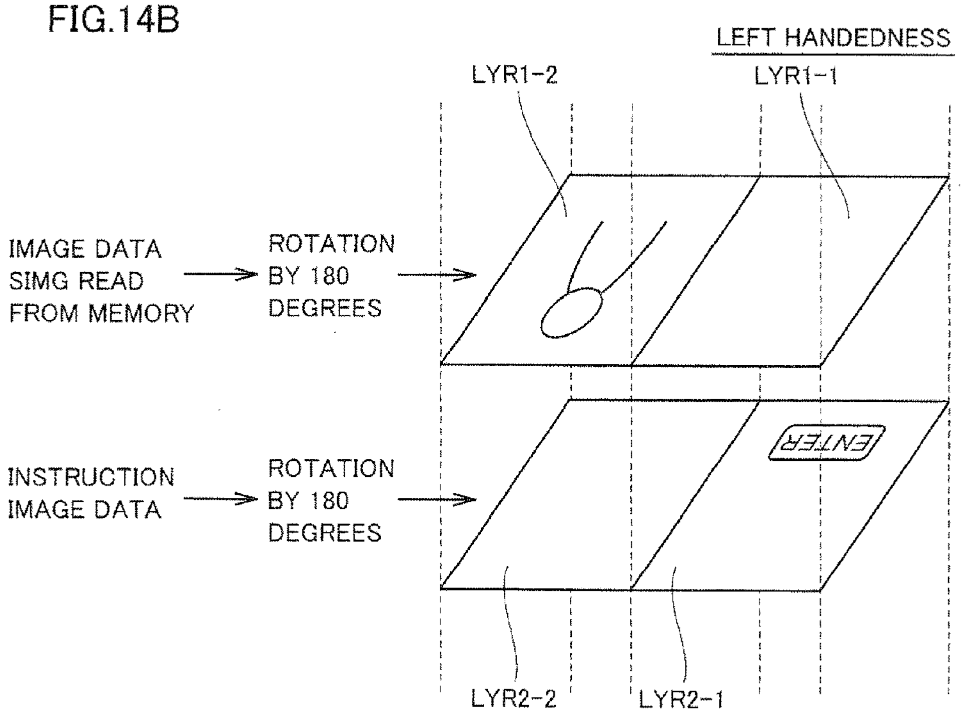

FIGS. 13A and 13B are diagrams for illustrating overview of processing for image pick-up/display with the use of the inner camera according to the embodiment of the present invention. FIGS. 14A and 14B are diagrams for illustrating display processing according to the embodiment of the present invention. It is noted that FIGS. 13A and 13B and FIGS. 14A and 14B are based on the manner of use where the user is right-handed, however, they may be based on the manner of use where the user is left-handed.

Referring to FIG. 13A, it is assumed that, when the right-handed user holds game device 100, an image of the subject (the user himself/herself holding game device 100) is incident on an image pick-up element 23A of inner camera 23, with his/her head up in the drawing. Then, image data representing the image is successively read from image pick-up element 23A, with the upper left end of the drawing being defined as the starting point and the lower right end of the drawing being defined as the end point.

According to such a configuration, when the left-handed user holds game device 100, an image of the subject (the user himself/herself of game device 100) is incident on image pick-up element 23A of inner camera 23, with his/her head down in the drawing, as shown in FIG. 13B. Here, image data representing the image is successively read from image pick-up element 23A, with the lower right end of the drawing being defined as the starting point and the upper left end of the drawing being defined as the end point.

By switching between the directions of reading from image pick-up element 23A as described above, the user himself/herself of game device 100 always appears in the same orientation on image data SIMG stored in main memory 32 or data memory 34 for storage, regardless of the direction in which game device 100 is held.

In addition, in displaying such image data SIMG on first LCD 12 and/or second LCD 22, read image data SIMG is rotated by 180 degrees as necessary and then displayed. For example, as shown in FIG. 13A, it is assumed that read image data SIMG is displayed with its orientation remaining the same when the right-handed user holds game device 100. Then, as shown in FIG. 13B, when the left-handed user holds game device 100, read image data SIMG is displayed in the orientation after rotation by 180 degrees. Namely, when right handedness is set, read image data SIMG is displayed as camera image DIMG identical in the orientation, whereas when left handedness is set, read image data SIMG is displayed as camera image DIMG having the orientation rotated by 180 degrees.

In addition, the instruction image representing the button or the like for accepting the user's input operation is also displayed after it is rotated by 180 degrees as necessary. Processing for displaying the camera image and the instruction image will be described hereinafter with reference to FIGS. 14A and 14B.

FIG. 14A shows processing when right handedness is set, while FIG. 14B shows processing when left handedness is set.

As shown in FIGS. 14A and 14B, in game device 100, a video signal for displaying an image on first LCD 12 and second LCD 22 is generated with the use of a plurality of layers. More specifically, a video signal for display control for first LCD 12 is generated by a layer LYR1-1 reflecting a camera image and LYR2-1 reflecting an instruction image (e.g. ENTER). Similarly, a video signal for display control for second LCD 22 is generated by a layer LYR1-2 reflecting a camera image and LYR2-2 reflecting an instruction image. It is noted that each of layers LYR1-1 to 2-2 is provided by allocating a memory area sufficiently large for display on first LCD 12 or second LCD 22 in the VRAM (not shown) within CPU 31.

It is noted that such different layers are provided for the camera image and the instruction image because the camera image should be updated in a relatively short cycle, whereas it is not necessary in principle to update the instruction image unless some kind of event occurs. Namely, the layers are provided in order to efficiently utilize machine resources required for image processing (for example, polygon processing and the like), in accordance with a necessary update cycle. It is noted that a single layer may realize rendering processing in an example where hardware having sufficient image processing capability is employed or the like.

By way of example, a case where the instruction image is displayed on first LCD 12 and the camera image is displayed on second LCD 22 will be described.

Referring to FIG. 14A, when right handedness is set, image data SIMG read from the memory is written in an area corresponding to layer LYR1-2 with its orientation being maintained. In addition, the instruction image data is also written in an area corresponding to layer LYR2-1 with its orientation being maintained. In this example, no data is written in areas corresponding to layers LYR1-1 and LYR2-2.

On the other hand, referring to FIG. 14B, when left handedness is set, image data SIMG read from the memory is written in the area corresponding to layer LYR1-2 with its orientation being rotated by 180 degrees. In addition, the instruction image data is also written in the area corresponding to layer LYR2-1 with its orientation being rotated by 180 degrees, as compared with the case where right handedness is set.

It is noted that a frame image (border) may be displayed around the camera image. In that case, frame image data stored in advance in data memory 34 for storage or the like is written in the area corresponding to layer LYR2-2. When left handedness is set, frame image data is also written in the area corresponding to layer LYR2-2 with its orientation being rotated by 180 degrees as compared with the case where right handedness is set.

Figure 15:
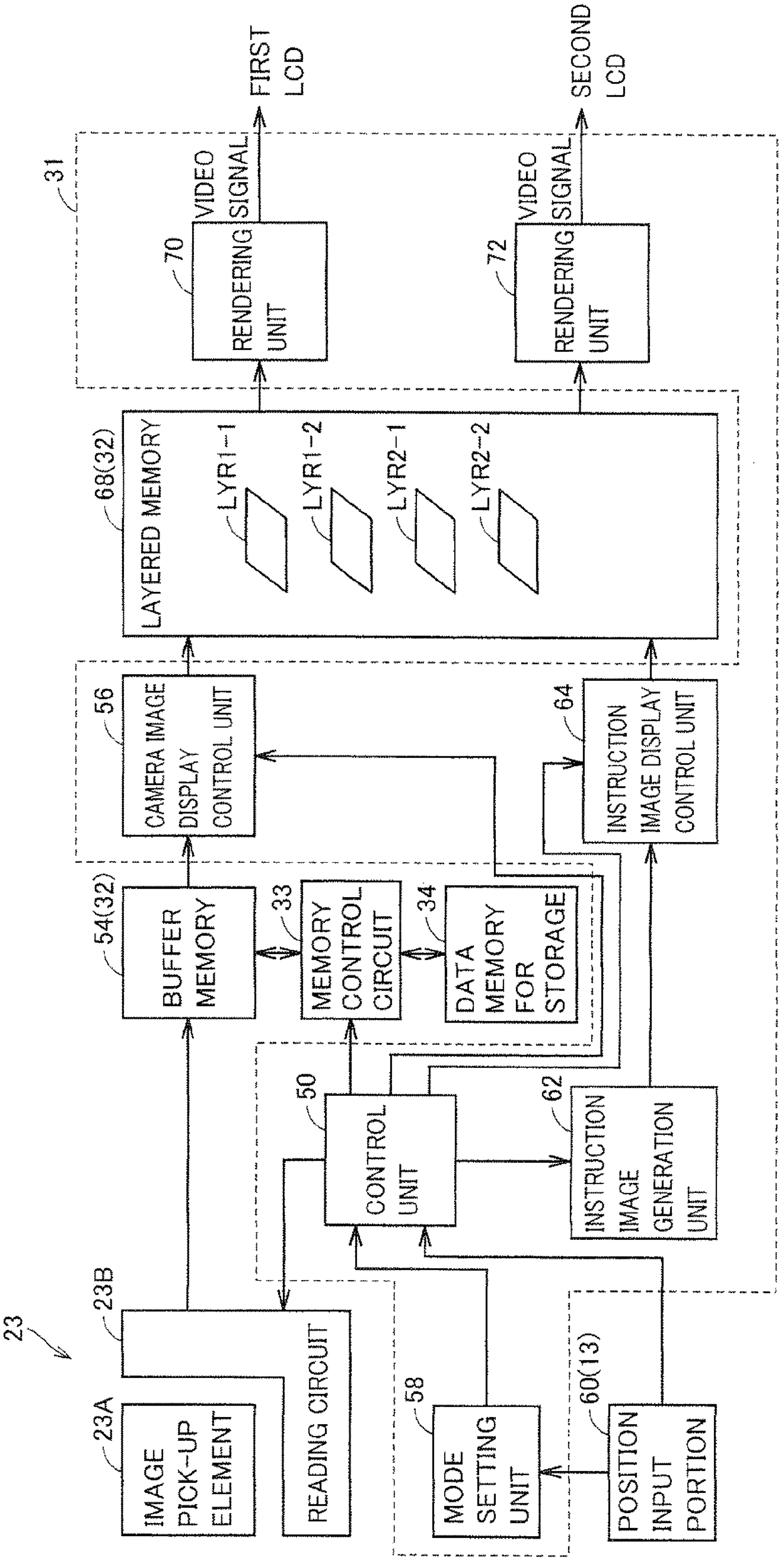
FIG. 15 is a block diagram for providing image pick-up/display processing in accordance with handedness according to the embodiment of the present invention.

FIG. 15 is a block diagram for providing image pick-up/display processing in accordance with handedness according to the embodiment of the present invention.

Referring to FIG. 15, game device 100 includes, as its control structure, inner camera 23, a control unit 50, a buffer memory 54, a camera image display control unit 56, a mode setting unit 58, a position input portion 60, an instruction image generation unit 62, an instruction image display control unit 64, a layered memory 68, and rendering units 70 and 72. Among these control blocks, buffer memory 54 and layered memory 68 are provided by securing a prescribed area in main memory 32 (FIG. 3). Control unit 50, camera image display control unit 56, mode setting unit 58, instruction image generation unit 62, instruction image display control unit 64, and rendering units 70 and 72 are provided by execution of the program by CPU 31. In addition, position input portion 60 is mainly provided by touch panel 13 (FIG. 3).

Inner camera 23 includes image pick-up element 23A receiving light from a subject and a reading circuit 23B for reading image data in accordance with an image obtained by light reception by image pick-up element 23A in a prescribed order. Reading circuit 23B outputs image data representing the image picked up by image pick-up element 23A. Here, reading circuit 23B reads the image data obtained by image pick-up element 23A in accordance with the direction of reading indicated by control unit 50. By switching between the directions of reading, the orientation of the image data output from reading circuit 23B can be rotated by 180 degrees as necessary. The image data output from reading circuit 23B is written in buffer memory 54. It is noted that an instruction onto a prescribed position accepted by position input portion 60 includes a user's touch operation or the like of a shutter button or the like displayed on first LCD 12.

Buffer memory 54 serves as a storage portion for temporarily storing image data obtained by image pick-up element 23A and it is connected to camera image display control unit 56 and memory control circuit 33.

Camera image display control unit 56 causes at least one of first LCD 12 and/or second LCD 22 to display the image data (camera image) obtained by inner camera 23. More specifically, camera image display control unit 56 writes image data stored in buffer memory 54 into a corresponding layer within layered memory 68, in response to an instruction from control unit 50. Here, camera image display control unit 56 writes the image data in an orientation indicated by control unit 50. By switching between the orientations of writing, the orientation of the camera image displayed on first LCD 12 and/or second LCD 22 can be rotated by 180 degrees as necessary.

Control unit 50 outputs a capture instruction (shutter instruction) to memory control circuit 33, in accordance with the instruction onto the prescribed position accepted by position input portion 60. Memory control circuit 33 causes data memory 34 for storage, which is a non-volatile storage medium, to store image data having been stored in buffer memory 54 as a file, in response to the capture instruction from control unit 50.

Instruction image generation unit 62 generates instruction image data for accepting the user's input operation as the application proceeds and outputs the instruction image data to instruction image display control unit 64. Instruction image display control unit 64 causes first LCD 12 to display the instruction image in a prescribed area thereof. More specifically, instruction image display control unit 64 writes instruction image data generated by instruction image generation unit 62 in a corresponding layer held in layered memory 68, in response to an instruction from control unit 50. Here, instruction image display control unit 64 writes the instruction image data in the orientation indicated by control unit 50. By switching between the orientations of writing, the orientation of the instruction image displayed on first LCD 12 can be rotated by 180 degrees as necessary.

Mode setting unit 58 sets any of a right handedness mode and a left handedness mode, in response to a user's instruction through position input portion 60 or the like. Control unit 50 is notified of the mode set by this mode setting unit 58.

In response to the instruction of a position on first LCD 12, position input portion 60 emits the instruction of that position to control unit 50.

Control unit 50 controls, in a centralized manner, reading circuit 23B, camera image display control unit 56 and instruction image display control unit 64, in accordance with the mode set by mode setting unit 58. In addition, control unit 50 provides an instruction in accordance with the user's operation also to memory control circuit 33. Namely, when the left handedness mode is set, control unit 50 controls reading circuit 23B such that camera image data is output in the orientation rotated by 180 degrees as compared with a case where the right handedness mode is set and controls camera image display control unit 56 such that the camera image data output from reading circuit 23B (that is, the image data stored in buffer memory 54) is displayed in the orientation further rotated by 180 degrees. In addition, when the left handedness mode is set, control unit 50 controls instruction image display control unit 64 such that the instruction image is displayed in the orientation rotated by 180 degrees as compared with the case where the right handedness mode is set.

<Processing for Registering Owner Identification Information>

Processing for registering owner identification information (state ST18) in the state transition diagram shown in FIG. 5 will now be described.

If owner identification information is not registered when "owner" image 102 (FIG. 6) displayed on the title menu is touched with touch pen 27 etc., processing for checking handedness of the owner described above is performed and thereafter transition to the processing for registering owner identification information (state ST18 in FIG. 5) is made. In this processing for registering owner identification information, an initial value of the "brain age" of the owner, a face image (head shot or self-portrait) of the owner, a signature of the owner, a date of birth of the owner, and the like are registered.

Namely, owner_face image file 402, owner_signature image file 404 and owner_setting file 406 shown in FIG. 10 are created.

Figure 16:
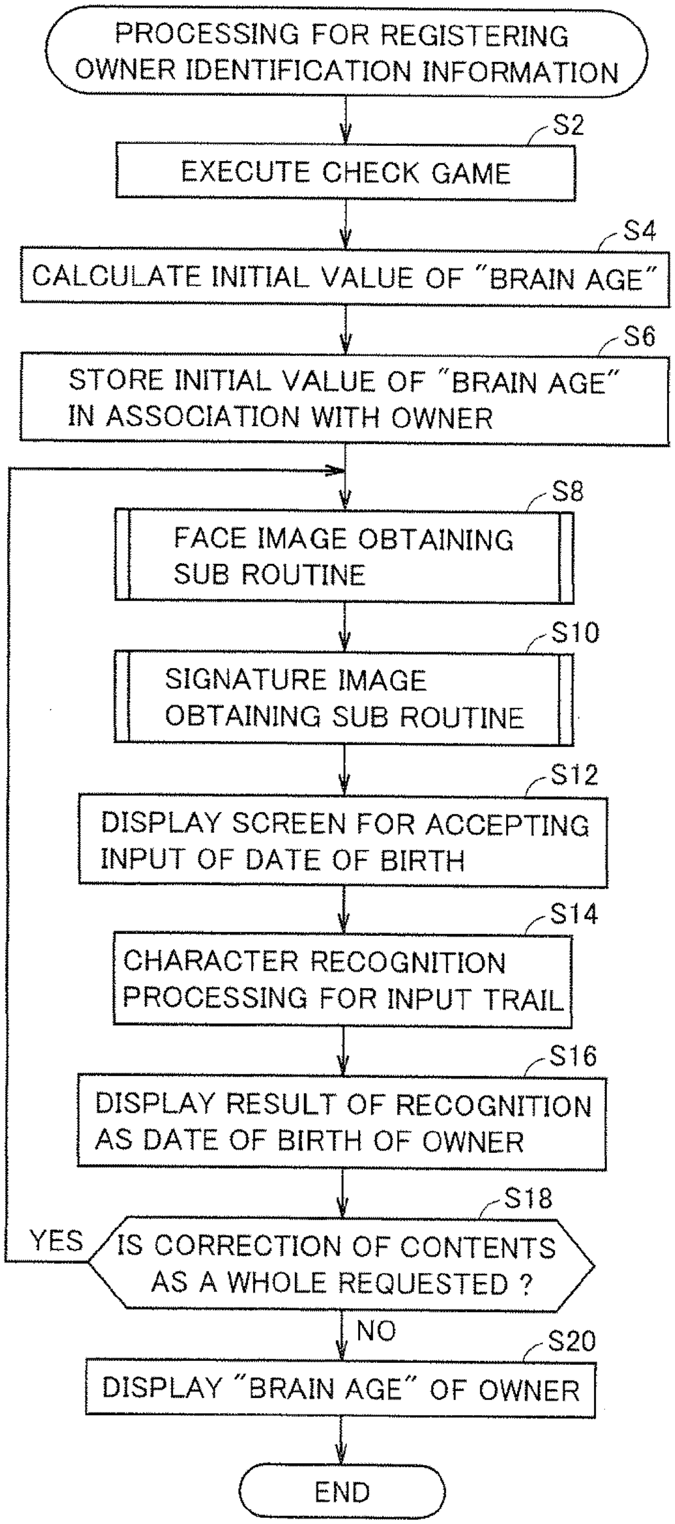
FIG. 16 is a flowchart showing a processing procedure of processing for registering owner identification information according to the embodiment of the present invention.
Figure 19:
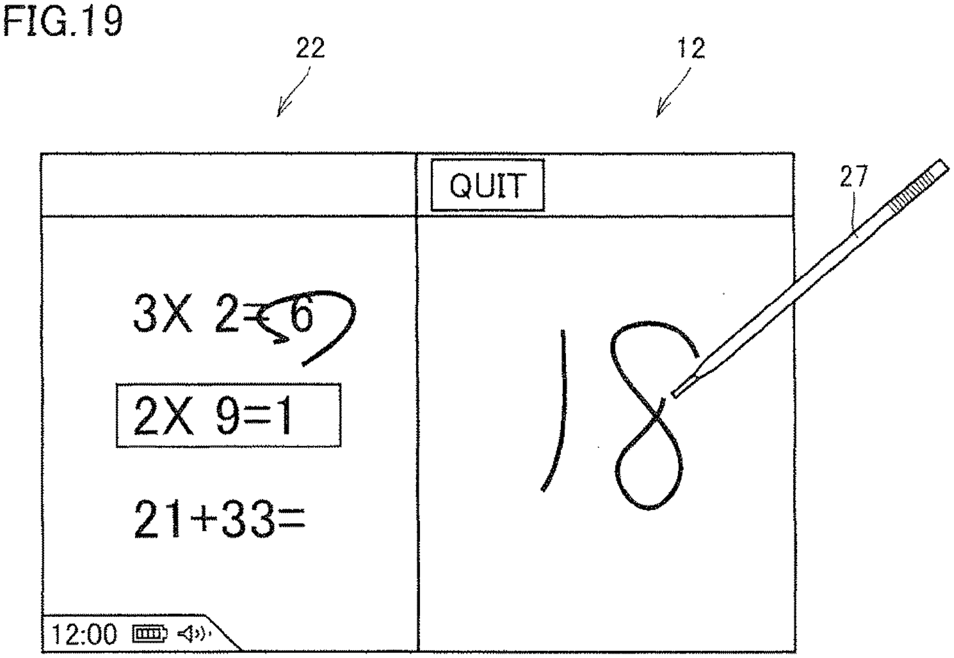
FIGS. 19 to 27 are diagrams showing screen display examples involved with the processing for registering owner identification information according to the embodiment of the present invention.

Overview of the processing for registering owner identification information according to the present embodiment will be described with reference to FIG. 16. In step S2, CPU 31 executes the check game. More specifically, CPU 31 selects one check game or a plurality of check games among a plurality of check games prepared in advance and executes the game(s). FIG. 19 shows one example of the check game. FIG. 19 shows a calculation game by way of example of the check game. More specifically, CPU 31 randomly reads image data representing questions (background data or object data) from data memory 34 for storage or the like and causes second LCD 22 to successively display the image data. In the example shown in FIG. 19, such questions as "3×2=", "2×9=" and "21+33=" are displayed in alignment in a vertical direction on second LCD 22. When the user writes an answer to the question on first LCD 12 by using touch pen 27 etc., CPU 31 causes first LCD 12 to display an image in accordance with a touch trail detected by touch panel 13. At the same time, CPU 31 performs character recognition processing on the touch trail. In addition, CPU 31 checks a result of recognition against a correct answer of the question, and when the answer matches with the correct answer, CPU 31 causes second LCD 22 to display a correct answer mark "O" over the image representing the question. If the answer does not match with the correct answer, a correction input is accepted for a prescribed period of time. If the answer does not still match with the correct answer, transition to a next question is made. When transition to the next question is made, CPU 31 provides such an effect that the entire image displayed on second LCD 22 moves upward in the screen, and randomly reads image data representing a new question from data memory 34 for storage. Then, a newly read question is displayed in a lowermost portion on second LCD 22.

Similar processing is thus performed for subsequent questions, and when all questions are finished, the present calculation game ends. It is noted that various games other than the calculation game described above may be executed a plurality of times as the check game. In addition, a game in which utterance of the user is obtained through microphone 43 and subjected to voice recognition processing and a result of recognition is utilized may be included in the check game. In this case, selection as to whether a situation permits utterance of the user or not may be accepted in advance. In addition, prior to start of the check game, explanation of the check game may be displayed in order to assist a user's play operation.

Referring again to FIG. 16, in step S4, CPU 31 calculates an initial value of the "brain age" of the user (in this case, the owner) in accordance with prescribed criteria, based on a time required for the check game and results (performance) such as the number of correct answers/incorrect answers. In subsequent step S6, CPU 31 has the calculated initial value of the "brain age" stored in association with the owner. Namely, CPU 31 has the initial value of the "brain age" stored in owner_brain age data 410, together with the current time information (data on time and day).

Regarding the timing of storage of the initial value of the "brain age" together with the current time information (data on time and day) in owner_brain age data 410, it may be stored simultaneously with display (step S20) of the obtained "brain age" of the owner which will be described later.

In step S8, CPU 31 executes a face image obtaining sub routine to obtain a face image of the owner.

Figure 17:
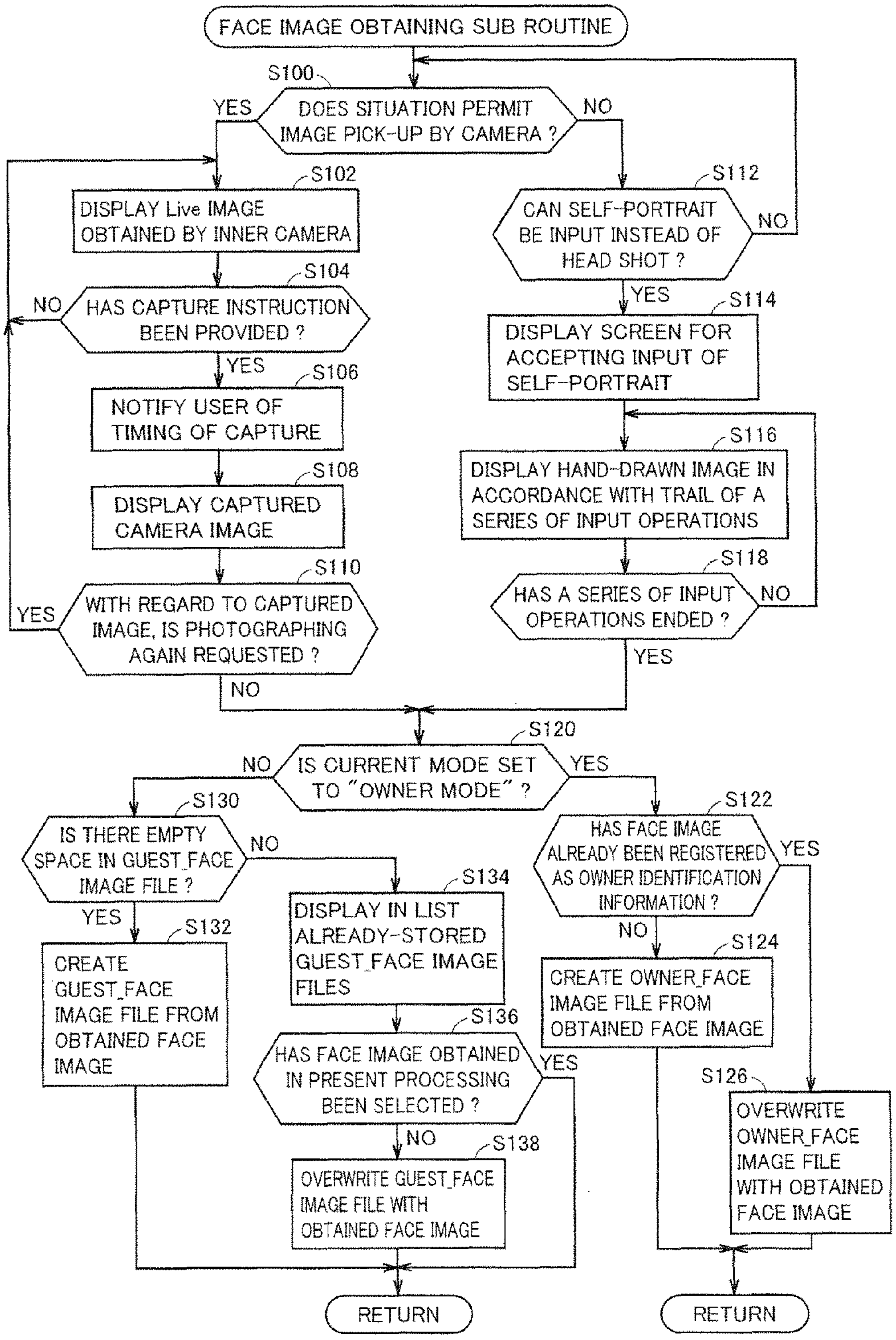
FIG. 17 is a flowchart showing a processing procedure in a face image obtaining sub routine according to the embodiment of the present invention.

Here, the processing in the face image obtaining sub routine will be described with reference to FIG. 17. It is noted that the face image obtaining sub routine shown in FIG. 17 is executed also in changing the contents in the already-registered owner identification information and in registering a guest face image which will be described later.

Figure 20:
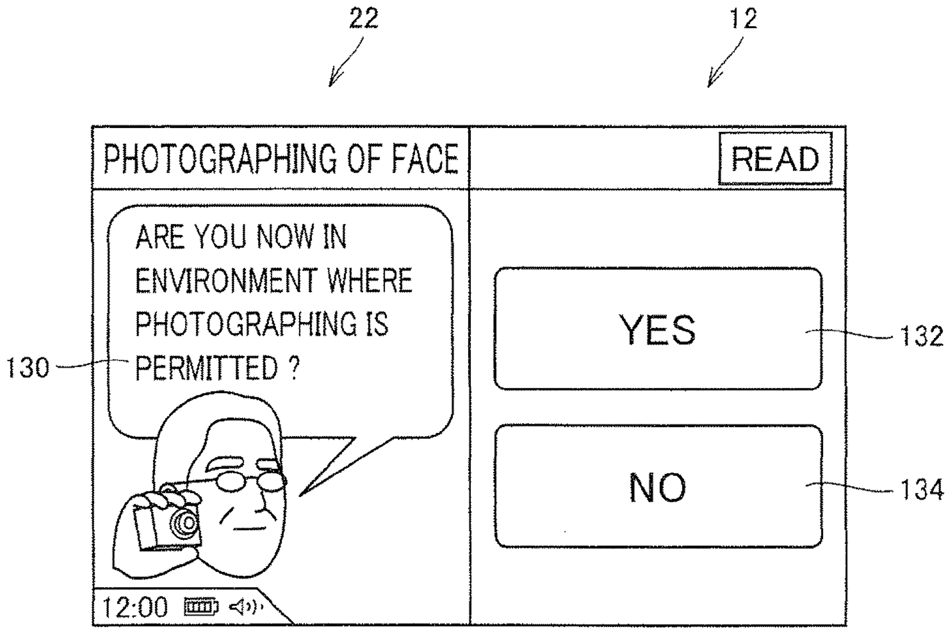

Initially, CPU 31 determines whether a situation permits image pick-up by the camera or not (step S100). More specifically, CPU 31 causes first LCD 12 and second LCD 22 to display a notification image inviting the user to make selection as to whether a situation permits image pick-up or not. FIG. 20 shows an exemplary screen displayed on first LCD 12 and second LCD 22 in step S100. In the screen shown in FIG. 20, a notification image 130 inviting the user to make selection as to whether a situation permits image pick-up or not as well as a "YES" image 132 for accepting an instruction that the situation permits image pick-up and a "NO" image 134 for accepting an instruction that the situation does not permit image pick-up are displayed.

When "YES" image 132 is touched with touch pen 27 etc., CPU 31 determines that the situation permits image pick-up by the camera (YES in step S100). Then, the process proceeds to step S102. On the other hand, when "NO" image 134 is touched with touch pen 27 etc., CPU 31 determines that the situation does not permit image pick-up by the camera (NO in step S100). Then, the process proceeds to step S112.

Instead of the configuration as described above that whether the situation permits image pick-up by the camera or not is determined based on the user's operation, CPU 31 may automatically make such determination. For example, a quantity of light received by the image pick-up element may be detected and image pick-up may be prohibited when the quantity is equal to or lower than a prescribed value, or if an image pick-up device has a face recognition function, image pick-up may be prohibited when a face cannot be recognized with that function.

Figure 21:
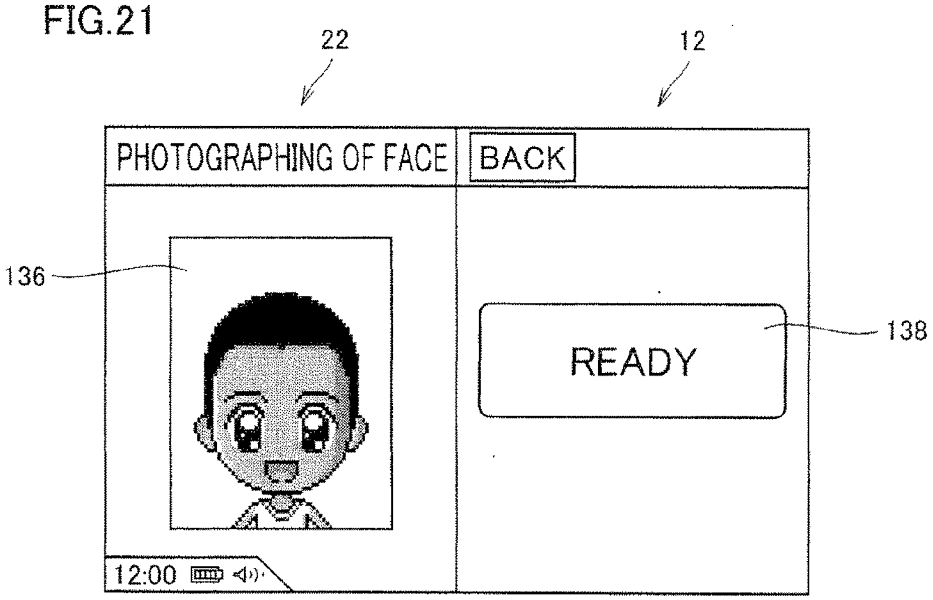

In step S102, CPU 31 has a Live image obtained by inner camera 23 displayed. In subsequent step S104, CPU 31 determines whether the user has provided a capture instruction (shutter instruction) or not FIG. 21 shows an exemplary screen displayed on first LCD 12 and second LCD 22 in steps S102 and S104. In the screen shown in FIG. 21, a Live image 136 obtained by inner camera 23 is displayed and a "ready" image 138 for accepting the capture instruction is displayed.

When "ready" image 138 is touched with touch pen 27 etc., CPU 31 determines that the capture instruction has been provided (YES in step S104). Then, the process proceeds to step S106. On the other hand, unless "ready" image 138 is touched with touch pen 27 etc., CPU 31 determines that the capture instruction has not been provided (NO in step S104). Therefore, the processing in steps S102 and S104 is repeated until "ready" image 138 is touched with touch pen 27 etc.

Figure 22:
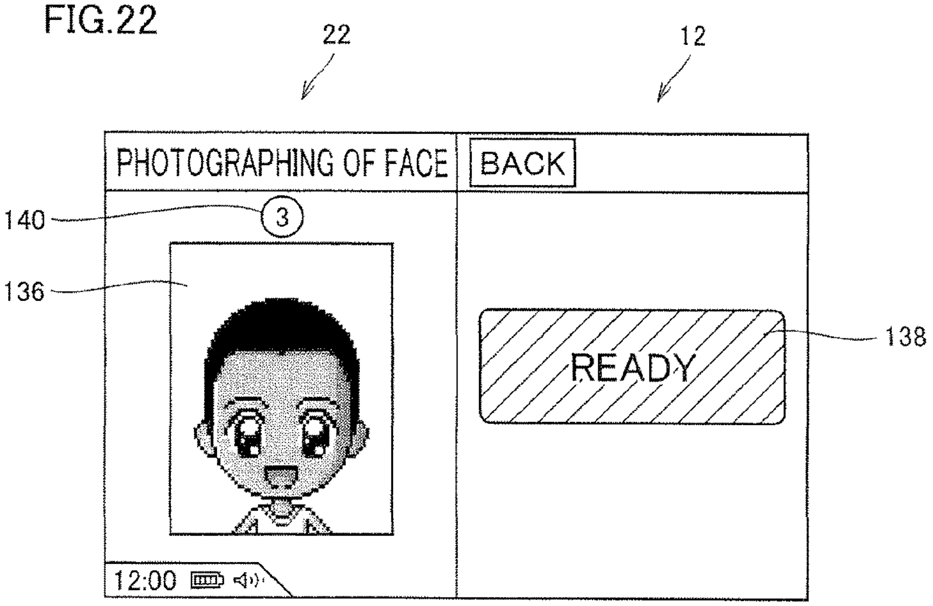

In step S106, CPU 31 notifies the user of timing of capture during a period from the time point when the capture instruction was provided until image data obtained by inner camera 23 is captured. FIG. 22 shows an exemplary screen displayed on first LCD 12 and second LCD 22 in step S106. In the screen shown in FIG. 22, Live image 136 obtained by inner camera 23 is displayed and a notification image 140 showing a remaining time until capture by inner camera 23 is displayed. It is noted that display contents in notification image 140 are updated over time to display "3", "2" and "1" in accordance with the remaining time until capture. Such update is made in order to suppress occurrence of "camera shake" originating from the user's touch operation on touch panel 13. Namely, the user securely holds game device 100 in accordance with displayed notification image 140, so that occurrence of camera shake at the timing of capture can be suppressed.

Figure 23:
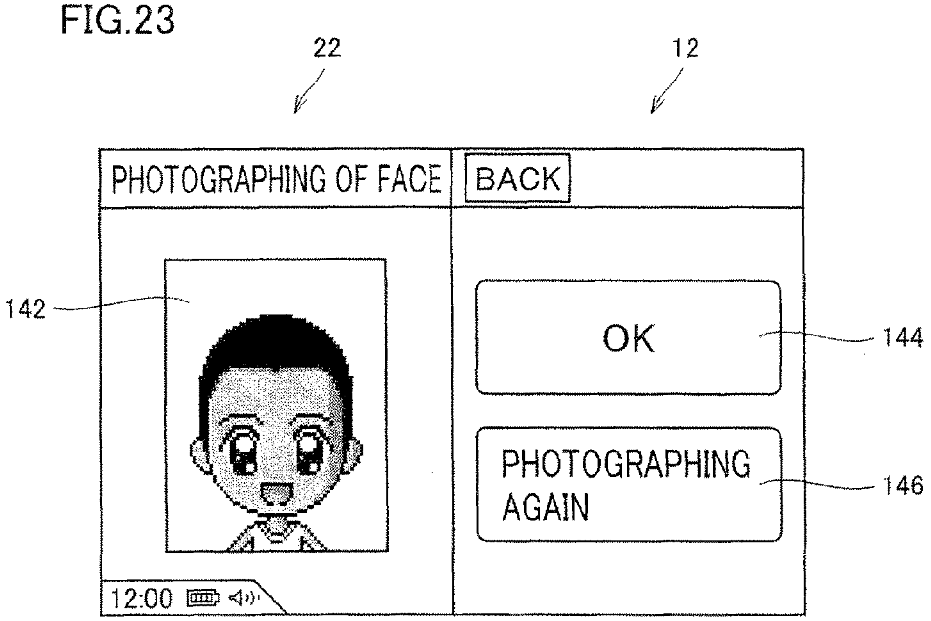

In subsequent step S108, CPU 31 has the captured camera image displayed to the user and determines with regard to the captured camera image whether photographing again is necessary or not (step S110). More specifically, CPU 31 causes first LCD 12 and second LCD 22 to display a notification image inviting the user to make selection as to whether photographing again is requested or not. FIG. 23 shows an exemplary screen displayed on first LCD 12 and second LCD 22 in steps S108 and S110. In the screen shown in FIG. 23, a head shot 142 captured by inner camera 23 is displayed as well as an "OK" image 144 for accepting an instruction that photographing again is not necessary and a "photographing again" image 146 for accepting an instruction that photographing again is necessary are displayed.

When "OK" image 144 is touched with touch pen 27 etc., CPU 31 determines that photographing again is not required (NO in step S110). Then, the process proceeds to step S120. On the other hand, when "photographing again" image 146 is touched with touch pen 27 etc., CPU 31 determines that photographing again is required (YES in step S110). Then, the process returns to step S102.

Figure 24:
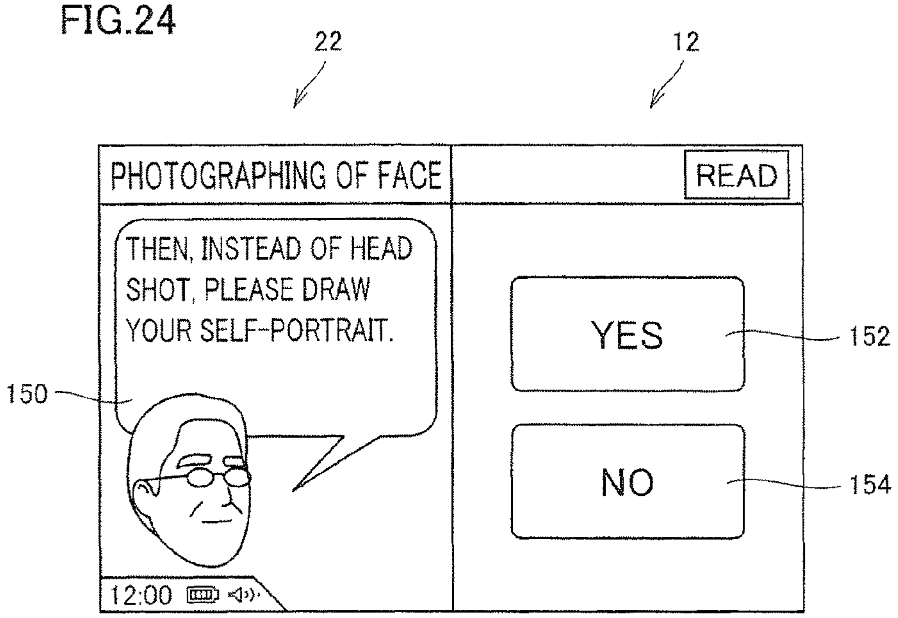

In contrast, in step S112, CPU 31 determines whether a self-portrait instead of the head shot can be input or not. More specifically, CPU 31 causes first LCD 12 and second LCD 22 to display a notification image inviting the user to make selection as to whether a self-portrait can be input or not. FIG. 24 shows an exemplary screen displayed on first LCD 12 and second LCD 22 in step S112. In the screen shown in FIG. 24, a notification image 150 inviting the user to make selection as to whether a self-portrait can be input or not as well as a "YES" image 152 for accepting an instruction that a self-portrait instead of the head shot can be input and a "NO" image 154 for accepting an instruction that a self-portrait instead of the head shot cannot be input are displayed.

When "YES" image 152 is touched with touch pen 27 etc., CPU 31 determines that a self-portrait instead of the head shot can be input (YES in step S112). Then, the process proceeds to step S114. On the other hand, when "NO" image 154 is touched with touch pen 27 etc., CPU 31 determines that a self-portrait instead of the head shot cannot be input (NO in step S112). Then, the process returns to step S100.

In step S114, CPU 31 has a screen for accepting an input of the self-portrait by the user displayed. More specifically, CPU 31 has a hand-drawing input screen for accepting a series of input operations using touch pen 27 etc. on touch panel 13 displayed. In subsequent step S116, CPU 31 has a hand-drawn image (self-portrait) in accordance with a trail of a series of input operations (touch trail) displayed. In further subsequent step S118, CPU 31 determines whether a series of input operations ended or not.

Figure 25:
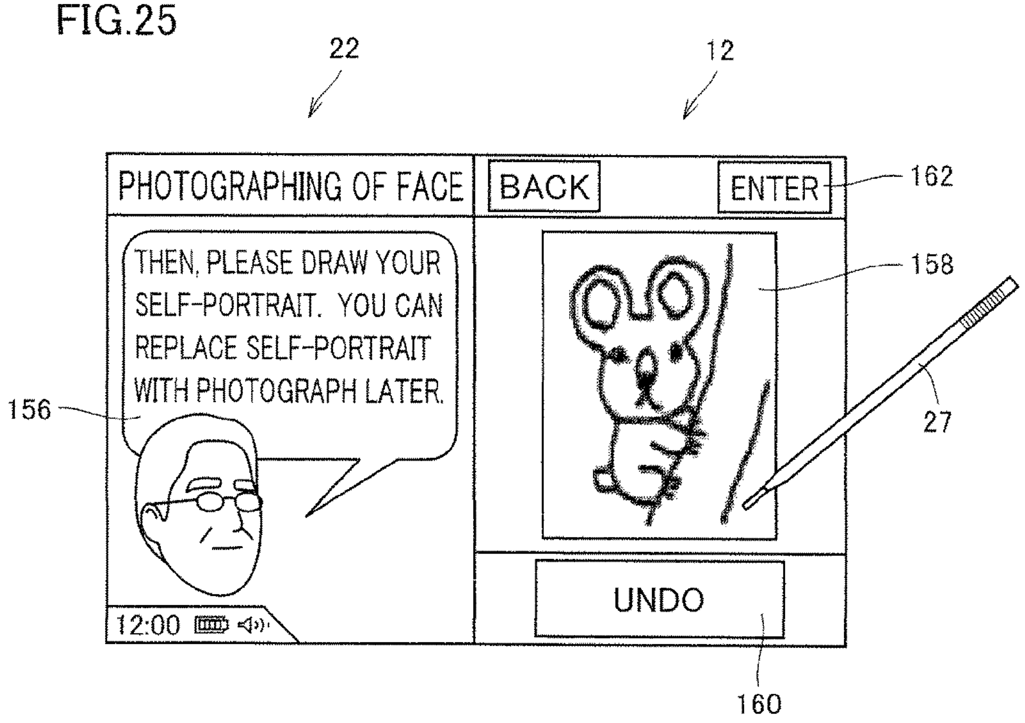

FIG. 25 shows an exemplary screen displayed on first LCD 12 and second LCD 22 in steps S114 to S118. In the screen shown in FIG. 25, a notification image 156 for inviting the user to input the self-portrait as well as a hand-drawing input area 158, an "undo" image 160 for accepting an instruction to cancel input contents and an "enter" image 162 for accepting an instruction to end a series of input operations are displayed. When a self-portrait has already been registered, that self-portrait may be displayed as an initial value in hand-drawing input area 158. When the user provides hand-drawing input on first LCD 12 with touch pen 27 etc., CPU 31 causes first LCD 12 to display in real time an image (self-portrait) in accordance with the touch trail detected by touch panel 13. It is noted that the image data detected by touch panel 13 is successively written in a prescribed area in main memory 32. The image data written in main memory 32 is reset (erased) by selection of "undo" image 160. Alternatively, when "enter" image 162 is touched with touch pen 27 etc., CPU 31 determines that a series of input operations ended (YES in step S118). Then, the process proceeds to step S120. On the other hand, unless "enter" image 162 is touched with touch pen 27 etc., CPU 31 determines that a series of input operations continues (NO in step S118). Therefore, the processing in steps S116 and S118 is repeated until "enter" image 162 is touched with touch pen 27 etc.

In step S120, CPU 31 determines whether the current mode is set to the "owner mode" or not. The present face image obtaining sub routine is executed in common also during the check game which will be described later. In the check game, in addition to the "owner mode" similar to the processing for registering owner identification information, a "guest mode" is prepared. Step S120 is a step for switching between the contents in the processing, in accordance with the mode selected from these "owner mode" and "guest mode". Since the "owner mode" is set without fail in the processing for registering owner identification information, determination as "YES" is made in step S120.

When the current mode is set to the owner mode (YES in step S120), the process proceeds to step S122. On the other hand, when the current mode is set to the guest mode (NO in step S120), the process proceeds to step S130.

In step S122, whether a face image has already been registered as the owner identification information or not is determined. Namely, CPU 31 determines whether owner_face image file 402 (FIG. 10) storing some kind data is present or not.

When the face image has not yet been registered as the owner identification information (NO in step S122), CPU 31 creates owner_face image file 402 from the face image (head shot or self-portrait) obtained in the preceding step (step S124). Then, the process returns. On the other hand, when the face image has already been registered as the owner identification information (YES in step S122), CPU 31 overwrites already-created owner_face image file 402 with the face image (head shot or self-portrait) obtained in the preceding step (step S126). Then, the process returns.

On the other hand, in step S130, CPU 31 determines whether there is an empty space in guest_face image file 442 (FIG. 10) or not. Namely, CPU 31 determines whether or not there is an area remaining for storing a face image (head shot or self-portrait) obtained in the preceding step. When there is an empty space in guest_face image file 442 (YES in step S130), the process proceeds to step S132. On the other hand, when there is no empty space in guest_face image file 442 (NO in step S130), the process proceeds to step S134.

In step S132, guest_face image file 442 is created from the face image (head shot or self-portrait) obtained in the preceding step. Then, the process returns.

In step S134, CPU 31 has already-stored guest_face image files 442 displayed in a list. Namely, CPU 31 invites the user to select guest_face image file 442 to be erased. In subsequent step S136, CPU 31 determines whether the face image obtained in the present processing has been selected or not. When the face image obtained in the present processing has been selected (YES in step S136), the process returns. Namely, the face image obtained in the present face image obtaining sub routine is not stored but discarded. On the other hand, when the face image obtained in the present processing has not been selected (NO in step S136), the process proceeds to step S138.

In step S138, CPU 31 overwrites selected guest_face image file 442 with the face image (head shot or self-portrait) obtained in the preceding step. Then, the process returns.

Thus, by executing the program according to the present embodiment, CPU 31 provides a selection function for accepting, when result data in the guest mode (second mode) has already been stored in association with all prepared accounts of unspecified users and when a new guest mode is set and the interactive application is executed, selection of data to be erased from among already-stored result data in the guest mode and second result data in the guest mode obtained as a result of most recent execution of the interactive application, and an erasing function for erasing the result data in the guest mode selected by the selection function.

Though such a configuration that the user is caused to select guest_face image file 442 to be erased in step S134 when there is no empty space in guest_face image file 442 has been illustrated, oldest guest_face image file 442 may automatically be erased when there is no empty space in guest_face image file 442.

Referring again to FIG. 16, in subsequent step S10, CPU 31 executes a signature image obtaining sub routine to obtain a signature image of the owner.

Figure 18:
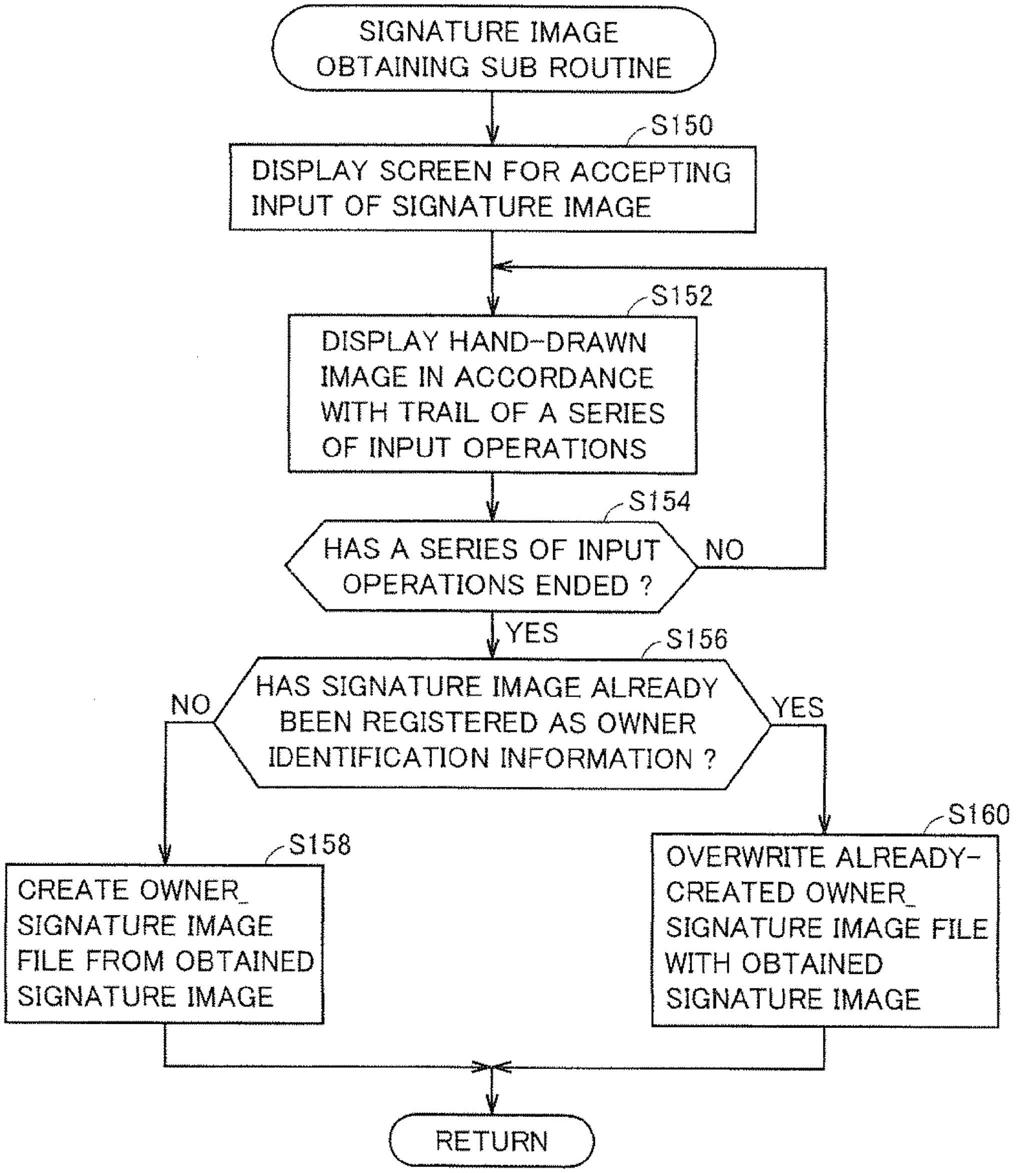
FIG. 18 is a flowchart showing a processing procedure in a signature image obtaining sub routine according to the embodiment of the present invention.

Referring to FIG. 18, initially, CPU 31 has a screen for accepting an input of a signature image by the user displayed (step S150). More specifically, CPU 31 has a handwriting input screen for accepting a series of input operations with touch pen 27 etc. on touch panel 13 displayed. In subsequent step S152, CPU 31 has a hand-drawn image (signature image) in accordance with a trail of a series of input operations (touch trail) displayed. In further subsequent step S154, CPU 31 determines whether a series of input operations ended or not.

Figure 26:
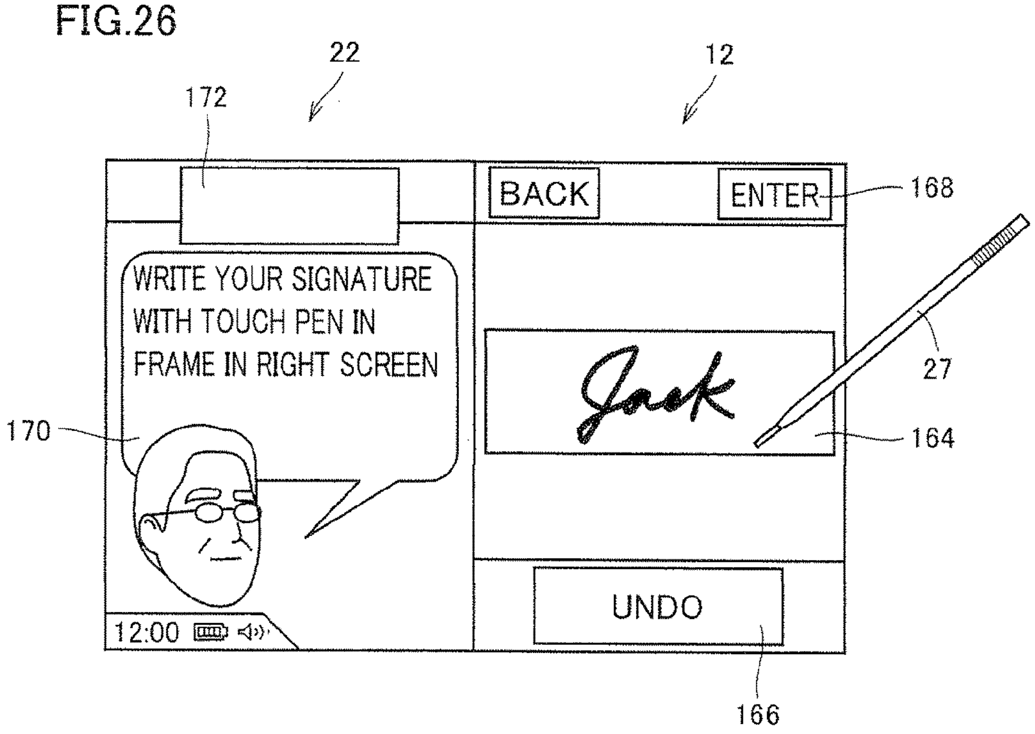

FIG. 26 shows an exemplary screen displayed on first LCD 12 and second LCD 22 in steps S150 to S154. In the screen shown in FIG. 26, a notification image 170 for inviting the user to input a signature as well as a handwriting input area 164, an "undo" image 166 for accepting an instruction to cancel input contents and an "enter" image 168 for accepting an instruction to end a series of input operations are displayed. When a signature image has already been registered, that registered signature image may be displayed in a handwriting display area 172. When the user provides handwriting input on first. LCD 12 with touch pen 27 etc., CPU 31 causes first LCD 12 to display in real time a hand-drawn image (signature image) in accordance with the touch trail detected by touch panel 13. It is noted that the hand-drawn image detected by touch panel 13 is successively written in a prescribed area in main memory 32. The image data written in main memory 32 is reset (erased) by selection of "undo" image 166. In addition, when "enter" image 168 is touched with touch pen 27 etc., CPU 31 determines that a series of input operations ended (YES in step S154). Then, the process proceeds to step S156. On the other hand, unless "enter" image 168 is touched with touch pen 27 etc., CPU 31 determines that a series of input operations continues (NO in step S154). Therefore, the processing in steps S152 and S154 is repeated until "enter" image 168 is touched with touch pen 27 etc.

In step S156, whether the signature image has already been registered as the owner identification information or not is determined. Namely, CPU 31 determines whether owner_signature image file 404 (FIG. 10) storing some kind data is present or not. When the signature image has not yet been registered as the owner identification information (NO in step S156), CPU 31 creates owner_signature image file 404 from the signature image obtained in step S152 (step S158). Then, the process returns. On the other hand, when the signature image has already been registered as the owner identification information (YES in step S156), CPU 31 overwrites already-created owner_signature image file 404 with the signature image obtained in step S152 (step S160). Then, the process returns.

Referring again to FIG. 16, in step S12, CPU 31 has a screen for accepting user's input of a date of birth displayed. In subsequent step S14, CPU 31 performs character recognition processing on the trail input by the user with touch pen 27 etc. In further subsequent step S16, CPU 31 has a result of recognition displayed as the date of birth of the owner. In further subsequent step S18, CPU 31 determines whether correction of the input contents as a whole is requested or not.

Figure 27:
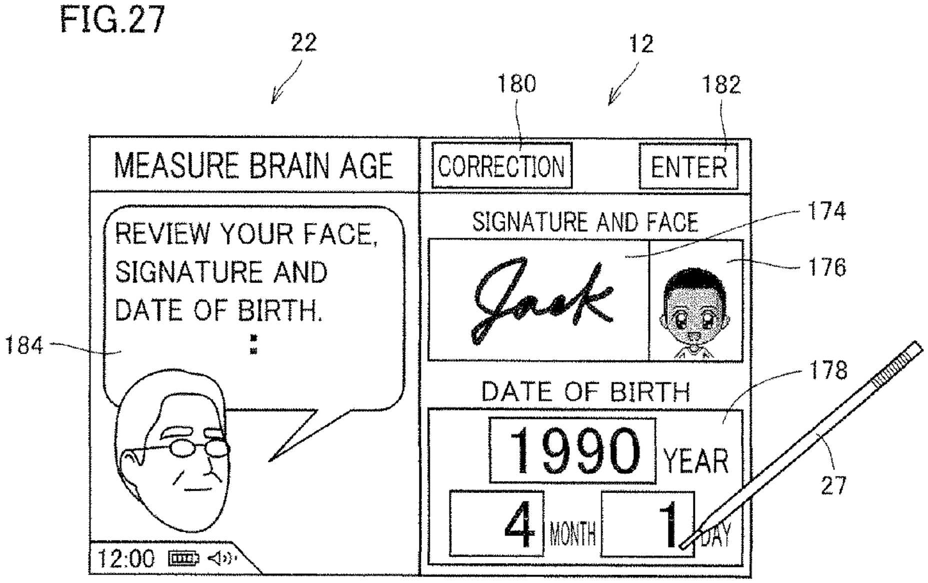

FIG. 27 shows an exemplary screen displayed on first LCD 12 and second LCD 22 in steps S12 to S18. In the screen shown in FIG. 27, a notification image 184 inviting the user to input whether the input contents as a whole should be corrected or not as well as a face image 176 and a signature image 174 that have previously been obtained, a date-of-birth input area 178, a "correction" image 180 for accepting an instruction for correcting the input contents as a whole, and an "enter" image 182 for accepting approval of the input contents as a whole are displayed. When the user provides a handwriting input on a position corresponding to date-of-birth input area 178 on first LCD 12 with touch pen 27 etc., CPU 31 has a result of recognition of the trail detected by touch panel 13 displayed in a corresponding area ("year", "month" and "day"). In addition, when "correction" image 180 is touched with touch pen 27 etc., CPU 31 determines that correction of the input contents as a whole is requested (YES in step S18). Then, the process returns to step S8. On the other hand, when "enter" image 182 is touched with touch pen 27 etc., CPU 31 determines that correction of the input contents as a whole is not requested (NO in step S18). Then, CPU 31 creates owner_setting file 406 (FIG. 10). Thereafter, the process proceeds to step S20.

In step S20, CPU 31 has the "brain age" of the owner obtained in step S4 displayed. Here, the face image of the owner which represents other owner identification information is also displayed. The processing for registering the owner identification information thus ends.

<Training Game>

A training game in the owner mode (state ST6) and a training game in the guest mode (state ST24) in the state transition diagram shown in FIG. 5 will now be described.

Figure 28:
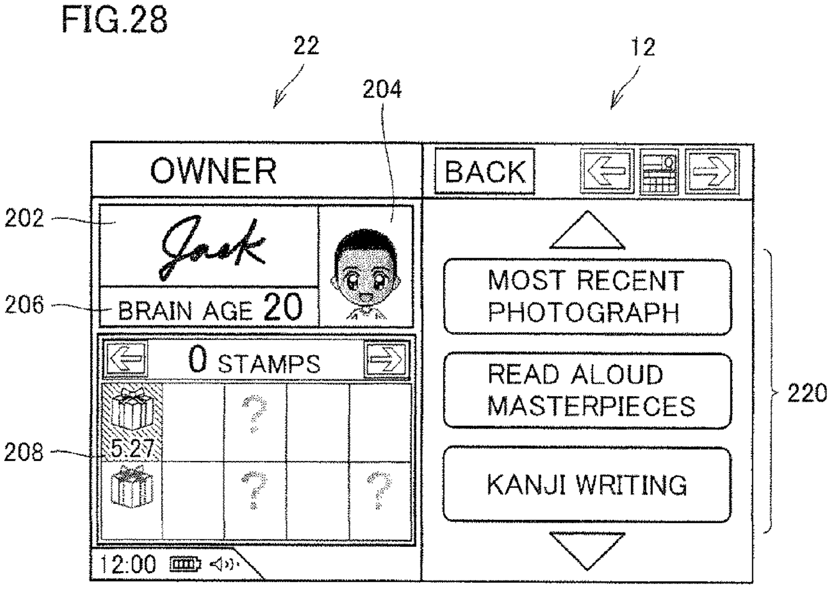
FIG. 28 is a diagram showing an exemplary menu screen in a training game in an owner mode according to the embodiment of the present invention.

When "training" image 210 is touched with touch pen 27 etc. in the main menu for the owner shown in FIG. 8, first LCD 12 and second LCD 22 display a menu of the training game shown in FIG. 28 (owner mode). Then, the training game in the owner mode is started. Alternatively, when "training" image 310 is touched with touch pen 27 etc. in the main menu for the guest shown in FIG. 9, first LCD 12 and second LCD 22 display a menu of the training game shown in FIG. 29 (guest mode). Then, the training game in the guest mode is started.

In the menu of the training game in the owner mode shown in FIG. 28, signature image 202 of the owner, face image 204 of the owner, image 206 indicating a "brain age" value of the owner, and "stamp" acquisition state 208 of the owner are displayed, as in the main menu for the owner shown in FIG. 8. In addition, in this menu, instruction images 220 showing training games that can be played by the owner are displayed in a list. Here, play of some of a plurality of training games (scenarios) that can be played by the owner is permitted in accordance with "stamp" acquisition state 208 indicating the result of the training game. Namely, as the owner plays a larger number of training games, the number of types of training games that can be played by the user increases.

Figure 29:
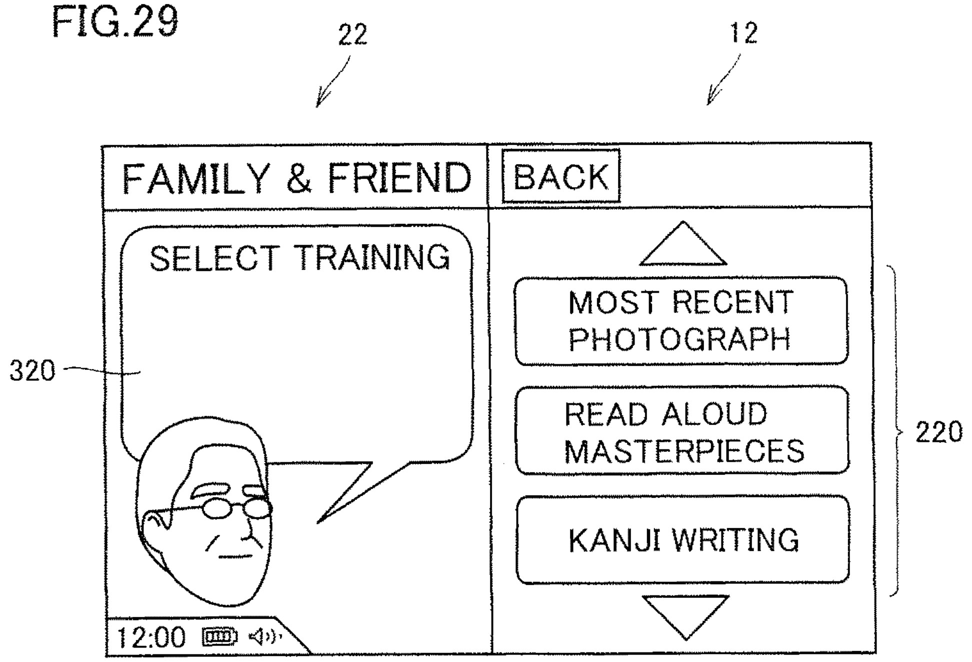
FIG. 29 is a diagram showing an exemplary menu screen in a training game in a guest mode according to the embodiment of the present invention.

On the other hand, in the menu of the training game in the guest mode shown in FIG. 29, a notification image 320 inviting the user to select a training menu is displayed, and instruction images 220 showing training games that can be played by a guest are displayed in a list. Here, the types of training games that can be played by the guest are set equally to the types of training games that can be played by the owner shown in FIG. 28. Therefore, as the number of "stamps" acquired by the owner is larger, the number of types of training games that can be played by the guest also increases. It is noted that records of play of the training game by the guest are not reflected in the owner's "stamp". Namely, the results (records) of play of the training game by the owner are stored in association with the owner, whereas the results (records) of play of the training game by the guest are not stored.

Typical examples of the training games prepared in the application according to the present embodiment include the calculation game shown in FIG. 19 and the like. Other than such a calculation game, various interactive training games such as a memorization game or a spelling game are prepared.

Thus, by executing the program according to the present embodiment, CPU 31 functions as updating means for updating history information in accordance with records of user's play of the interactive application while the owner mode (first mode) is set and determination means for determining a scenario permitted to proceed in the owner mode (first mode) and the guest mode (second mode) from a plurality of scenarios based on the history information. In the present embodiment, such a configuration that a type of a game representing an element in the game can be played by the user in accordance with a user's play status (such as the number of times of play, the time for play, performance of play, and the like) has been illustrated. In addition to such a configuration, a configuration may be such that a character or an item that can be used as an element in the game can be used by the user in accordance with the user's play status.

A procedure for processing the training game according to the present embodiment will be described hereinafter with reference to FIG. 30. It is noted that the processing procedure shown in FIG. 30 is performed when "training" image 210 is selected in the main menu for the owner shown in FIG. 8 or when "training" image 310 is selected in the main menu for the guest shown in FIG. 9.

Figure 30:
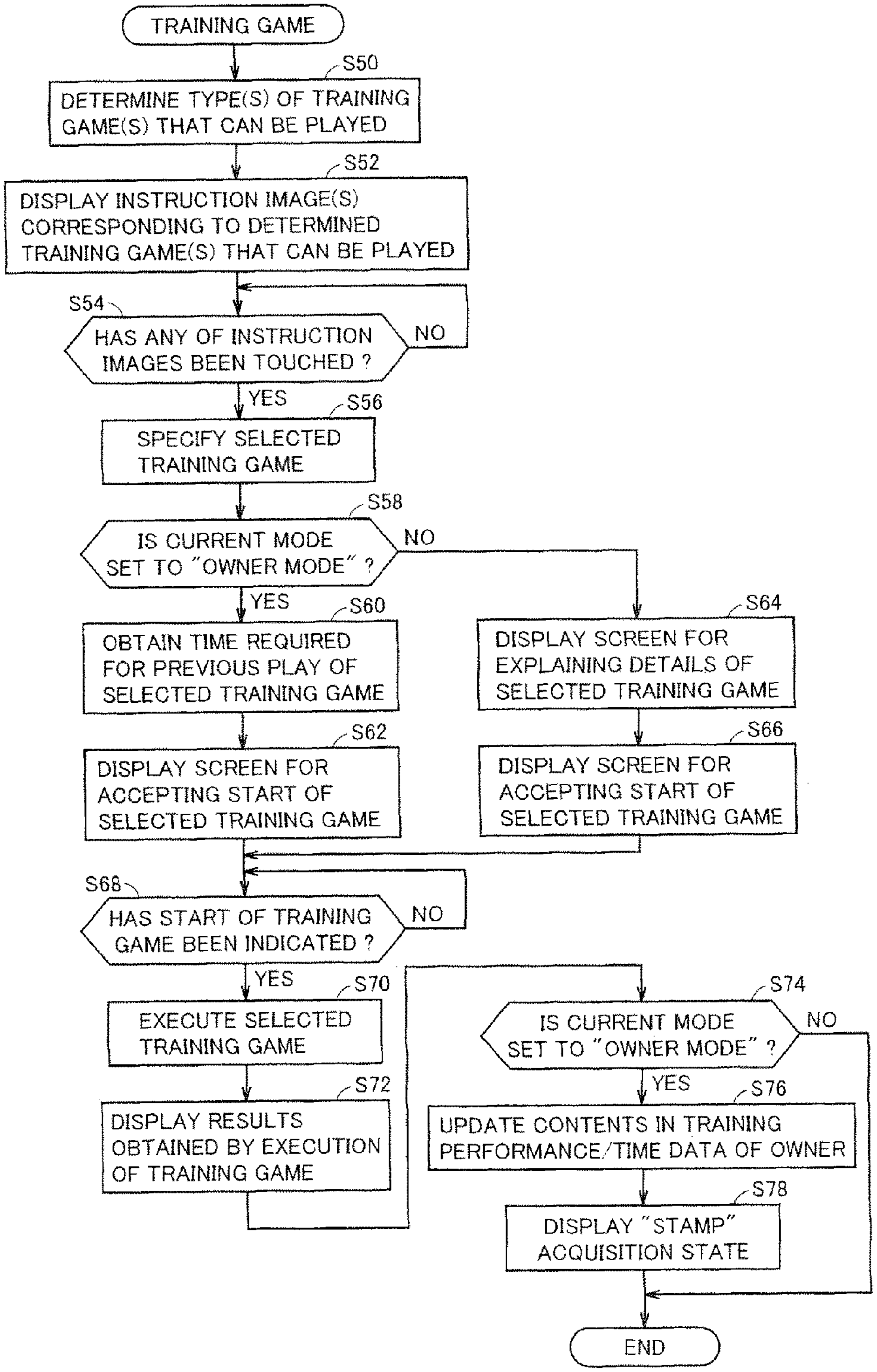
FIG. 30 is a flowchart showing a processing procedure in the training game according to the embodiment of the present invention.

Referring to FIG. 30, initially, in step S50, CPU 31 determines type(s) of training game(s) that can be played, by referring to owner_training performance data 420 (FIG. 10). In subsequent step S52, CPU 31 reads the instruction image(s) corresponding to determined training game(s) that can be played from data memory 34 for storage and causes first LCD 12 to display the instruction image.

In subsequent step S54, CPU 31 determines whether any of the displayed instruction images has been touched with touch pen 27 etc. or not. When none of the displayed instruction images has been touched (NO in step S54), the processing in step S54 is repeated. On the other hand, when any of the displayed instruction images has been touched (YES in step S54), the process proceeds to step S56.

In step S56, CPU 31 specifies the selected training game. In further subsequent step S58, CPU 31 determines whether the current mode is set to the "owner mode" or not. When the current mode is set to the owner mode (YES in step S58), the process proceeds to step S60. On the other hand, when the current mode is set to the guest mode (NO in step S58), the process proceeds to step S64.

In step S60, CPU 31 obtains the time required for previous play by referring to owner_training time data 422 (FIG. 10) corresponding to each selected training game and by summing up the total time required for play of each training stored in owner_training time data 422. If owner_training performance data 420 relating to the selected training game is not yet present, a given default value is set as the time required for previous play. In subsequent step S62, CPU 31 has a screen for accepting start of the selected training game displayed. On this screen, the time required for previous play that was obtained in step S60 is displayed as the expected required time for play of the training. Then, the process proceeds to step S68.

On the other hand, in step S64, CPU 31 has a screen explaining contents or the like of the selected training game displayed. In subsequent step S66, CPU 31 has a screen for accepting start of the selected training game displayed. On this screen, a given default value is displayed as the expected required time for play of the training. Then, the process proceeds to step S68.

In step S68, CPU 31 determines whether the user has indicated start of the training game or not. Namely, CPU 31 determines whether the displayed instruction image for accepting input of start has been touched with touch pen 27 etc. or not. When the user indicated start of the training game (YES in step S68), the process proceeds to step S70. When the user has not indicated start of the training game (NO in step S68), the processing in step S68 is repeated.

In step S70, CPU 31 executes the selected training game. In subsequent step S72, CPU 31 has a result obtained by execution of the training game (the time required for play or the number of correct answers/incorrect answers) displayed. In further subsequent step S74, CPU 31 determines whether the current mode is set to the "owner mode" or not. When the current mode is set to the owner mode (YES in step S74), the process proceeds to step S76. On the other hand, when the current mode is set to the guest mode (NO in step S74), the present training game ends.

In step S76, CPU 31 updates the contents in owner_training performance data 420 and owner_training time data 422 corresponding to the executed training game, based on the results obtained by execution of the training game. In subsequent step S78, CPU 31 has a "stamp" acquisition state displayed, based on the contents in updated owner_training performance data 420. Thereafter, the present training game ends.

<Check Game>

A check game (state ST12) and result output (state ST14) in the owner mode as well as a check game (state ST32), guest identification information registration (face image) (state ST34) and result output (state ST36) in the guest mode in the state transition diagram shown in FIG. 5 will now be described.

A procedure for processing the check game according to the present embodiment will be described with reference to FIGS. 31A and 31B.

Figure 31A:
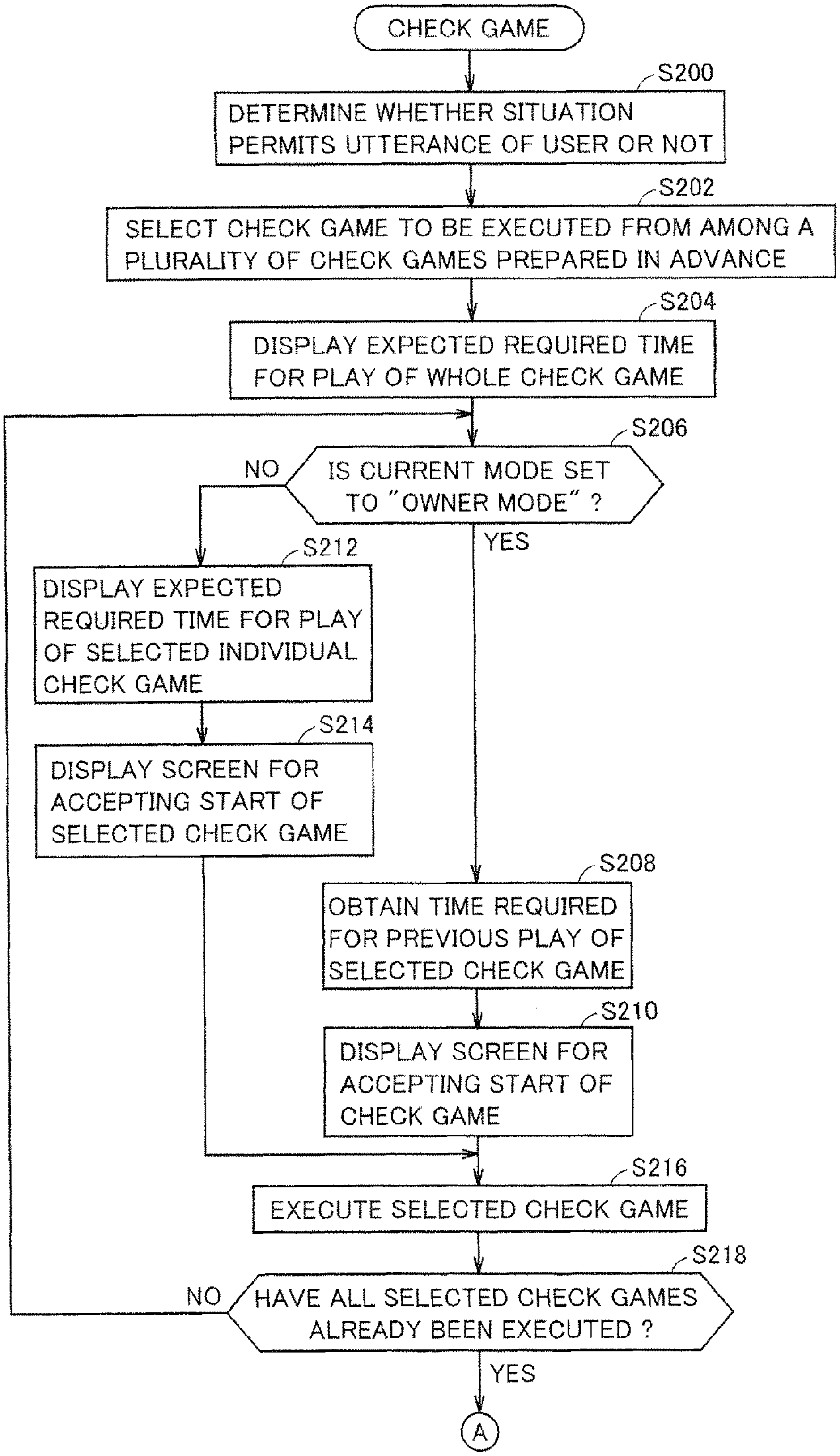
FIGS. 31A and 31B are flowcharts each showing a processing procedure in a check game according to the embodiment of the present invention.
Figure 31B:
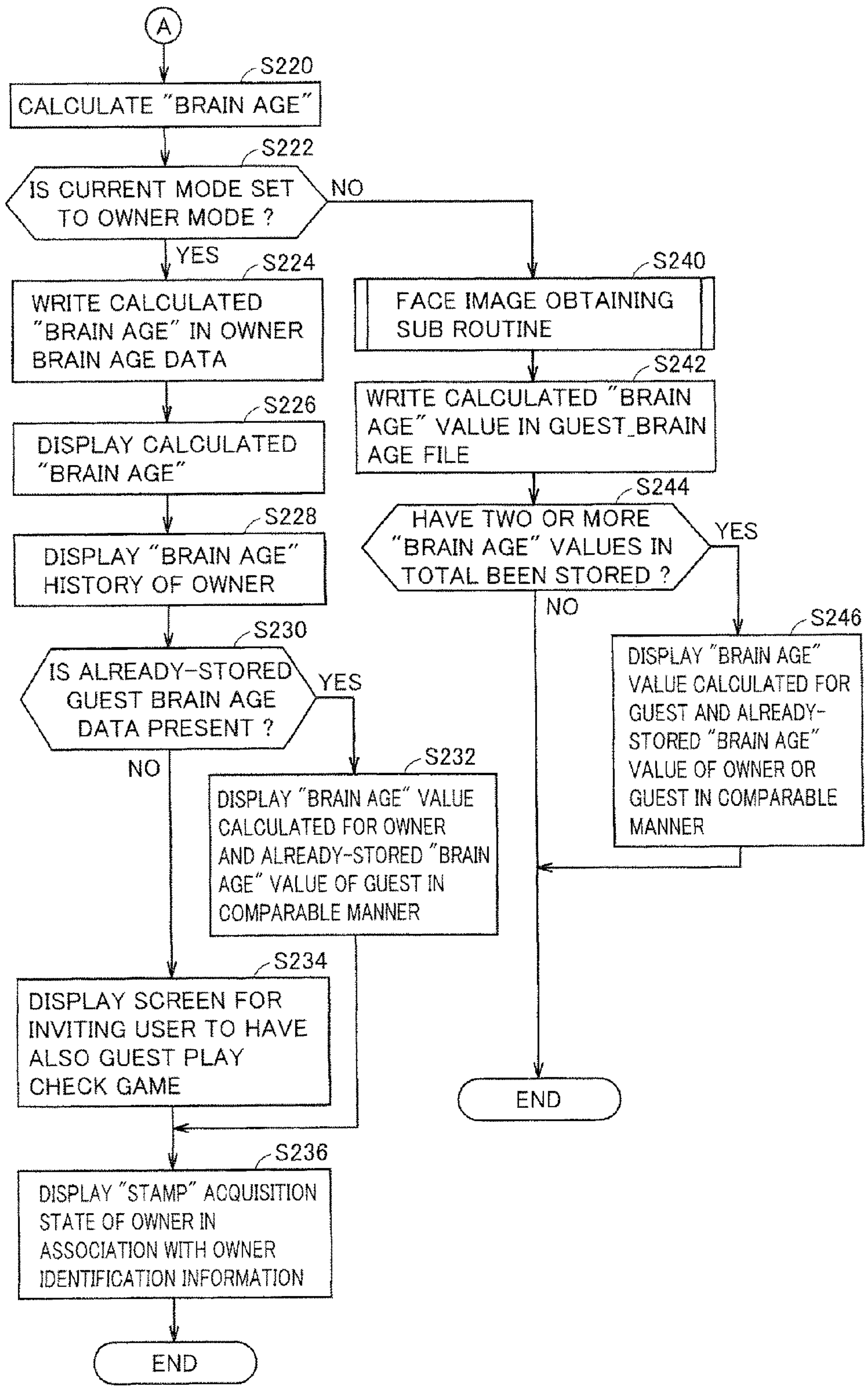

The processing procedure shown in FIGS. 31A and 31B is performed when “brain age check” image 214 is selected in the main menu for the owner shown in FIG. 8 or when “brain age check” image 314 is selected in the main menu for the guest shown in FIG. 9.

Referring to FIG. 31A, initially, in step S200, CPU 31 determines whether a situation permits utterance of the user or not. This determination is made in order to determine whether a game in which utterance of the user is obtained through microphone 43 and subjected to voice recognition processing and the result of recognition is utilized can be executed or not. More specifically, CPU 31 causes first LCD 12 and second LCD 22 to display an image inviting the user to make selection as to whether a situation permits utterance of the user or not.

In subsequent step S202, CPU 31 selects a check game to be executed from among a plurality of check games prepared in advance, in accordance with the result of determination in step S200. Check games substantially the same as the training games described above are employed as the check games prepared in the application according to the present embodiment. Therefore, the check game according to the present embodiment includes the calculation game as shown in FIG. 19 and the like. Other than such a calculation game, various interactive check games such as a memorization game or a spelling game are prepared. Preferably, a plurality of check games are selected, however, a single check game may be selected. Then, the process proceeds to step S204.

In step S204, CPU 31 has an expected required time for play of the whole check game(s) displayed, based on a given default value, in accordance with the type of the selected check game(s). If time data of previous play is present, that time may be displayed. In subsequent step S206, CPU 31 determines whether the current mode is set to the “owner mode” or not. When the current mode is set to the owner mode (YES in step S206), the process proceeds to step S208. On the other hand, when the current mode is set to the guest mode (NO in step S206), the process proceeds to step S212.

In step S208, CPU 31 obtains the time required for previous play of the selected check game, by referring to owner_training time data 422 (FIG. 10) corresponding to the selected check game. If owner_training time data 422 relating to the selected check game is not yet present, a given default value is set as the time required for previous play. In subsequent step S210, CPU 31 has a screen for accepting start of the check game displayed. On this screen, the time required for previous play that was obtained in step S208 is displayed as the expected required time for play of the check game.

Figure 32:
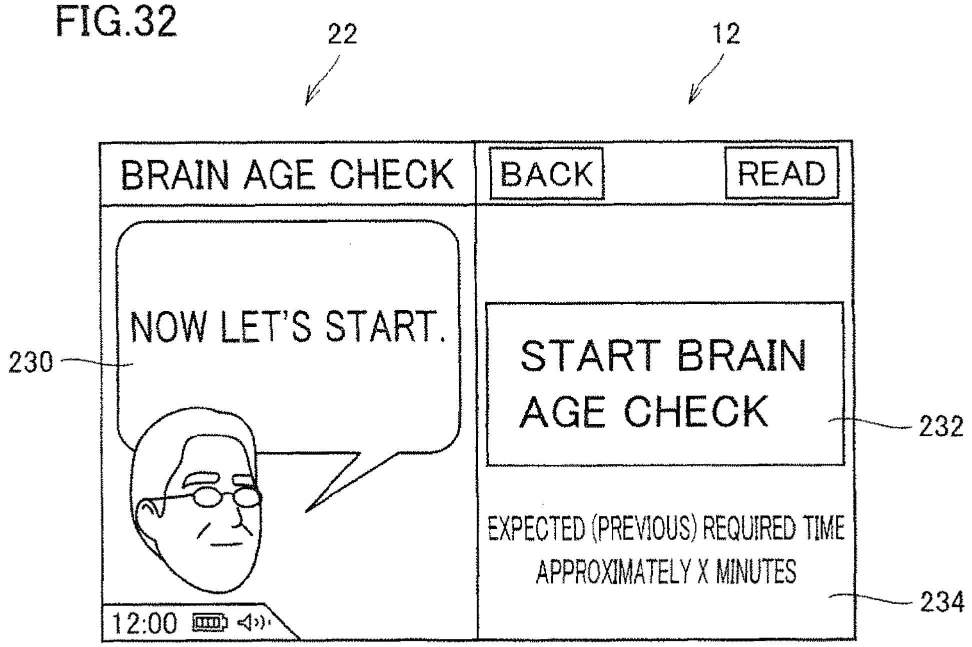
FIGS. 32 to 35 are diagrams showing screen display examples involved with the check game according to the embodiment of the present invention.

FIG. 32 shows an exemplary screen displayed on first LCD 12 and second LCD 22 in step S210. In the screen shown in FIG. 32, a notification image 230 notifying the user that the check game can be started and a time 234 required for previous play that was obtained in step S208 are displayed. In the screen shown in FIG. 32, a “start brain age check” image 232 for accepting start of the check game is further displayed. When “start brain age check” image 232 is touched with touch pen 27 etc., the process proceeds to step S216.

Referring again to FIG. 31A, in step S212, CPU 31 has an expected required time for play of the selected individual check game (a given default value) displayed. In further subsequent step S214, CPU 31 has a screen for accepting start of the selected check game displayed. On this screen, the required time obtained in step S212 is displayed. Prior to display of the expected required time for play of the selected individual check game, explanation of the check game may be displayed in order to assist the user’s play operation.

Figure 33:
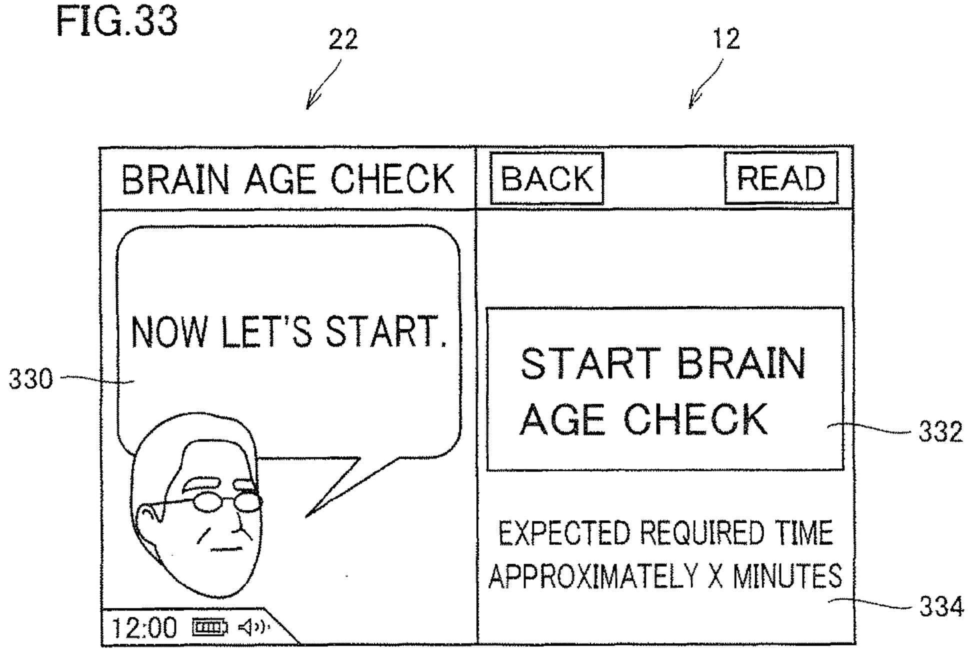

FIG. 33 shows an exemplary screen displayed on first LCD 12 and second LCD 22 in step S214. In the screen shown in FIG. 33, an image 330 for notifying the user that the check game can be started and an expected required time 334 for play obtained in step S212 are displayed. On the screen shown in FIG. 33, a “start brain age check” image 332 for accepting start of the check game is further displayed. When “start brain age check” image 332 is touched with touch pen 27 etc., the process proceeds to step S216.

Referring again to FIGS. 31A and 31B, in step S216, CPU 31 executes the selected check game. In subsequent step S218, CPU 31 determines whether all check games selected in step S202 have been executed or not. When there is an unexecuted check game remaining among the selected check games (NO in step S218), the processing in steps S206 to S216 is repeated. On the other hand, when the selected check games have all been executed (YES in step S218), the process proceeds to step S220.

In step S220, CPU 31 calculates the user’s “brain age” in accordance with prescribed criteria, based on the results (performance) such as the time required for the check game or the number of correct answers/incorrect answers. In subsequent step S222, CPU 31 determines whether the current mode is set to the owner mode or not. When the current mode is set to the owner mode (YES in step S222), the process proceeds to step S224. On the other hand, when the current mode is set to the guest mode (NO in step S222), the process proceeds to step S240.

In step S224, CPU 31 has the calculated “brain age” stored in association with the owner. Namely, CPU 31 writes the calculated “brain age” value in owner_brain age data 410 (FIG. 10), together with the time information. The “brain age” values for N days can be stored in owner_brain age data 410, and when a “brain age” value is additionally stored, the oldest “brain age” value is erased. In subsequent step S226, CPU 31 has an image indicating the calculated “brain age” value displayed. In further subsequent step S228, CPU 31 has an image indicating history of the “brain age” values of the owner displayed, by referring to owner_brain age data 410. More specifically, CPU 31 has change over time of the “brain age” of the owner displayed in a graph.

Figure 34:
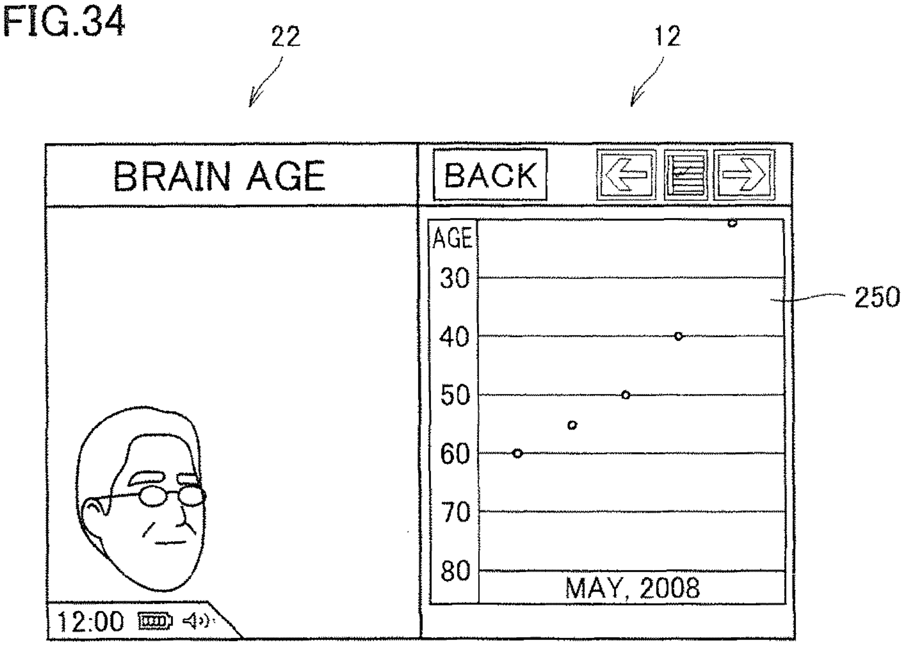

FIG. 34 shows an exemplary screen displayed on first LCD 12 and second LCD 22 in step S228. In the screen shown in FIG. 34, an image 250 displaying in a graph change over time of the “brain age” of the owner is displayed. Thereafter, the process proceeds to step S230.

Referring again to FIG. 31B, in step S230, CPU 31 determines whether already-stored guest_brain age file 444 is present or not. When already-stored guest_brain age file 444 is present (YES in step S230), the process proceeds to step S232. On the other hand, when already-stored guest brain age data is not present (NO in step S230), the process proceeds to step S234.

Figure 35:
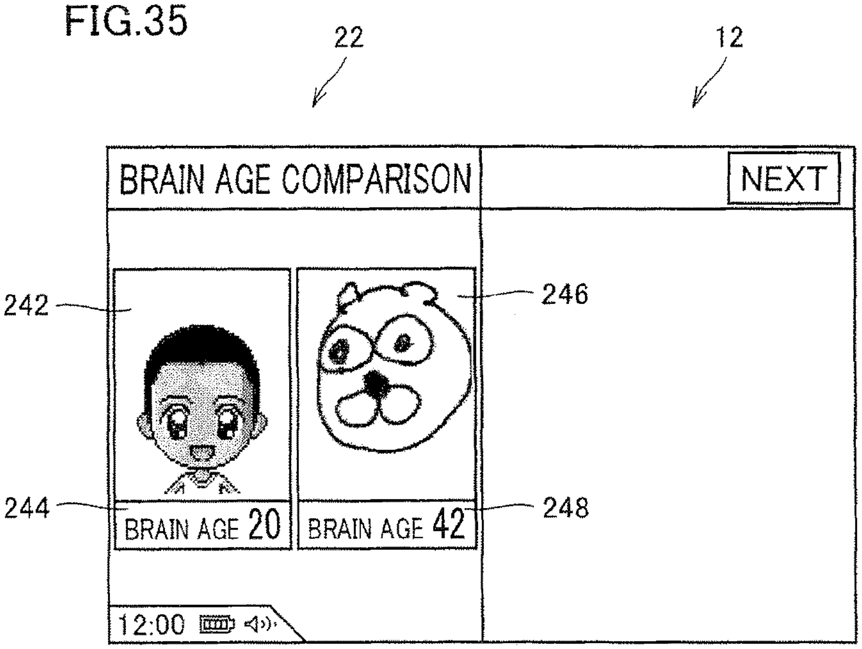

In step S232, CPU 31 causes display of the calculated “brain age” value of the present owner and the already-stored “brain age” value of the guest in a comparable manner. FIG. 35 shows an exemplary screen displayed on first LCD 12 and second LCD 22 in step S232. In the screen shown in FIG. 35, a “brain age” value 244 calculated for the present owner is displayed in correspondence with a face image 242 of the owner and an already-stored “brain age” value 248 of a guest is displayed in correspondence with a face image 246 of the guest. Namely, the "brain age" value and the face image are displayed as one group. Thus, comparison of the results of play of the same check game between the owner and the guest is displayed on the same screen. Then, the process proceeds to step S236.

Though FIG. 35 shows an example where comparison between the "brain age" values of the owner and one guest is displayed, if "brain ages" of a larger number of guests have already been stored, images are arranged more efficiently. For example, the number of persons whose "brain age" values (including the present play results) have already been stored is equal to or smaller than four including the owner and the guest(s), the values for two persons are arranged in a laterally aligned manner on each of first LCD 12 and second LCD 22. In contrast, when the number of persons whose "brain age" values have already been stored exceeds four including the owner and the guests, values for four persons are aligned and arranged in two rows and two columns on each of first LCD 12 and second LCD 22.

Thus, by executing the program according to the present embodiment, CPU 31 provides a third display control function for displaying result data in the owner mode (first mode) together with result data in the guest mode (second mode).

Referring again to FIG. 31B, in step S234, CPU 31 has a screen inviting also a guest, in addition to the owner, to play the check game displayed. For example, such a message that "let's have someone around do this" is displayed. Then, the process proceeds to step S236.

In step S236, CPU 31 has the "stamp" acquisition state of the owner displayed, in correspondence with the owner identification information such as the signature of the owner, the face image of the owner, and the "brain age" value of the owner. Then, the check game ends.

On the other hand, in step S240, CPU 31 executes the face image obtaining sub routine shown in FIG. 17 to obtain the face image of the guest. This is done in order to store the "brain age" value in association with the guest who actually played the check game. In subsequent step S242, CPU 31 has the calculated "brain age" stored in association with the guest. Namely, CPU 31 writes the calculated "brain age" value in guest brain age file 444 associated with guest_face image file 442 created or updated in the face image obtaining sub routine that has precedently been executed. In further subsequent step S244, CPU 31 determines whether two or more "brain age" values in total (including the present play result) of the owner and the guest(s) have already been stored or not, by referring to owner_brain age data 410 and guest_brain age file 444.

When the number of already-stored "brain age" values is less than two (NO in step S244), the check game ends. On the other hand, when two or more "brain age" values in total have already been stored (YES in step S244), the process proceeds to step S246.

In step S246, CPU 31 causes display of the calculated "brain age" value of the present guest and the already-stored "brain age" value of the owner or the guest(s) in a comparable manner. An exemplary screen for comparison and display is as shown in FIG. 35 above. Then, the check game ends.

<Association Game>

An association game (state ST8) and result output (state ST10) in the owner mode as well as an association game (state ST26), guest identification information registration (signature) (state ST28) and result output (state ST30) in the guest mode in the state transition diagram shown in FIG. 5 will now be described.

The association game according to the present embodiment refers to a game in which a "photograph" or "voice and sound" associated with a word presented as a "theme" is collected or a "picture" is hand-drawn. Namely, when some kind of "theme" is presented, the user takes a "photograph" that the user considers as most suitable for that "theme" by using inner camera 23 or outer camera 25. Alternatively, the user collects "voice and sound" that the user considers as most suitable for that "theme" by using microphone 43. Alternatively, the user hand-draws a "picture" that the user considers as most suitable for that "theme" by using touch pen 27 etc. Thereafter, among a plurality of users including the owner and the guest(s), works of the users are displayed in a list. It is assumed that which kind of input among a "photograph", "voice and sound" and a "picture" is requested is predetermined in accordance with a "theme".

A procedure for processing the association game according to the present embodiment will be described hereinafter with reference to FIGS. 36A, 36B, 37A, and 37B.

Figure 36A:
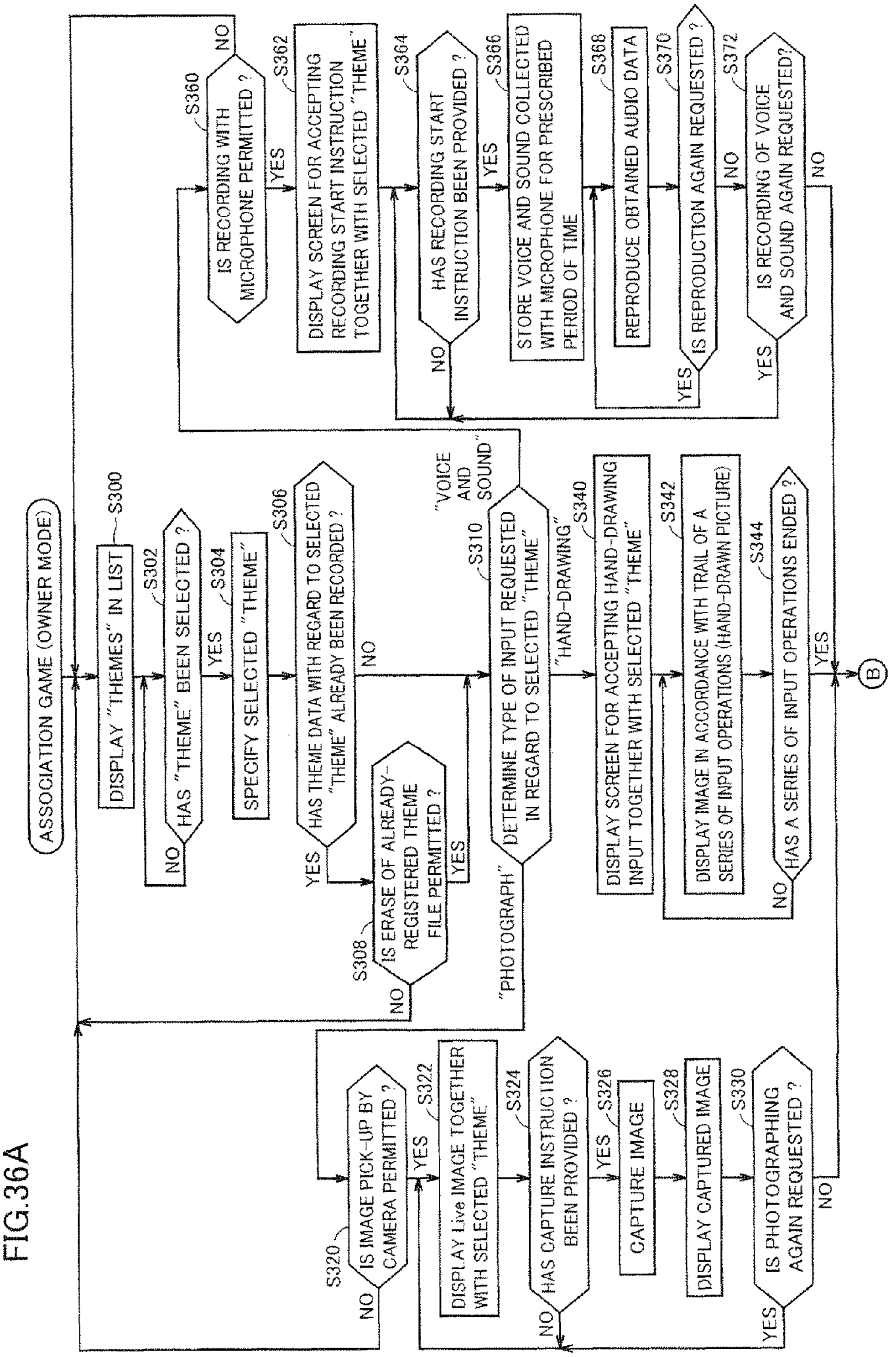
FIGS. 36A and 36B are flowcharts each showing a processing procedure in an association game in an owner mode according to the embodiment of the present invention.
Figure 36B:
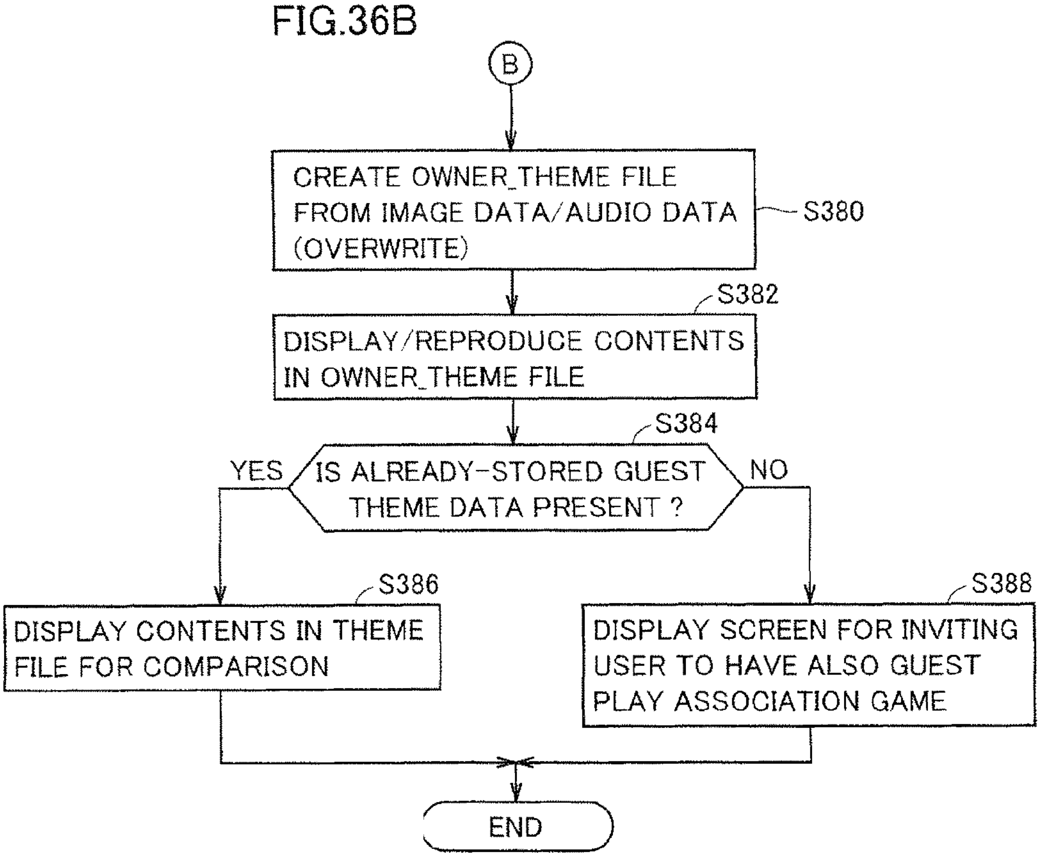
Figure 37A:
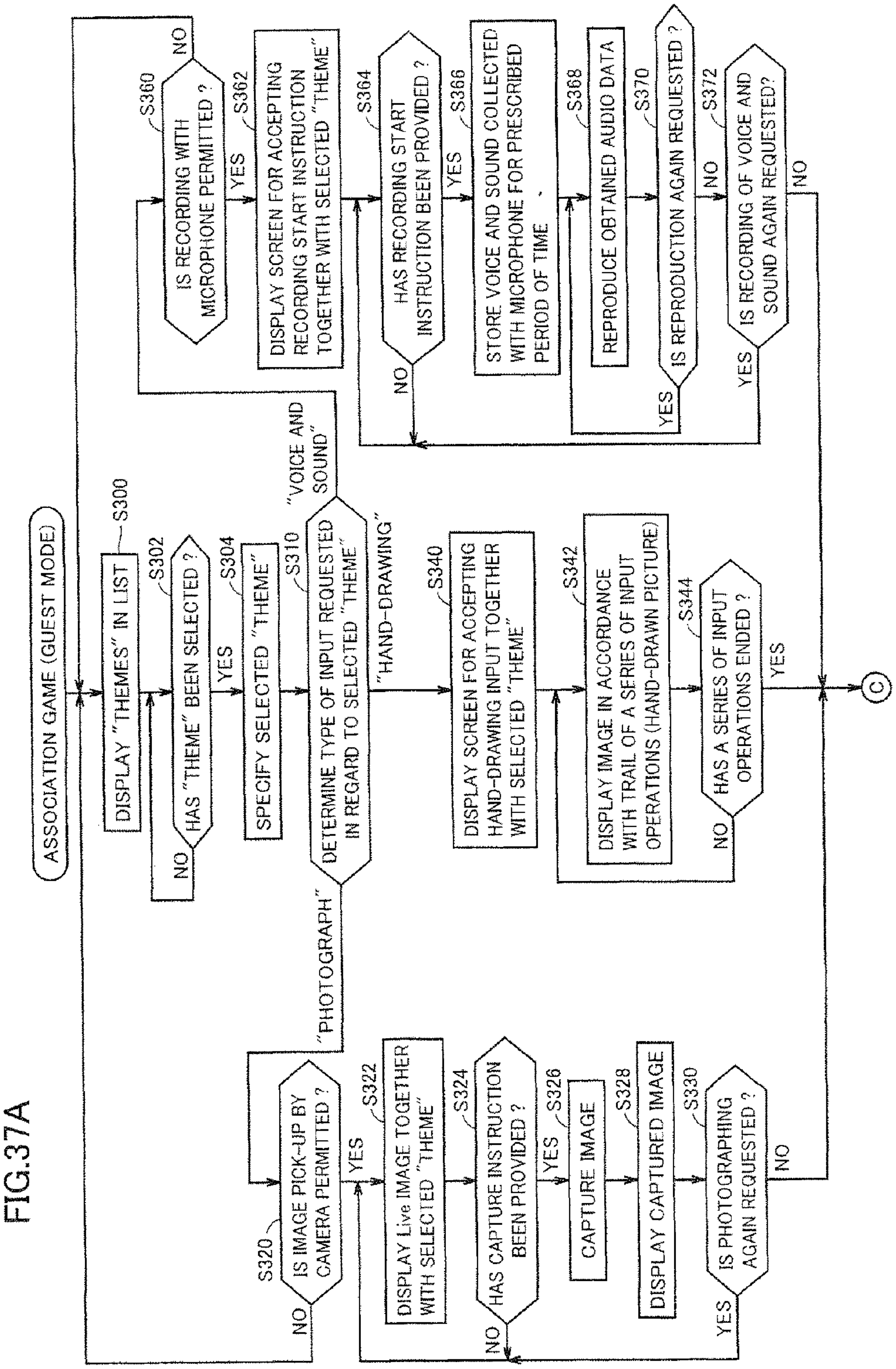
FIGS. 37A and 37B are flowcharts each showing a processing procedure in an association game in a guest mode according to the embodiment of the present invention.
Figure 37B:
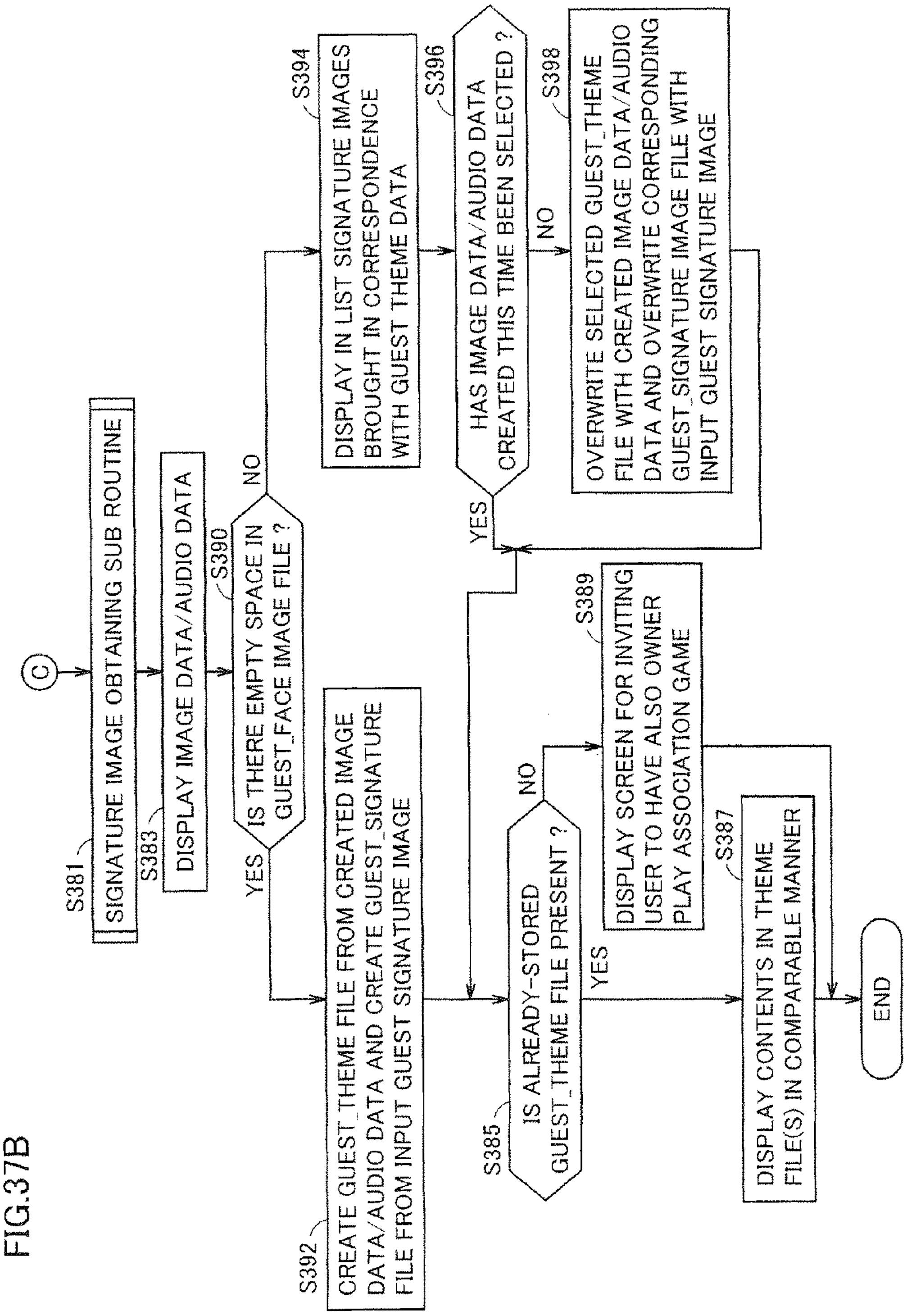

It is noted that the processing procedure shown in FIGS. 36A and 36B is performed when "theme" image 212 is selected in the main menu for the owner shown in FIG. 8. Alternatively, the processing procedure shown in FIGS. 37A and 37B is performed when "theme" image 312 is selected in the main menu for the guest shown in FIG. 9.

(1. Association Game in Owner Mode)

Referring to FIGS. 36A and 36B, initially, in step S300, CPU 31 has "themes" prepared in advance displayed in a list. More specifically, CPU 31 reads instruction images corresponding to respective "themes" prepared in advance from data memory 34 for storage and causes first LCD 12 to display the instruction images. It is noted that the "themes" may be displayed in a stepwise fashion. Namely, a list of a plurality of categories may initially be displayed, and when any category is selected, "themes" included in the selected category may be displayed in a list. In subsequent step S302, CPU 31 determines whether selection from among the "themes" displayed in a list have been made or not.

Figure 38:
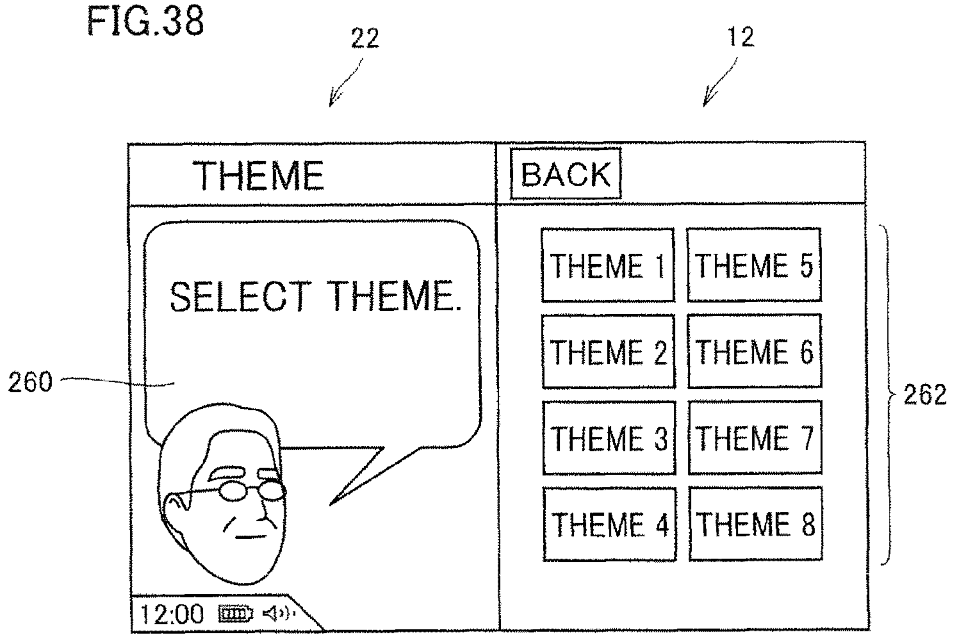
FIGS. 38 to 43 are diagrams showing screen display examples involved with the association game according to the embodiment of the present invention.

FIG. 38 shows an exemplary screen displayed on first LCD 12 and second LCD 22 in steps S300 and S302. In the screen shown in FIG. 38, a notification image 260 inviting the user to select a "theme" is displayed as well as instruction images 262 indicating selectable "themes" are displayed in a list. It is noted that the selectable themes are common between the owner mode and the guest mode. When any of instruction images 262 indicating the "themes" displayed in a list is touched with touch pen 27 etc., CPU 31 determines that a "theme" has been selected (YES in step S302). Then, in subsequent step S304, CPU 31 specifies the selected "theme". Further, the process proceeds to step S306. On the other hand, when none of instruction images 262 indicating the "themes" displayed in a list is touched, CPU 31 determines that the "theme" has not been selected (NO in step S302). The processing in step S302 is repeated.

In step S306, CPU 31 determines, with regard to the selected "theme", whether a theme file has already been registered or not. Namely, CPU 31 determines whether owner_theme file 430 corresponding to the selected "theme" has already been created or not. When the theme file has already been registered (YES in step S306), the process proceeds to step S308. On the other hand, when the theme file has not yet been registered (NO in step S306), the process proceeds to step S310.

In step S308, CPU 31 determines, with regard to the selected "theme", whether erase of the already-registered theme file is permitted or not. More specifically, CPU 31 causes first LCD 12 and second LCD 22 to display an image inviting the user to make selection as to whether the already-registered theme file may be erased or not. With regard to the selected "theme", when erase of the already-registered theme file is not permitted (NO in step S308), the process returns to step S300. On the other hand, with regard to the selected "theme", when erase of the already-registered theme file is permitted (YES in step S308), the process proceeds to step S310.

In step S310, CPU 31 determines a type of input requested in regard to the selected "theme". When the selected "theme" requests a "photograph" ("photograph" in step S310), the process proceeds to step S320. Alternatively, when the selected "theme" requests a hand-drawn "picture" ("hand-drawing" in step S310), the process proceeds to step S340. Alternatively, when the selected "theme" requests "voice and sound" ("voice and sound" in step S310), the process proceeds to step S360.

In step S320, CPU 31 determines whether a situation permits image pick-up by the camera or not. More specifically, CPU 31 causes first LCD 12 and second LCD 22 to display an image inviting the user to make selection as to whether a situation permits image pick-up or not. When a situation permits image pick-up by the camera (YES in step S320), the process proceeds to step S322. On the other hand, when a situation does not permit image pick-up by the camera (NO in step S320), the process returns to step S300.

In step S322, CPU 31 has a Live image obtained by inner camera 23 or outer camera 25 displayed, together with the selected "theme". In subsequent step S324, CPU 31 determines whether the user has provided a capture instruction (shutter command) or not. When the capture instruction has been provided (YES in step S324), the process proceeds to step S326. On the other hand, when the capture instruction has not been provided (NO in step S324), the processing in steps S322 and S324 is repeated.

In step S326, CPU 31 captures image data obtained by inner camera 23 or outer camera 25. In subsequent step S328, CPU 31 has the captured camera image displayed to the user. In further subsequent step S330, CPU 31 determines, with regard to the captured camera image, whether photographing again is required or not. More specifically, CPU 31 causes first LCD 12 and second LCD 22 to display an image inviting the user to make selection as to whether photographing again is necessary or not. When photographing again with regard to the captured camera image is required (YES in step S330), the process returns to step S322. On the other hand, when photographing again with regard to the captured camera image is not required (NO in step S330), the process proceeds to step S380.

In step S340, CPU 31 has a screen for accepting user's hand-drawing input displayed, together with the selected "theme". In subsequent step S342, CPU 31 has an image in accordance with a trail of a series of input operations (touch trail) (hand-drawn picture) displayed. In further subsequent step S344, CPU 31 determines whether a series of input operations ended or not.

Figure 39:
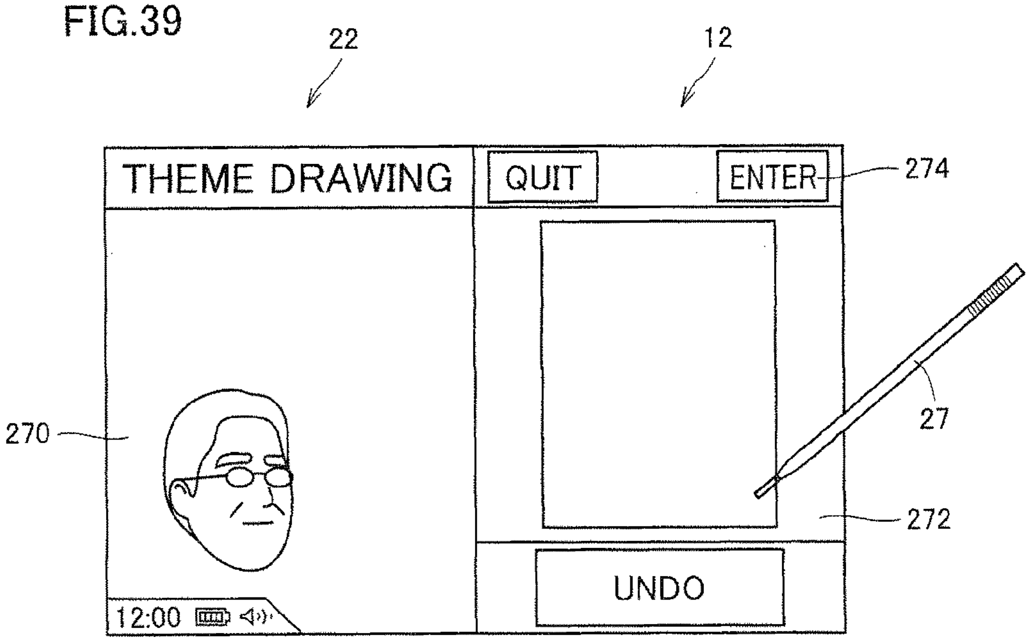

FIG. 39 shows an exemplary screen displayed on first LCD 12 and second LCD 22 in steps S340 to S344. In the screen shown in FIG. 39, an image 270 showing the "theme" as well as a hand-drawing input area 272 are displayed. In the screen shown in FIG. 39, an "enter" image 274 indicating end of a series of input operations is displayed. When the user provides hand-drawing input on first LCD 12 with touch pen 27 etc., CPU 31 has an image in accordance with the touch trail detected by touch panel 13 (hand-drawn picture) displayed in real time in hand-drawing input area 272. It is noted that the image data detected by touch panel 13 is successively written in a prescribed area of main memory 32. Thereafter, when "enter" image 274 is touched with touch pen 27 etc., CPU 31 determines that a series of input operations ended (YES in step S344). Then, the process proceeds to step S380. On the other hand, unless "enter" image 274 is touched with touch pen 27 etc., CPU 31 determines that a series of input operations continues (NO in step S344). Therefore, the processing in step S342 is repeated until "enter" image 274 is touched with touch pen 27 etc.

Referring again to FIGS. 36A and 36B, in step S360, CPU 31 determines whether a situation permits recording with the microphone or not. More specifically, CPU 31 causes first LCD 12 and second LCD 22 to display an image inviting the user to make selection as to whether a situation permits recording or not. When a situation permits recording with the microphone (YES in step S360), the process proceeds to step S362. On the other hand, when a situation does not permit recording with microphone (NO in step S360), the process returns to step S300.

In step S362, CPU 31 has an image for accepting an instruction to start recording displayed, together with the selected "theme". In subsequent step S364, CPU 31 determines whether the user has provided an instruction to start recording or not. When the instruction to start recording has been provided (YES in step S364), the process proceeds to step S366. On the other hand, when the instruction to start recording has not been provided (NO in step S364), the processing in step S364 is repeated.

In step S366, CPU 31 causes voice and sound collected by microphone 43 stored for a prescribed period of time. In subsequent step S368, CPU 31 reproduces recorded audio data and causes speaker 45 to output recorded voice and sound. In subsequent step S370, CPU 31 determines whether reproduction of the recorded voice and sound again is requested or not. More specifically, CPU 31 causes first LCD 12 and second LCD 22 to display an image inviting the user to make selection as to whether it is necessary to reproduce again the recorded voice and sound or not. When the reproduction of the recorded voice and sound again is required (YES in step S370), the process returns to step S368. On the other hand, when the reproduction of the recorded voice and sound again is not required (NO in step S370), the process proceeds to step S372.

In step S372, CPU 31 determines whether recording of voice and sound again with regard to the recorded voice and sound is requested or not. More specifically, CPU 31 causes first LCD 12 and second LCD 22 to display an image inviting the user to make selection as to whether it is necessary to record voice and sound again or not. With regard to the recorded voice and sound, when recording of voice and sound again is required (YES in step S372), the process returns to step S364. On the other hand, with regard to the recorded voice and sound, when recording of voice and sound again is not requested (NO in step S372), the process proceeds to step S380.

In step S380, CPU 31 newly creates owner_theme file 430 from the obtained image data (photograph or hand-drawn picture) or the audio data (or overwrites already-created owner_theme file 430 therewith). In subsequent step S382, contents in newly created or updated owner_theme file 430 are displayed or reproduced.

In further subsequent step S384, CPU 31 determines, with regard to the same "theme", whether already-stored guest_theme file 454 is present or not. When already-stored guest_theme file 454 is present (YES in step S384), the process proceeds to step S386. On the other hand, when already-stored guest_theme file 454 is not present (NO in step S384), the process proceeds to step S388.

Figure 40:
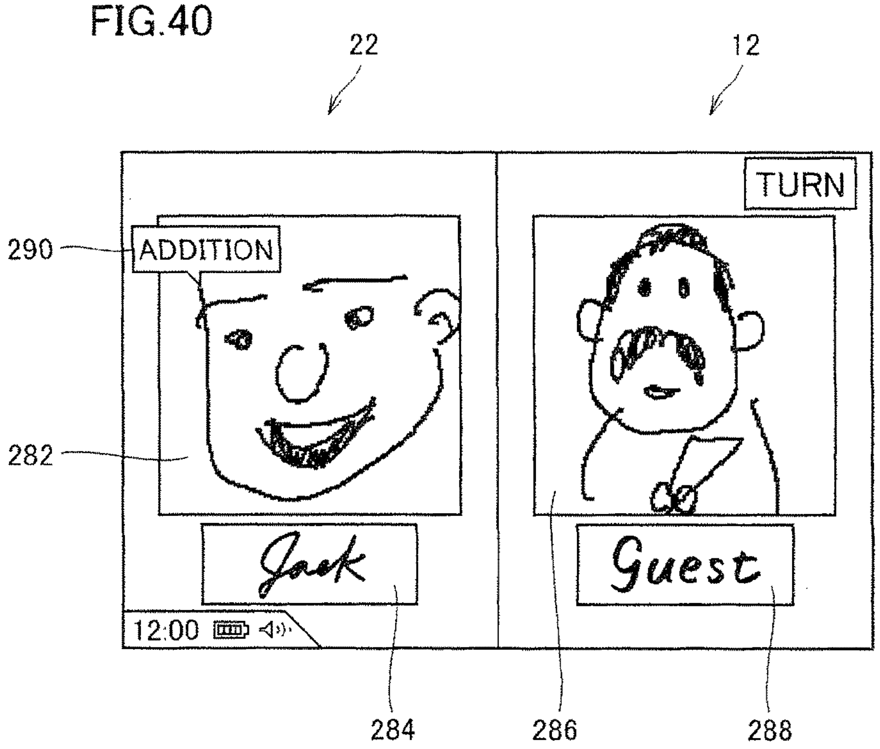

In step S386, CPU 31 compares owner_theme file 430 created by the present owner with already-stored guest_ theme file 454 for display. FIG. 40 shows an exemplary screen displayed on first LCD 12 and second LCD 22 in step S384. FIG. 40 shows an example where contents in owner_theme file 430 represent a "hand-drawn picture." FIG. 40 is also applicable to voice and sound and a photograph. In the screen shown in FIG. 40, an image 282 included in owner_theme file 430 created by the owner is displayed in correspondence with an image 284 included in owner_signature image file 452 and an image 286 included in guest_theme file 454 generated by a certain guest is displayed in correspondence with an image 288 included in guest_signature image file 452 of that guest. Here, regarding the contents in the theme file created in present play of the association game, an "addition" image 290 indicating new addition is displayed in a superimposed manner. Thus, results of play of the same association game by the owner and the guest(s) are compared and displayed on the same screen. Then, the processing for the association game ends.

Figure 41:
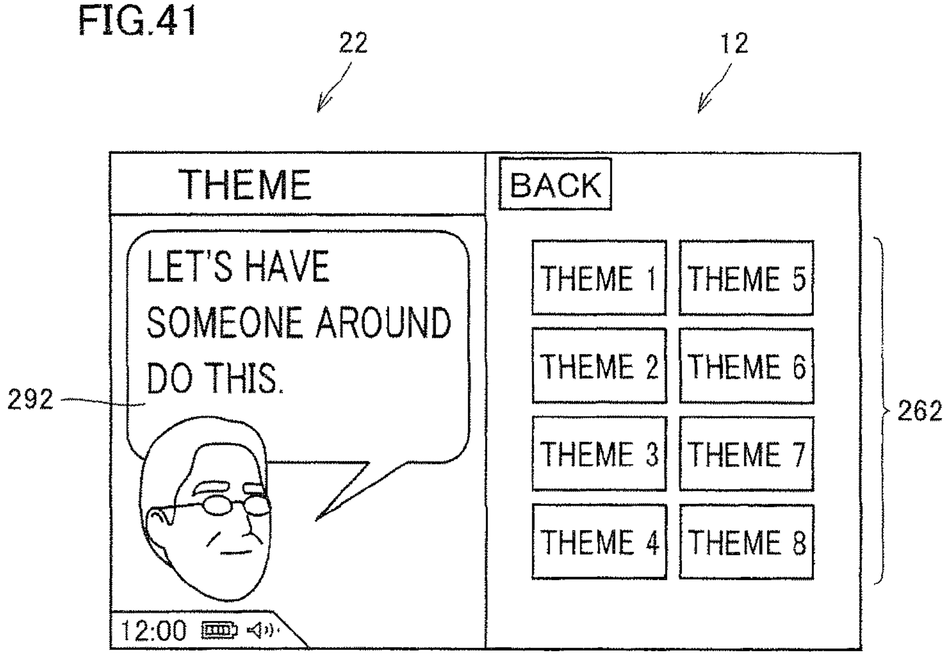

Referring again to FIG. 36B, in step S388, CPU 31 has a screen for inviting also a guest, in addition to the owner, to play the association game displayed. FIG. 41 shows an exemplary screen displayed on first LCD 12 and second LCD 22 in step S388. In the screen shown in FIG. 41, instruction images 262 indicating selectable "themes" are displayed in a list as well as a notification image 292 inviting also the guest to play the association game is displayed. Then, the processing for the association game ends.

(2. Association Game in Guest Mode)

Processing for the association game in the guest mode will now be described with reference to FIGS. 37A and 37B. It is noted that the steps included in the flowchart shown in FIGS. 37A and 37B the same as in FIGS. 36A and 36B have the same reference characters allotted and description thereof will not be repeated.

Referring to FIGS. 37A and 37B, initially, in step S300, CPU 31 causes "themes" prepared in advance displayed in a list. More specifically, CPU 31 reads an instruction image corresponding to each of the "themes" prepared in advance from data memory 34 for storage and causes first LCD 12 to display the instruction image. In subsequent step S302, CPU 31 determines whether selection from among the "themes" displayed in a list has been made or not. When a "theme" has been selected (YES in step S302), the process proceeds to step S304. On the other hand, when a "theme" has not been selected (NO in step S302), the processing in step S302 is repeated.

In step S304, CPU 31 specifies the selected "theme". In subsequent step S310, CPU 31 determines a form of input requested for the selected "theme".

When the selected "theme" requests a "photograph" ("photograph" in step S310), processing the same as in steps S320 to S330 shown in FIG. 36A is performed. Then, the process proceeds to step S381.

Alternatively, when the selected "theme" requests a hand-drawn "picture" ("hand-drawing" in step S310), processing the same as in steps S340 to S344 shown in FIG. 36A is performed. Then, the process proceeds to step S381.

Alternatively, when the selected "theme" requests "voice and sound" ("voice and sound" in step S310), processing the same as in steps S360 to S372 shown in FIG. 36A is performed. Then, the process proceeds to step S381.

In step S381, CPU 31 executes the signature image obtaining sub routine as in FIG. 18 to obtain the signature image of the guest. In subsequent step S383, CPU 31 has the image data (photograph or hand-drawn picture) or the audio data created in the present association game displayed, in correspondence with the input signature of the guest. Thereafter, the process proceeds to step S390.

In step S390, CPU 31 determines whether there is an empty space in guest_face image file 442 or not. Namely, CPU 31 determines whether an area for storing the image data (photograph or hand-drawn picture) or the audio data created in the present association game is present or not. When there is an empty space in "face image file 442" (YES in step S390), the process proceeds to step S392. On the other hand, when there is no empty space in guest_face image file 442 (NO in step S390), the process proceeds to step S394.

In step S392, CPU 31 creates guest_theme file 454 from the image data (photograph or hand-drawn picture) or the audio data created in the present association game and creates a guest_signature file from the input signature image of the guest. Then, the process proceeds to step S385.

In step S394, CPU 31 has signature images included in guest_signature image file 452 associated with already-stored guest_theme file 454 displayed in a list. Namely, CPU 31 invites the user to select guest_theme file 454 to be erased.

Figure 42:
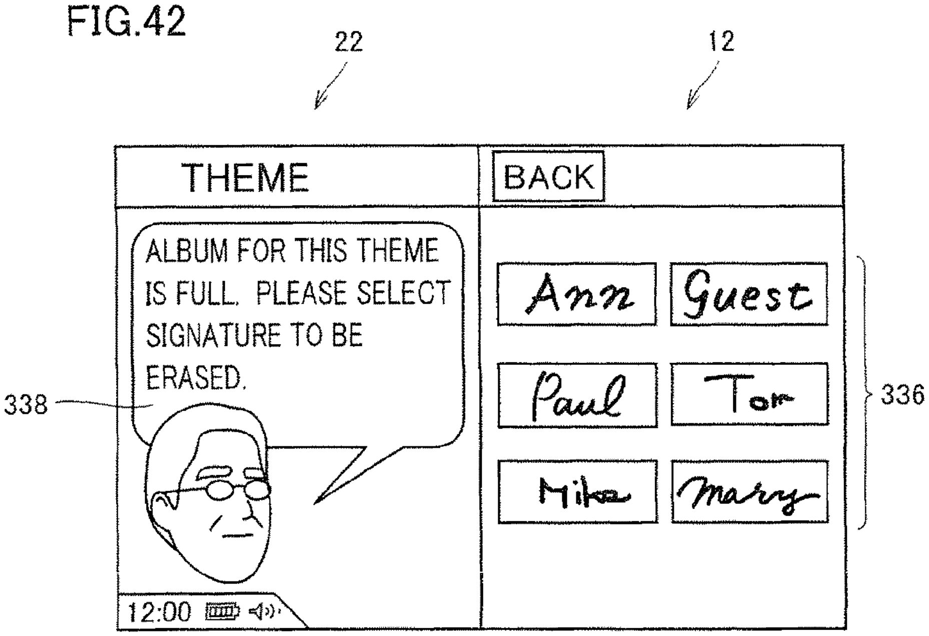
Figure 43:
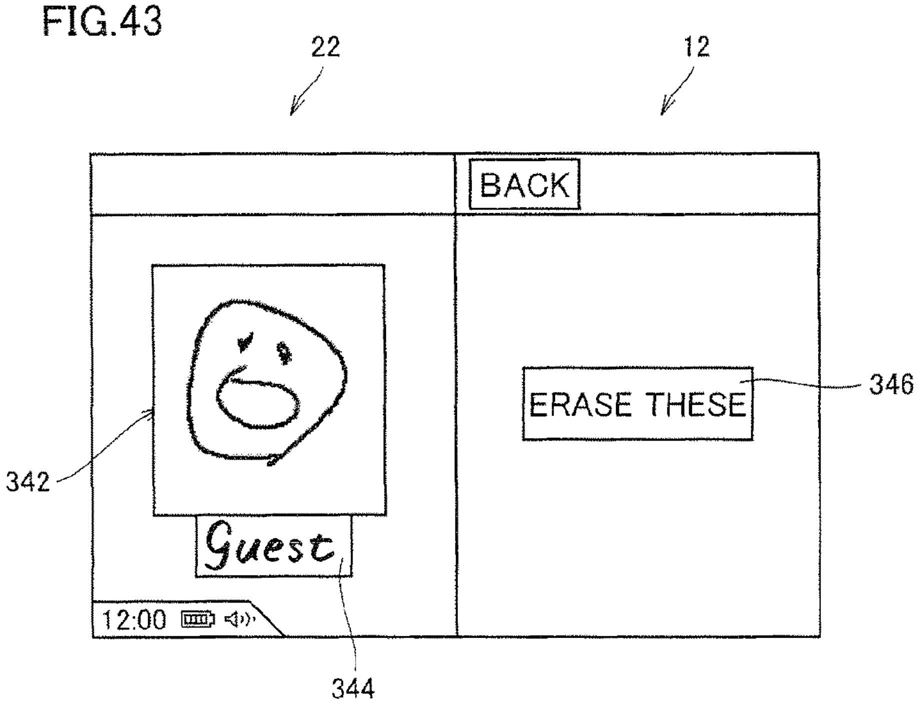

FIGS. 42 and 43 show an exemplary screen displayed on first LCD 12 and second LCD 22 in step S394. It is noted that FIGS. 42 and 43 illustrate an example where the guest theme file includes a "hand-drawn picture." FIGS. 42 and 43 are also applicable to voice and sound and a photograph. In the screen shown in FIG. 42, a notification image 338 inviting the user to select guest_theme file 454 to be erased is displayed as well as signature images 336 included in guest_signature image file 452 associated with selectable guest_theme file 454 are displayed in a list. When any of signature images 336 displayed in a list is touched with touch pen 27 etc., an image 342 included in guest_theme file 454 stored in association with a touched signature image 344 is displayed, as shown in FIG. 43. In the screen shown in FIG. 43, an "erase these" image 346 permitting erase of guest_signature image file 452 corresponding to touched signature image 344 and associated guest_theme file 454 is further displayed.

When the user has input a plurality of pieces of image data (camera image or hand-drawn image) or audio data for one "theme", such data may be displayed in correspondence with the same signature image.

When "erase these" image 346 is touched with touch pen 27 etc., CPU 31 determines that an erase target has been determined. Then, the process proceeds to step S396. In step S396, CPU 31 determines whether the image data (photograph or hand-drawn picture) or the audio data created in the present play of the association game has been selected or not. When the image data (photograph or hand-drawn picture) or the audio data created in the present play of the association game is selected (YES in step S396), the process proceeds to step S385. Namely, the image data (photograph or hand-drawn picture) or the audio data generated in the present play of the association game is not stored but discarded.

On the other hand, when the image data (photograph or hand-drawn picture) or the audio data created in the present play of the association game has not been selected (NO in step S396), the process proceeds to step S398. In step S398, CPU 31 overwrites selected guest_theme file 454 with the image data (photograph or hand-drawn picture) or the audio data created in the present play of the association game and overwrites corresponding guest_signature image file 452 with the input signature image of the guest. Then, the process proceeds to step S385.

In step S385, CPU 31 determines, with regard to the same "theme", whether already-stored owner_theme file 430 and/or guest_theme file 454 is (are) present or not. When already-stored owner_theme file 430 and/or guest_theme file 454 is (are) present (YES in step S385), the process proceeds to step S387. On the other hand, when already-stored owner_theme file 430 and/or guest_theme file 454 is (are) not present (NO in step S385), the process proceeds to step S389.

In step S387, CPU 31 causes display of contents included in guest_theme file 454 created by the guest in the present play of the association game and contents in already-stored owner_theme file 430 and/or guest_theme file 454 in a comparable manner. Then, the processing for the association game ends.

In step S389, CPU 31 has a screen inviting also the owner, in addition to the guest, to play the association game displayed. Then, the processing for the association game ends.

<Option>

Though not illustrated in the state transition diagram shown in FIG. 5, when "option" image 216 is touched with touch pen 27 etc. in the main menu for the owner shown in FIG. 8, additional functions are provided. Specifically, for example, in the application according to the present embodiment, such functions as (1) commemorative photo creation, (2) a graph, (3) a theme album, (4) brain age comparison, (5) photographing again of a head shot, (6) writing again of a signature, (7) checking of handedness, (8) erase of owner data, (9) erase of family and friend data, and (10) erase all data can selectively be executed. Each of functions (1) to (10) will be described hereinafter.

(1) A function for commemorative photo creation will be described later.

(2) When a function of a graph is selected, a graph of the owner's "brain age" as shown in FIG. 34 is displayed. Namely, independently of execution of the check game, a graph of the "brain age" is displayed.

(3) When a function of a theme album is selected, an image and the like input by the owner and/or the guest(s) for the selected "theme" are displayed in a list.

(4) When a function of brain age comparison is selected, a screen for comparing "brain ages" between the owner and the guest as shown in FIG. 35 is displayed. Namely, independently of execution of the check game, a screen for comparing the "brain age" is displayed. In this case, display is provided based on owner_brain age data 410 and guest_brain age file 444 generated as the check game proceeded in the past.

(5) When a function of photographing again of a head shot is selected, a screen for obtaining a face image as shown in FIGS. 20 to 25 is displayed, so that photographing again of a head shot or drawing again of a self-portrait by the owner user is allowed. The face image (head shot or self-portrait) obtained again is reflected in owner_setting file 406.

(6) When a function of writing again of a signature is selected, a screen for accepting input of a signature as shown in FIG. 26 is displayed, and setting again of a signature image by the owner user is allowed. Here, an already-registered signature of the owner user is displayed. The signature image set again is reflected in owner_setting file 406.

(7) When a function of checking of handedness is selected, a screen for checking handedness as shown in FIG. 11 is displayed, and setting again of handedness by the owner user is allowed. Setting of handedness selected again is reflected in owner_setting file 406.

(8) When a function for erase of owner data is selected, the entire data or a part of the data on the owner is erased. When a part is to be erased, for example, data in accordance with user's selection from among the owner identification information (owner_face image file 402, owner_signature image file 404 and owner_setting file 406), the results of the training game (owner_training performance data 420), the results of the check game (owner_brain age data 410), and the results of the association game (owner_theme file 430) is selectively erased.

(9) When a function for erase of family and friend data is selected, for example, a screen for selecting a guest to be erased as shown in FIG. 42 is displayed. When any guest is selected, a screen requesting approval by the user as shown in FIG. 43 is displayed and thereafter data on the guest of interest is selectively erased. It is noted that such a function as erasing all data on the guest at once may be provided.

(10) When a function of erase of all data is selected, after approval by the user, all data on the owner and the guest(s) stored in game device 100 is erased.

<Commemorative Photo Function>

The function of commemorative photo creation described above refers to a function to output a list of results obtained by execution of the check game and the association game described above. It is noted that the term "output" includes display of an image on a display screen, new creation of a file representing an image, transmission of image data to the outside, and the like. In the description below, an example where a file representing an image (for example, in a JPEG format) is newly created will be shown as typical "output" processing.

Figure 44:
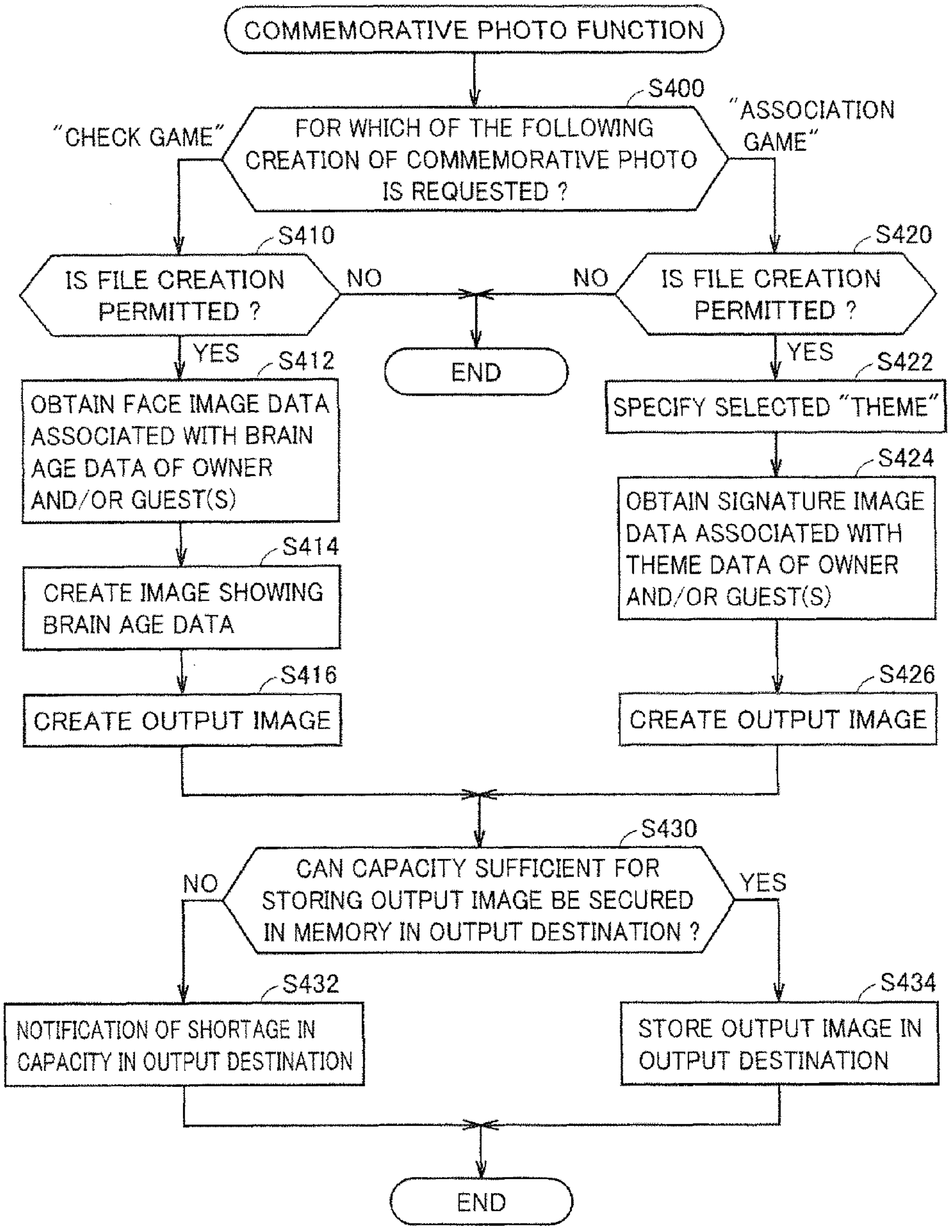
FIG. 44 is a flowchart showing a procedure for processing a commemorative photo function according to the embodiment of the present invention.
Figure 45:
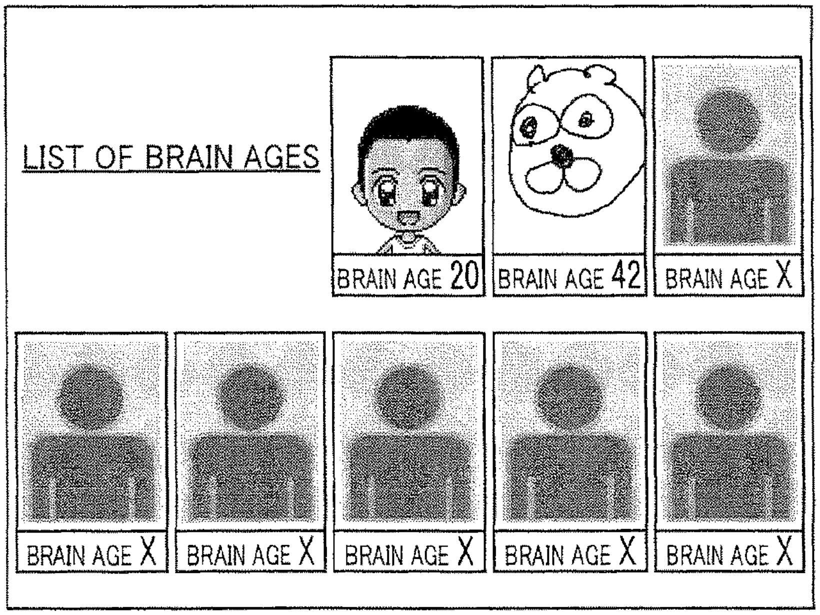
FIGS. 45 and 46 are diagrams showing examples of outputs created by the commemorative photo function according to the embodiment of the present invention.
Figure 46:
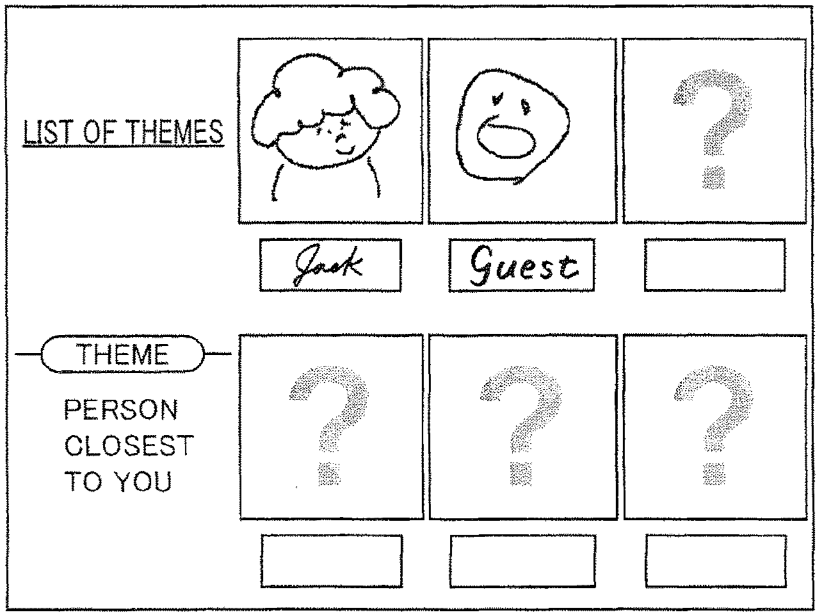

FIG. 44 is a flowchart showing a procedure for processing the commemorative photo function according to the embodiment of the present invention. FIGS. 45 and 46 are diagrams showing examples of outputs created with the commemorative photo function according to the embodiment of the present invention. It is noted that the processing procedure shown in FIG. 44 is performed when a "commemorative photo creation" image (not shown) displayed subsequent to selection of "option" image 216 in the main menu for the owner shown in FIG. 8 is selected.

Referring to FIG. 44, in step S400, CPU 31 determines for which of the check game and the association game creation of a commemorative photo is requested. Namely, CPU 31 has an image inviting the user to make selection as to for which of the check game and the association game a commemorative photo should be created displayed. When the creation of a commemorative photo for the check game is requested ("check game" in step S400), the process proceeds to step S410. On the other hand, when the creation of a commemorative photo for the association game is requested ("association game" in step S400), the process proceeds to step S420.

In step S410, CPU 31 determines whether file creation is permitted or not. More specifically, CPU 31 has an image inviting the user to input whether to permit file creation or not displayed. When file creation is permitted (YES in step S410), the process proceeds to step S412. On the other hand, when file creation is canceled (NO in step S410), the processing for the commemorative photo function ends.

In step S412, CPU 31 obtains stored brain age data of the owner and/or the guest(s) and face image data associated with the brain age data. In subsequent step S414, CPU 31 generates an image representing the obtained brain age data. In further subsequent step S416, CPU 31 generates an output image by doing layout of the obtained image(s) each representing the brain age value and the face image data associated therewith. Thereafter, the process proceeds to step S430.

FIG. 45 shows an exemplary output image generated in step S414. In the output image shown in FIG. 45, not only the title, that is, list of brain ages, but also the brain age values of the owner and/or the guest(s) are displayed in a list, in correspondence with the respective corresponding face images. In the output image shown in FIG. 45, brain ages for eight persons are displayed in a list.

In step S420, CPU 31 determines whether file creation is permitted or not. More specifically, CPU 31 has an image inviting the user to input whether to permit file creation or not displayed. When file creation is permitted (YES in step S420), the process proceeds to step S422. On the other hand, when file creation is canceled (NO in step S420), the processing for the commemorative photo function ends.

In step S422, CPU 31 determines for which "theme" a commemorative photo should be created. More specifically, CPU 31 has images representing selectable "themes" displayed in a list as in FIG. 38 and specifies a "theme" corresponding to the image touched by the user. In subsequent step S424, with regard to the selected "theme", a stored theme file of the owner and/or the guest(s) is obtained and signature image data associated with the theme file is obtained. In subsequent step S426, CPU 31 generates an output image by doing layout of the theme file and the signature image data. Thereafter, the process proceeds to step S430.

FIG. 46 shows an exemplary output image generated in step S428. In the output image shown in FIG. 46, not only contents in the theme but also contents in the theme file of the owner and/or the guest(s) are displayed in a list, in correspondence with the respective corresponding signature images. In the output image shown in FIG. 46, contents in the theme files for six persons are displayed in a list.

In step S430, CPU 31 determines whether a capacity sufficient for storing the output image can be secured in a memory in an output destination (for example, a capacity of data memory 34 for storage or memory card 28) or not. When a capacity sufficient for storing the output image cannot be secured (NO in step S430), the process proceeds to step S432. On the other hand, when a capacity sufficient for storing the output image can be secured (YES in step S430), the process proceeds to step S434.

In step S432, CPU 31 has an image for notification of shortage in a capacity in the output destination displayed. Then, the processing for the commemorative photo function ends.

In step S434, CPU 31 causes the output destination to store the output image as a file. Then, the processing for the commemorative photo function ends.

Although certain exemplary embodiments have been described and illustrated in detail, it is clearly understood that the same is by way of illustration and example only and is not to be taken by way of limitation, the scope of the present invention being interpreted by the terms of the appended claims.

What is claimed is:

1. An information processing device, comprising:

an image pick-up portion;

an image data output portion for outputting image data representing an image picked up by said image pick-up portion;

first and second display portions arranged side-by-side with one another, and on a same side as said image pick-up portion;

a storage portion for storing the image data output from said image data output portion;

a first display control unit for causing one of said first and second display portions to display the image data output from said image data output portion;

a position input portion for accepting an instruction of a position on said first display portion;

a second display control unit for causing said first display portion to display an instruction image for accepting an instruction, in a prescribed area of said first display portion;

a storage instruction control unit for causing said storage portion to store the image data output from said image data output portion in response to acceptance of the instruction onto the position corresponding to said instruction image by said position input portion;

a mode setting unit for switching between a first control mode and a second control mode; and a control unit for controlling said image data output portion, said first display control unit and said second display control unit in accordance with the control mode set by said mode setting unit, and said control unit being configured, while said second control mode is set, to control said image data output portion such that image data is output in an orientation rotated by 180 degrees as compared with a case where said first control mode is set, control said first display control unit such that the image data output from said image data output portion is displayed in an orientation rotated further by 180 degrees, and control said second display control unit such that said instruction image is displayed in an orientation rotated by 180 degrees as compared with the case where said first control mode is set.

2. The information processing device according to claim 1, further comprising:

a first housing;

a second housing; and a coupling portion for rotatably coupling said first housing and said second housing to each other, wherein said first display portion is provided in said first housing, said second display portion is provided in said second housing, and said image pick-up portion is provided in said coupling portion.

3. The information processing device according to claim 1, wherein said storage instruction control unit is configured to cause said storage portion to store the image data after a prescribed period of time since acceptance of the instruction onto the position corresponding to said instruction image by said position input portion, and during a period from acceptance of said instruction until storage in said storage portion, a notification image indicating timing of storage in said storage portion is displayed on at least one of said first display portion and said second display portion.

4. The information processing device according to claim 1, wherein said first and second control modes are modes in accordance with user's handedness.

5. The information processing device according to claim 1, wherein said image pick-up portion is arranged to include a user's face in a field while a user holds said first display portion and said second display portion.

6. An information processing device, comprising:

an image pick-up element;

a reading circuit for reading image data in accordance with light reception by said image pick-up element;

first and second display portions arranged side-by-side with one another, and on a same side as said image pick-up element;

an input portion arranged on said first display portion, for accepting an instruction of a position;

a memory coupled to said reading circuit; and a processor coupled to said reading circuit and said memory, wherein said processor is programmed to cause said first and/or second display portion(s) to display an image obtained by said image pick-up element by setting any of first and second control modes, while said first control mode is set, causing said first display portion to display an instruction image for accepting an instruction in a prescribed area of said first display portion, causing said memory to store the image data read in a prescribed orientation from said image pick-up element by said reading circuit in response to acceptance of the instruction onto the position corresponding to said instruction image by said input portion, and causing one of said first and second display portions to display the image data stored in said memory, and while said second control mode is set, causing said first display portion to display said instruction image in an orientation rotated by 180 degrees as compared with a case where said first control mode is set, controlling said reading circuit such that the image data is output in an orientation rotated by 180 degrees as compared with the case where said first control mode is set, in response to acceptance of the instruction onto the position corresponding to said instruction image by said input portion, causing said memory to store the image data read from said image pick-up element by said reading circuit, and causing one of said first and second display portions to display the image data stored in said memory in an orientation rotated further by 180 degrees.

7. The information processing device according to claim 1, wherein the prescribed area is defined independent of said first display portion's orientation.

8. The information processing device according to claim 7, wherein the prescribed area corresponds to a generally horizontally centered position in a bottom half area of the first display portion, regardless of whether said first or second control mode is set.

9. The information processing device of according to claim 6, wherein the prescribed area is defined independent of said first display portion's orientation.

10. The information processing device according to claim 9, wherein the prescribed area corresponds to a generally horizontally centered position in a bottom half area of the first display portion, regardless of whether said first or second control mode is set.

11. A method of operating an information processing device comprising an image pick-up portion and first and second display portions arranged side-by-side with one another, and on a same side as said image pick-up portion, the information processing device being selectively operable in first and second control modes, the method comprising:

outputting image data representing an image picked up by said image pick-up portion via an image data output portion, the image data being storable to a storage location;

causing one of said first and second display portions to display the image data from the image data output portion;

accepting an instruction of a position on said first display portion;

causing said first display portion to display an instruction image for accepting an instruction, in a prescribed area of said first display portion;

storing the image data in response to acceptance of the instruction onto the position corresponding to said instruction image; and while said second control mode is set:

outputting, via the image data output portion, the image data in an orientation rotated by 180 degrees as compared with a case where said first control mode is set, displaying the image data output from said image data output portion in an orientation rotated further by 180 degrees, and displaying said instruction image in an orientation rotated by 180 degrees as compared with the case where said first control mode is set.

12. A method of operating an information processing device comprising an image pick-up element and first and second display portions arranged side-by-side with one another, and on a same side as said image pick-up element, the method comprising:

reading, in connection with a reading circuit, image data in accordance with light reception by said image pick-up element;

accepting an instruction of a position via an input portion arranged on said first display portion;

causing, in connection with at least one processor of the information processing device, said first and/or second display portion(s) to display an image obtained by said image pick-up element by:

setting an operating mode of the information processing device to one of a first control mode and a second control mode, while said first control mode is set, causing said first display portion to display an instruction image for accepting an instruction in a prescribed area of said first display portion, storing the image data read in a prescribed orientation from said image pick-up element by said reading circuit in response to acceptance of the instruction onto the position corresponding to said instruction image by said input portion, and causing one of said first and second display portions to display the stored image data, and while said second control mode is set, causing said first display portion to display said instruction image in an orientation rotated by 180 degrees as compared with a case where said first control mode is set, controlling said reading circuit such that the image data is output in an orientation rotated by 180 degrees as compared with the case where said first control mode is set, in response to acceptance of the instruction onto the position corresponding to said instruction image by said input portion, storing the image data read from said image pick-up element by said reading circuit, and causing one of said first and second display portions to display the stored image data in an orientation rotated further by 180 degrees.

13. A non-transitory computer readable storage medium tangibly storing a program comprising instructions that, when executed, cause an information processing device that is selectively operable in first and second control modes device and that comprises an image pick-up portion and first and second display portions arranged side-by-side with one another, and on a same side as said image pick-up portion, to at least:

output image data representing an image picked up by said image pick-up portion via an image data output portion, the image data being storable to a storage location;

cause one of said first and second display portions to display the image data from the image data output portion;

accept an instruction of a position on said first display portion;

cause said first display portion to display an instruction image for accepting an instruction, in a prescribed area of said first display portion;

store the image data in response to acceptance of the instruction onto the position corresponding to said instruction image; and while said second control mode is set:

output, via the image data output portion, the image data in an orientation rotated by 180 degrees as compared with a case where said first control mode is set, display the image data output from said image data output portion in an orientation rotated further by 180 degrees, and display said instruction image in an orientation rotated by 180 degrees as compared with the case where said first control mode is set.

14. A non-transitory computer readable storage medium tangibly storing a program comprising instructions that, when executed, cause an information processing device comprising an image pick-up element and first and second display portions arranged side-by-side with one another, and on a same side as said image pick-up element, to at least:

read, in connection with a reading circuit, image data in accordance with light reception by said image pick-up element;

accept an instruction of a position via an input portion arranged on said first display portion;

cause, in connection with at least one processor of the information processing device, said first and/or second display portion(s) to display an image obtained by said image pick-up element by:

set an operating mode of the information processing device to one of a first control mode and a second control mode, while said first control mode is set, cause said first display portion to display an instruction image for accepting an instruction in a prescribed area of said first display portion, store the image data read in a prescribed orientation from said image pick-up element by said reading circuit in response to acceptance of the instruction onto the position corresponding to said instruction image by said input portion, and cause one of said first and second display portions to display the stored image data, and while said second control mode is set, cause said first display portion to display said instruction image in an orientation rotated by 180 degrees as compared with a case where said first control mode is set, control said reading circuit such that the image data is output in an orientation rotated by 180 degrees as compared with the case where said first control mode is set, in response to acceptance of the instruction onto the position corresponding to said instruction image by said input portion, store the image data read from said image pick-up element by said reading circuit, and cause one of said first and second display portions to display the stored image data in an orientation rotated further by 180 degrees.

* * * * *